(12) United States Patent
Baek et al.

(10) Patent No.: US 12,317,121 B2
(45) Date of Patent: May 27, 2025

(54) DEVICE AND METHOD FOR TRANSMITTING AND RECEIVING SIGNAL IN WIRELESS COMMUNICATION SYSTEM

(71) Applicant: SAMSUNG ELECTRONICS CO., LTD., Suwon-si (KR)

(72) Inventors: Sangkyu Baek, Suwon-si (KR); Milos Tesanovic, Suwon-si (KR); Hyunjeong Kang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 17/760,295

(22) PCT Filed: Feb. 5, 2021

(86) PCT No.: PCT/KR2021/001590
§ 371 (c)(1),
(2) Date: Aug. 5, 2022

(87) PCT Pub. No.: WO2021/158081
PCT Pub. Date: Aug. 12, 2021

(65) Prior Publication Data
US 2023/0103455 A1 Apr. 6, 2023

(30) Foreign Application Priority Data

Feb. 5, 2020 (KR) .................. 10-2020-0013959
Mar. 19, 2020 (KR) .................. 10-2020-0034088
(Continued)

(51) Int. Cl.
*H04W 12/00* (2021.01)
*H04W 12/047* (2021.01)
(Continued)

(52) U.S. Cl.
CPC ..... *H04W 28/0263* (2013.01); *H04W 12/009* (2019.01); *H04W 12/047* (2021.01);
(Continued)

(58) Field of Classification Search
CPC ....... H04W 4/30–80; H04W 8/18–245; H04W 12/009–80; H04W 24/02–10;
(Continued)

(56) References Cited

U.S. PATENT DOCUMENTS

2022/0217575 A1* 7/2022 Wang ................ H04W 28/0268
2022/0287115 A1* 9/2022 Hu .................... H04W 28/0268

FOREIGN PATENT DOCUMENTS

| CN | 110536262 A | * 12/2019 | ........ H04W 28/0268 |
| KR | 10-2021-0061845 A | 5/2021 | |
| WO | WO-2019182249 A1 | * 9/2019 | ............ H04W 76/11 |

OTHER PUBLICATIONS

Huawei et al., "SLRB configuration handling during UE state transition," R2-1915972, 3GPP TSG-RAN WG2 Meeting# 108, Reno, NV, USA, Nov. 18-22, 2019, 4 pages. (Year: 2019).*
(Continued)

*Primary Examiner* — Timothy J Weidner

(57) ABSTRACT

An operating method of a first terminal in a wireless communication system, according to an embodiment of the present disclosure, may include transmitting sidelink data to a second terminal through a first radio bearer; reporting a count value to a base station when a certain condition is satisfied; receiving, from the base station, a sidelink radio resource control (RRC) reconfiguration message, based on the count value; generating a second radio bearer based on the RRC reconfiguration message; and transmitting the sidelink data to the second terminal through the second radio bearer.

13 Claims, 33 Drawing Sheets

(30) Foreign Application Priority Data

Apr. 2, 2020 (KR) .................. 10-2020-0040322
Apr. 20, 2020 (KR) .................. 10-2020-0047724

(51) Int. Cl.

| | |
|---|---|
| *H04W 28/02* | (2009.01) |
| *H04W 28/06* | (2009.01) |
| *H04W 72/231* | (2023.01) |
| *H04W 72/40* | (2023.01) |
| *H04W 76/14* | (2018.01) |
| *H04W 76/23* | (2018.01) |
| *H04W 84/02* | (2009.01) |
| *H04W 88/06* | (2009.01) |
| *H04W 88/08* | (2009.01) |
| *H04W 92/02* | (2009.01) |
| *H04W 92/10* | (2009.01) |
| *H04W 92/18* | (2009.01) |

(52) U.S. Cl.
CPC ... *H04W 28/0268* (2013.01); *H04W 28/0273* (2013.01); *H04W 28/06* (2013.01); *H04W 72/231* (2023.01); *H04W 72/40* (2023.01); *H04W 76/14* (2018.02); *H04W 76/23* (2018.02); *H04W 84/02* (2013.01); *H04W 88/06* (2013.01); *H04W 88/08* (2013.01); *H04W 92/02* (2013.01); *H04W 92/10* (2013.01); *H04W 92/18* (2013.01)

(58) Field of Classification Search
CPC ........... H04W 28/02–26; H04W 36/0005–385; H04W 48/02–20; H04W 72/02–569; H04W 76/10–50; H04W 84/005–22; H04W 88/02–12; H04W 92/02–04; H04W 92/10; H04W 92/16; H04W 92/18
See application file for complete search history.

(56) References Cited

OTHER PUBLICATIONS

International Search Report and Written Opinion of the International Searching Authority in connection with International Application No. PCT/KR2021/001590 issued Apr. 15, 2021, 15 pages.
Huawei et al., "SLRB configuration handling during UE state transition," R2-1915972, 3GPP TSG-RAN WG2 Meeting# 108, Reno, NV, USA, Nov. 18-22, 2019, 4 pages.
3GPP TS 38.331 V15.8.0 (Dec. 2019) Technical Specification; 3rd Generation Partnership Project; Technical Specification Group Radio Access Network; NR; Radio Resource Control (RRC) protocol specification (Release 15); 532 pages.
Huawei, "Offline discussion on open issues of V2X 38.331 running CR ," R2-1916447, 3GPP TSG-RAN WG2 Meeting# 108, Reno, NV, USA, Nov. 18-22, 2019, 16 pages.
Nokia et al., "Enabling DRB release-and-add in a single message," R3-186617, 3GPP TSG-RAN WG3 Meeting #102, Spokane, USA, Nov. 12-16, 2018, 3 pages.
European Patent Office, "Extented European Search Report," dated Jun. 5, 2023, in connection with European Patent Application No. 21750665.8, 10 pages.
Notice of Allowance dated Apr. 17, 2025, in connection with European Application No. 21750665.8, 115 pages.

\* cited by examiner

FIG. 19

| LCG 7 | LCG 6 | LCG 5 | LCG 4 | LCG 3 | LCG 2 | LCG 1 | LCG 0 | Oct 1 |
|---|---|---|---|---|---|---|---|---|
| Buffer Size 1 | | | | | | | | Oct 2 |
| Buffer Size 2 | | | | | | | | Oct 3 |
| ⋮ | | | | | | | | |
| Buffer Size m | | | | | | | | Oct m+1 |

DEVICE AND METHOD FOR TRANSMITTING AND RECEIVING SIGNAL IN WIRELESS COMMUNICATION SYSTEM

CROSS-REFERENCE TO RELATED APPLICATIONS

This application is a 371 of International Application No. PCT/KR2021/001590, filed Feb. 5, 2021, which claims priority to Korean Patent Application No. 10-2020-0013959 filed on Feb. 5, 2020, Korean Patent Application No. 10-2020-0034088 filed on Mar. 19, 2020, Korean Patent Application No. 10-2020-0040322 filed on Apr. 2, 2020, and Korean Patent Application No. 10-2020-0047724 filed on Apr. 20, 2020, the disclosures of which are herein incorporated by reference in their entirety.

BACKGROUND

1. Field

The present disclosure relates to a method and device for controlling re-establishment of a radio bearer in a wireless communication system.

The present disclosure relates generally to a wireless communication system, and more particularly, to a method and apparatus for transmitting a pre-emptive buffer status report (BSR) in a wireless communication system.

2. Description of Related Art

To meet the increase in demand with respect to wireless data traffic after the commercialization of 4th generation (4G) communication systems, considerable efforts have been made to develop improved 5th generation (5G) communication systems or pre-5G communication systems. For this reason, 5G communication systems or pre-5G communication systems are called beyond 4G network communication systems or post long term evolution (LTE) systems.

To achieve a high data rate, the implementation of 5G communication systems in an ultra-high frequency band (millimeter wave (mmWave)) (e.g., a 60 GHz band) is under consideration. To alleviate path loss of radio waves and increase propagation distances of radio waves in a millimeter wave band, technologies for 5G communication systems, such as beamforming, massive multiple input multiple output (MIMO), full dimensional MIMO (FD-MIMO), array antenna, analog beamforming, and large-scale antenna system, are being discussed.

Also, in order to improve a system network for 5G communication systems, technologies, such as evolved small cell, advanced small cell, cloud radio access network (cloud RAN), ultra-dense network, device-to-device (D2D) communication, wireless backhaul, moving network, cooperative communication, coordinated multi-points (COMP), and received-interference cancellation, are being developed.

In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet of things (IoT) network that exchanges and processes information between distributed elements such as objects. An Internet of everything (IoE) technology is emerging, in which a technology related to the IoT is combined with, for example, a technology for processing big data through connection with a cloud server. In order to implement the IoT, various technical components are required, such as, a sensing technology, wired/wireless communication and network infrastructures, a service interfacing technology, a security technology, etc. In recent years, technologies including a sensor network for connecting objects, machine-to-machine (M2M) communication, machine type communication (MTC), etc., have been studied. In the IoT environment, intelligent Internet technology (IT) services may be provided to collect and interpret data obtained from objects connected to each other, and to create new value in human life. As existing information technology (IT) and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technologies including beamforming, MIMO, array antenna, etc. The application of cloud RAN as a big data processing technology described above may be an example of convergence of 3eG communication technology and IoT technology.

As it is possible to provide various services according to those described above and the development of wireless communication systems, there is a need for a method of seamlessly providing services by using re-establishment of a radio bearer in a wireless communication system.

There is a demand for a technology, such as a relay, for the purpose of expanding a service area of a network and increasing traffic capacity in a specific area. According to the demand, the concept of an integrated access and backhaul (IAB) node for supporting a radio access to a terminal based on wireless backhaul technology supporting multi-hop has been introduced, and technologies related to the IAB node are being discussed.

SUMMARY

Disclosed embodiments aim to provide a method and apparatus capable of effectively supporting a service in a wireless communication system.

BRIEF DESCRIPTION OF THE DRAWINGS

FIG. 19 illustrates an example of a format for transmission of a pre-emptive BSR.

DETAILED DESCRIPTION

Figure 1:
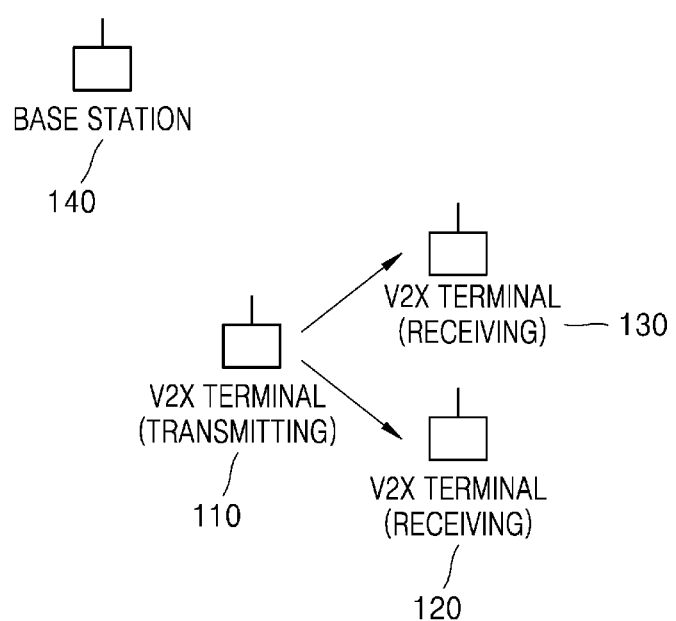
FIG. 1 is a diagram illustrating a scenario in which inter-terminal communication is performed in vehicular to everything (V2X) communication, according to an embodiment of the present disclosure.

According to an embodiment of the present disclosure, a method performed by an integrated access and backhaul (IAB) node may include receiving, from a child IAB node of a lower link, a buffer status report (BSR) including a buffer size of a first logical channel group (LCG) of the lower link; identifying a second LCG of an upper link based on the first LCG of the lower link; transmitting, to a parent IAB node of the upper link, a pre-emptive BSR in which the buffer size of the first LCG is applied as the buffer size of the second LCG of the upper link.

The second LCG may include a logical channel (LCH) of the upper link corresponding to an LCH identified based on a priority, a logical channel identifier (LCID), or pre-configured information among one or more LCHs of the first LCG.

The method may further include transmitting a scheduling request (SR) to the parent IAB node in order to transmit the pre-emptive BSR, wherein the SR may be transmitted based on an SR configuration mapped to the LCH of the upper link.

The second LCG may be an LCG of the upper link having the same LCG ID as the LCG ID of the first LCG.

The method may further include transmitting a SR to the parent IAB node in order to transmit the pre-emptive BSR, wherein the SR may be transmitted to a LCH belonging to the second LCG based on an SR configuration.

The second LCG may include an LCH identified based on a priority, a LCID, or pre-configured information among one or more LCHs of the upper link, and the one or more LCHs of the upper link may correspond to the LCH of the first LCG.

The method may further include transmitting a SR to the parent IAB node in order to transmit the pre-emptive BSR, and the SR may be transmitted based on an SR configuration mapped to the identified LCH of the upper link.

The identifying of the second LCG may include distributing the buffer size of the first LCG of the lower link to one or more LCHs of the upper link, and the second LCG may include at least one of the one or more LCHs.

The method may further include receiving a radio resource control (RRC) message from the parent IAB node, and the RRC message may include at least one of a pre-emptive BSR configuration or a SR configuration for the pre-emptive BSR.

The pre-emptive BSR configuration may include information about a first timer for indicating a time for which transmission of the pre-emptive BSR is prohibited. The SR configuration for the pre-emptive BSR may include information about a second timer for indicating a time for which transmission of the SR for the pre-emptive BSR is prohibited.

According to an embodiment of the present disclosure, an apparatus of an integrated access and backhaul (IAB) node may include at least one transceiver and at least one processor, wherein the at least one process is configured to: receive, from a child IAB node of a lower link, a buffer status report (BSR) including a buffer size of a first logical channel group (LCG) of the lower link; identify a second LCG of an upper link based on the first LCG of the lower link; transmit, to a parent IAB node of the upper link, a pre-emptive BSR in which the buffer size of the first LCG is applied as the buffer size of the second LCG of the upper link.

The second LCG may include a logical channel (LCH) of the upper link corresponding to an LCH identified based on a priority, a logical channel identifier (LCID), or pre-configured information among one or more LCHs of the first LCG.

The at least one processor may be further configured to transmit a scheduling request (SR) to the parent IAB node in order to transmit the pre-emptive BSR, wherein the SR may be transmitted based on an SR configuration mapped to the LCH of the upper link.

The second LCG may be an LCG of the upper link having the same LCG ID as the LCG ID of the first LCG.

The at least one process may be further configured to transmit a SR to the parent IAB node in order to transmit the pre-emptive BSR, wherein the SR may be transmitted to a LCH belonging to the second LCG based on an SR configuration.

The at least one processor may be further configured to transmit a SR to the parent IAB node in order to transmit the pre-emptive BSR, wherein the SR may be transmitted based on an SR configuration mapped to the identified LCH of the upper link.

The at least one processor may be further configured to distribute the buffer size of the first LCG of the lower link to one or more LCHs of the upper link in order to identify the second LCG, and the second LCG may include at least one of the one or more LCHs.

The at least one processor may be further configured to receive a radio resource control (RRC) message from the parent IAB node, and the RRC message may include at least one of a pre-emptive BSR configuration or a SR configuration for the pre-emptive BSR.

MODE OF DISCLOSURE

In describing the present disclosure, when a detailed description of the relevant known functions or configurations is determined to unnecessarily obscure the gist of the present disclosure, the detailed description thereof may be omitted. The terms as used herein are those defined by taking into account functions in the present disclosure, but the terms may vary depending on the intention of users or those of ordinary skill in the art, precedents, or the like. Therefore, the definitions should be made based on the contents throughout the present disclosure. The term for identifying an access node, the term referring to network entities, the term referring to messages, the term referring to an interface between network entities, the terms referring to a variety of identification information, and the like are exemplified for convenience of description. Therefore, the present disclosure is not limited to the terms to be described below, and other terms referring to entities having an equivalent technical meaning may be used.

Hereinafter, a base station allocates resources to a terminal, and may include at least one of a gNode B, an eNode B, a Node B, a base station (BS), a radio access unit, a base station controller, or a node on a network. Examples of a terminal may include a user equipment (UE), a mobile station (MS), a cellular phone, a smartphone, a computer, a multimedia system capable of performing a communication function, or the like. Also, the term "terminal" may refer to not only mobile phones, NB-IoT devices, and sensors, but also other wireless communication devices. Of course, the base station and the terminal are not limited to the above examples.

For convenience of description, the terms and names defined in the 3rd generation partnership project long term evolution (3GPP LTE) standard and/or the 3rd generation partnership project new radio (3GPP NR) are used in the present disclosure. However, the present disclosure is not limited by these terms and names.

Also, although embodiments of the present disclosure will be described below with reference to an LTE, LTE-A, LTE Pro, or a 5th generation (5G) system (or an NR system, a next-generation mobile communication system, etc.), embodiments of the present disclosure may also be applied to other communication systems having a similar technical background or channel form. Also, the present disclosure may be applied to other communication systems through some modifications by those of ordinary skill in the art, without departing from the scope of the present disclosure.

Hereinafter, embodiments of the present disclosure will be described in detail with reference to the accompanying drawings.

FIG. 1 is a diagram illustrating a scenario in which inter-terminal communication is performed in vehicular to everything (V2X) communication, according to an embodiment of the present disclosure.

In V2X communication, it is assumed that communication between V2X terminals 110, 120, and 130 is performed without passing through a base station 9140. In this case, one of the following three transmission schemes may be used.

Unicast: One-to-one communication between a transmitting terminal and a receiving terminal Multicast: One-to-many communication between a transmitting terminal and multiple receiving terminals Broadcast: One-to-many communication between a transmitting terminal and an unspecified number of receiving terminals Which transmission scheme is used among the three transmission schemes may be determined by characteristics of a traffic to be transmitted or characteristics of the transmitting and receiving V2X terminals. In some embodiments, the base station may determine the transmission scheme and transmit the determined transmission scheme to the terminal through radio resource control (RRC) configuration, etc. Since the V2X communication is based on inter-terminal communication, the V2X communication may be performed in a connected mode within the coverage of the base station, and may also be performed in an idle mode or an inactive mode in which the connection with the base station is released. In addition, the V2X communication is possible when having a link state capable of performing the V2X communication even in an out-of-coverage (OOC) state that is out of the coverage of the base station. When the unicast scheme is used among the three transmission methods, it may be assumed that two V2X terminals transmit and receive data. In this case, setting values of parameters, timers, etc. to be used in the transmitting terminal, the receiving terminal, and unicast communication may be set by various schemes.

The V2X communication is also called sidelink because communication is performed between terminals without passing through the base station. A radio bearer through which the terminal performs communication in the sidelink is referred to as a sidelink radio bearer (SLRB). In the example of FIG. 1, the transmitting terminal 110 and the receiving terminals 120 and 130 do not need to be determined. When the V2X terminal performs data transmission, the V2X terminal may be the transmitting terminal, and when the V2X terminal performs data reception, the V2X terminal may be the receiving terminal. When two V2X terminals perform bi-directional communication with each other, the two V2X terminals may be both the transmitting terminal and the receiving terminal.

In order to support the V2X communication regardless of which transmission scheme is used, the V2X terminal 110 in charge of transmission may transmit data for V2X communication to one or more receiving V2X terminals 120 and 130. In this case, only terminals permitted to receive data transmitted by the transmitting terminal may receive data. When the V2X communication is performed within the coverage of the base station, the base station 140 may be in charge of controlling the V2X communication. In this case, the base station may be in charge of at least one of RRC connection setup, radio resource allocation (frequency and time resources), transmission scheme setup, radio bearer configuration, quality of service (QoS) management, and SLRB configuration.

Figure 2:
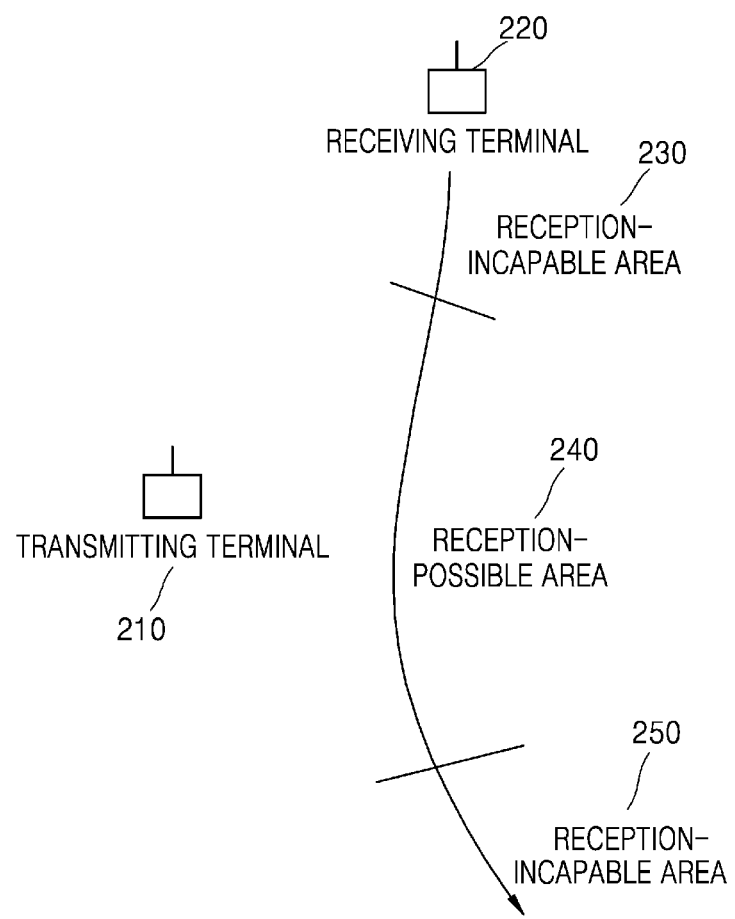
FIG. 2 is a diagram illustrating a mobility scenario of transmitting and receiving terminals in vehicle communication, according to an embodiment of the present disclosure.

FIG. 2 is a diagram illustrating a mobility scenario of transmitting and receiving terminals in vehicle communication, according to an embodiment of the present disclosure.

In vehicle communication, both a transmitting terminal and a receiving terminal may have mobility, and transmission and reception may or may not be possible due to the movement of the transmitting terminal or the receiving terminal. The embodiment of FIG. 2 shows a scenario in which a transmitting terminal 210 does not move, but a receiving terminal 220 moves. At a start time point of the embodiment, the receiving terminal 220 is in an area 230 incapable of receiving a packet transmitted by the transmitting terminal. As the receiving terminal 220 continues to move, the receiving terminal 220 may move to an area 240 capable of receiving a packet transmitted by the transmitting terminal 210. In the area 240, the receiving terminal 220 receives a packet transmitted by the transmitting terminal 210. At this time, it is not guaranteed that the reception is done from the first packet transmitted by the transmitting terminal 210. In other words, although the transmitting terminal 210 has transmitted packets from a previous time point, the receiving terminal is unable to receive a packet when the receiving terminal 220 is in the non-receivable areas 230 and 250, and is able to receive a packet from the moment the receiving terminal 220 enters the receivable area 240. Referring to FIG. 2, as the receiving terminal 220 continues to move, the receiving terminal 220 moves from the receivable area 240 to the non-receivable area 250 with respect to the packet transmitted by the transmitting terminal 210. A phenomenon in which the receiving terminal 220 does not receive a packet from the transmitting terminal 210 and then receives a packet from the transmitting terminal 210 may occur due to the mobility of the transmitting terminal 210 or the receiving terminal 220, but may also occur due to an operation the receiving terminal 220 starts as necessary while not receiving a packet.

Figure 3:
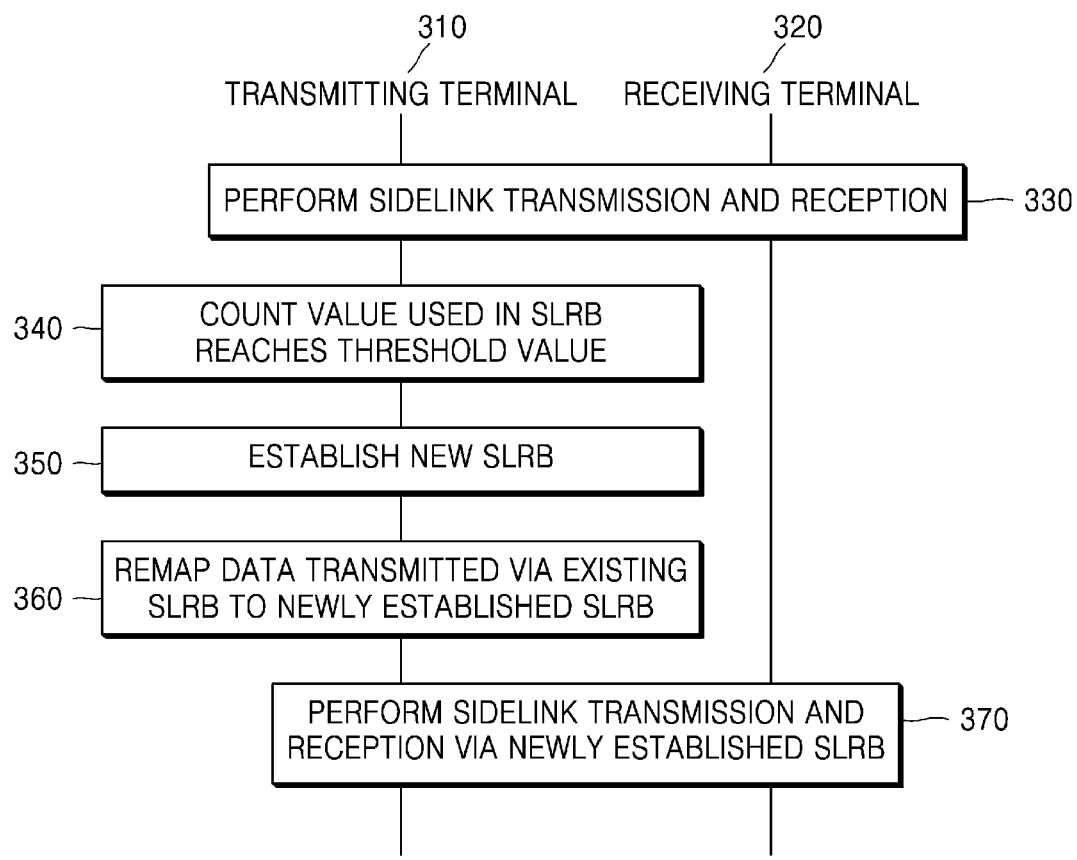
FIG. 3 is a diagram illustrating a method of reconfiguring a sidelink radio bearer, according to an embodiment of the present disclosure.

FIG. 3 is a diagram illustrating a method of reconfiguring a SLRB, according to an embodiment of the present disclosure.

In operation 330, two V2X terminals 310 and 320 may perform sidelink transmission and reception through a SLRB. The configuration of the SLRB may be set through a setup message transmitted by a base station, may be set by a system information message of the base station, or may be preset by a terminal. While the two V2X terminals 310 and 320 perform transmission and reception through the SLRB, when a count value assigned to each packet reaches a maximum value, the SLRB is unable to transmit a new packet. To prevent this, when the count value reaches the maximum value or a value close to the maximum value, a new SLRB is established and data of the existing SLRB may be moved to the new SLRB. The count value may be used when indicating a status variable value in a packet data convergence protocol (PDCP) layer, etc., or may be used when using packet encryption and decryption keys, and may include a combination of a PDCP sequence number and a hyper frame number (HFN).

In operation 340, when sidelink transmission and reception is being performed, a count value used in a certain SLRB may reach or exceed a preset threshold value. The count value used in the SLRB may be a TX_NEXT value, which is the status variable value of the PDCP layer, or may be a value obtained by subtracting 1 from TX_NEXT. The threshold value used may be a value set by pre-configuration, a value set by the base station through a RRC configuration message, a value transmitted by being included in a system information message, or a value preset by the terminal.

At this time, when the count value used in the SLRB reaches or exceeds a preset threshold value, data transmitted via the corresponding SLRB needs to be transmitted via another radio bearer. In operation 350, the transmitting terminal 310 may establish a new SLRB for this purpose. Because the new SLRB may transmit the same data as the existing SLRB, the same SLRB configuration, radio link control (RLC), medium access control (MAC) parameters, and timer setting may be used.

In operation 360, a QoS flow (QF) transmitted via the existing SLRB may be remapped to the newly established SLRB. Because the QoS flow transmitted via the existing SLRB is transmitted via the new SLRB, the receiving terminal 320 may recognize that the SLRB remapping of the QoS flow has occurred. In this case, the existing SLRB and the newly established SLRB may have different SLRB identifiers (IDs) from each other.

In operation 370, the transmitting terminal 310 and the receiving terminal 320 may transmit data, which has been transmitted via the existing SLRB, via the newly established SLRB. In the embodiment of FIG. 3, because data is transmitted via the new SLRB, a security key that is different from a security key used by the existing SLRB may be used. In order to notify the receiving terminal 320 that transmission of a specific QoS flow via the existing SLRB is completed, the transmitting terminal 310 may transmit an end marker packet after the corresponding QoS flow is transmitted via the existing SLRB. When the receiving terminal 320 receives the end marker packet, the receiving terminal 320 may know that the data of the QoS flow is no longer transmitted via the corresponding SLRB.

On the other hand, according to an embodiment of the present disclosure, instead of operation 350 of establishing the new sidelink, the corresponding SLRB may be released and a SLRB having the same SLRB ID may be established. In this case, the data transmitted via the existing SLRB may be continuously transmitted via the SLRB having the same SLRB ID. Also, according to an embodiment of the present disclosure, the transmitting terminal 310 may transmit the release of the existing SLRB and the establishment of the new SLRB to the receiving terminal 320 through a PC5 RRC message.

In addition, according to an embodiment of the present disclosure, the transmitting terminal 310 may transmit the packet of the QoS flow via the new SLRB after transmission of all packets of the QoS flow transmitted via the existing SLRB is completed. In this manner, the receiving terminal 320 may perform in-order delivery.

Figure 4:
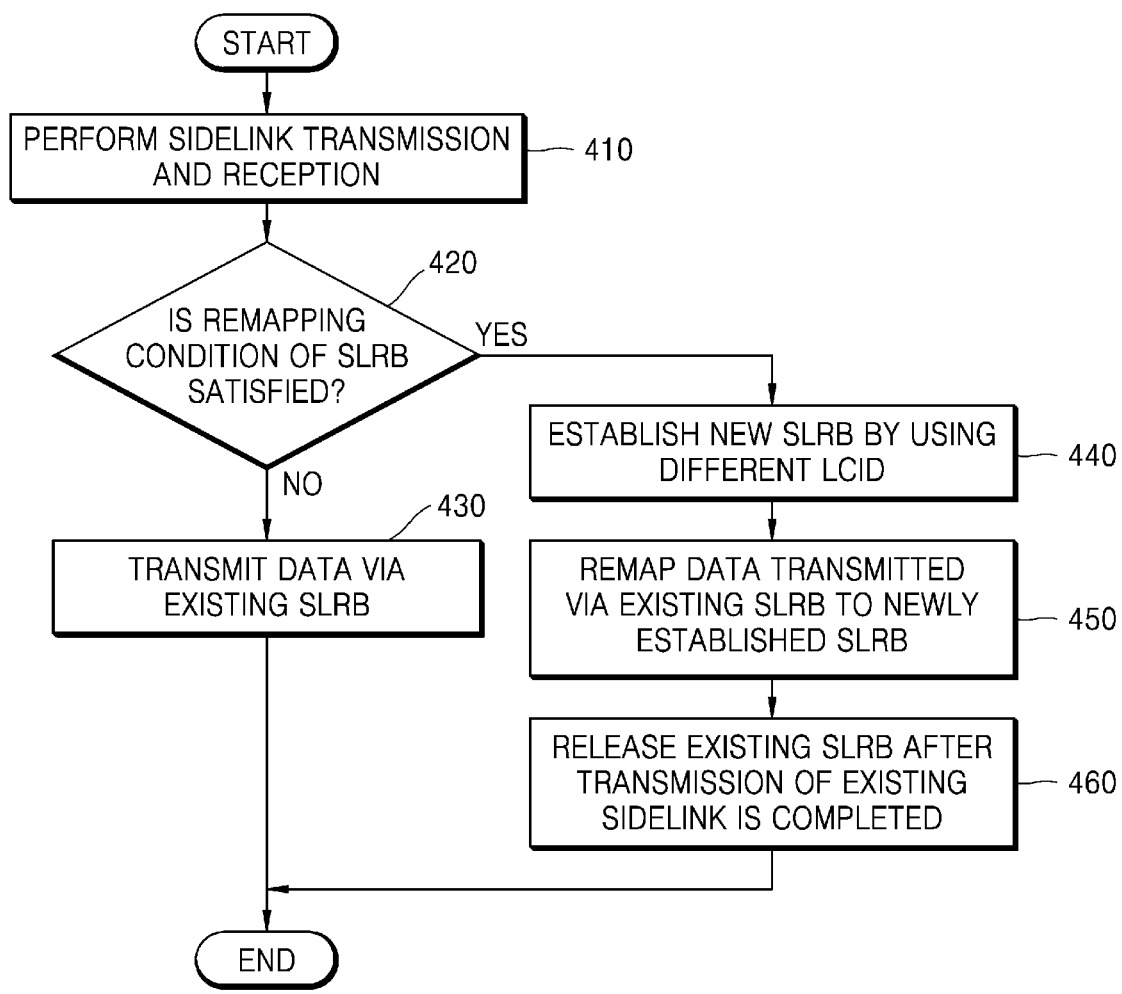
FIG. 4 is a diagram illustrating a method of reconfiguring a sidelink radio bearer, according to an embodiment of the present disclosure.

FIG. 4 is a diagram illustrating a method of reconfiguring a SLRB, according to an embodiment of the present disclosure.

In operation 410, a V2X terminal may perform sidelink transmission and reception through a SLRB. The configuration of the SLRB may be performed through a setup message transmitted by a base station, may be performed according to setting based on a system information message of the base station, or may be performed by pre-configuration of a terminal. In operation 420, while performing the transmission and reception via the SLRB, the transmitting terminal may determine whether the remapping condition of the SLRB is satisfied. The remapping condition of the SLRB may be one of the following conditions.

A case where a count value allocated to a generated packet reaches a specific threshold value (or exceeds a threshold value)

A case where a TX_NEXT value reaches a specific threshold value (or exceeds a threshold value)

A case where a value obtained by subtracting 1 from TX_NEXT reaches a specific threshold value (or exceeds a threshold value)

A case where a count value allocated to a generated packet reaches a maximum count value (or exceeds a threshold value)

In operation 430, when the remapping condition of the SLRB is not satisfied, there is no problem in the transmission and reception operation of the existing SLRB, and thus, the generated data may be transmitted via the existing SLRB. However, when the remapping condition of the SLRB is satisfied, data has to be transmitted via a new SLRB.

In operation 440, the V2X terminal may establish a new SLRB by using a different logical channel ID. The new SLRB refers to a bearer having a different SLRB ID.

When the new SLRB has been established, a QoS flow for data transmitted via the existing SLRB may be remapped to the newly established SLRB in operation 450. According to an embodiment of the present disclosure, when the remapping is performed, the transmitting terminal may transmit an end marker packet after the last data of the QoS flow transmitted via the existing SLRB, so as to notify the receiving terminal that the corresponding QoS flow is no longer transmitted via the existing SLRB. In operation 460, when data transmission via the existing SLRB is completed and there are no more QoS flows to be transmitted by the SLRB, the existing SLRB may be released.

Figure 5:
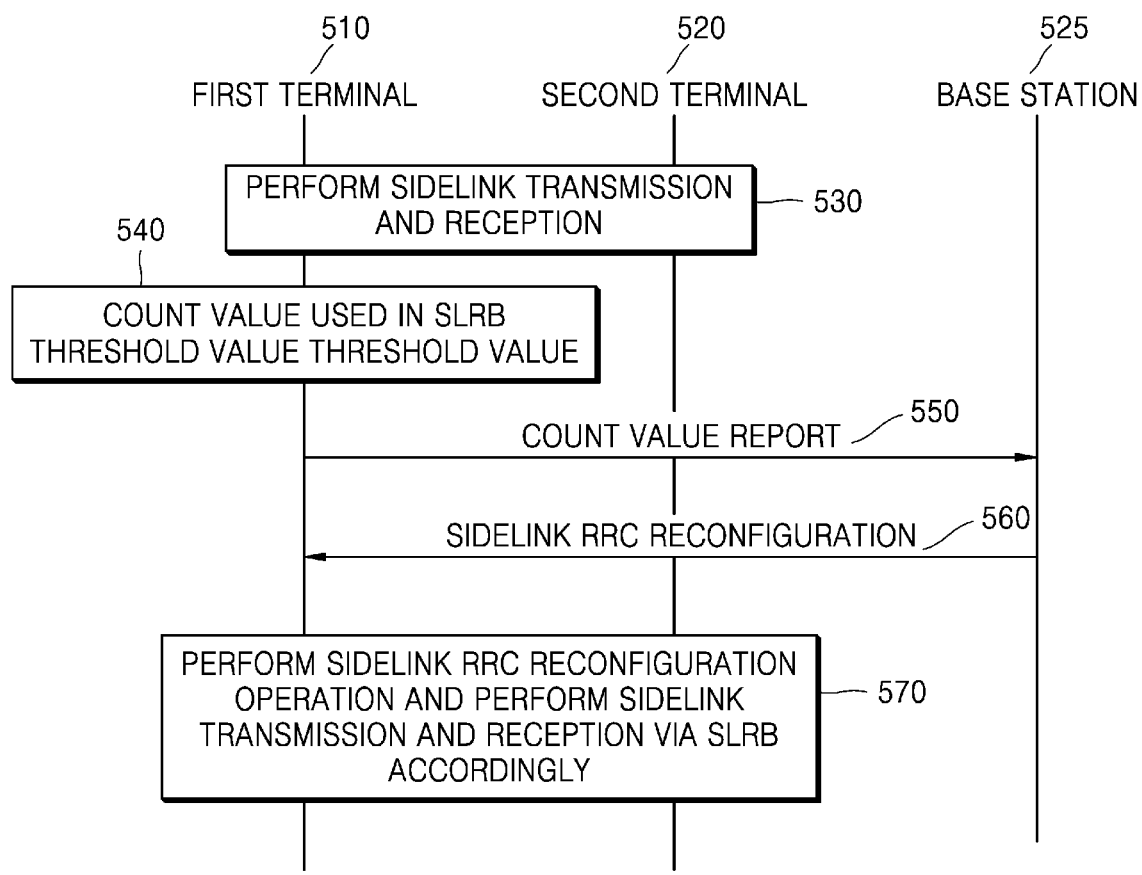
FIG. 5 is a diagram illustrating a method of reconfiguring a sidelink radio bearer, according to an embodiment of the present disclosure.

FIG. 5 is a diagram illustrating a method of reconfiguring a SLRB, according to an embodiment of the present disclosure.

In operation 530, a first terminal 510 and a second terminal 520 may perform sidelink transmission and reception through a SLRB. The configuration of the SLRB may be performed through a setup message transmitted by a base station 525, may be performed according to setting based on a system information message of the base station 525, or may be performed by pre-configuration of the V2X terminals 510 and 520. While transmission and reception is performed through the SLRB, when a count value assigned to each packet reaches a maximum value, the corresponding SLRB is unable to transmit new packets. To prevent this, when the count value reaches the maximum value or a value close to the maximum value, a new SLRB is established and the first terminal 510 may move data of the existing SLRB to the new SLRB. The count value may be used when indicating a status variable value in a packet data convergence protocol (PDCP) layer, etc., or may be used when using packet encryption and decryption keys, and may include a combination of a PDCP sequence number and a hyper frame number (HFN). In the embodiment of FIG. 5, it is assumed that sidelink transmission and reception occurs between the terminals 510 and 520, but the basic configuration of the SLRB is set by the base station 525. In such an environment, it may be necessary for the terminals 510 and 520 to transmit the count value used in the SLRB to the base station 525.

In operation 540, while sidelink transmission and reception is performed, a count value used in a certain SLRB may reach a preset threshold value (or may exceed a threshold value). The count value used in the SLRB may be a TX_NEXT value, which is a status variable value of a PDCP layer, or may be a value obtained by subtracting 1 from TX_NEXT. The threshold value used may be a value set by pre-configuration, a value set by the base station through a RRC configuration message, a value transmitted by being included in a system information message, or a value preset by the terminals 510 and 520.

At this time, when the count value used in the SLRB reaches or exceeds a preset threshold value, data transmitted via the corresponding SLRB needs to be transmitted via another radio bearer. In operation 550, the first terminal 510 may report the count value of the corresponding SLRB to the base station 525 so that the base station 525 establishes a new radio bearer. A count value report message may use a counter check response message format or a separate message. The count value report message may include a SLRB ID that indicates for which SLRB the count value is reported. Also, the count value report message may include a count value that is actually being used. Also, in order to indicate the count value of the transmitting terminal, the count value may be TX_NEXT or a value obtained by subtracting 1 from TX_NEXT. In addition, in order to indicate the count value of the receiving terminal, the count value may be RX_NEXT or a value obtained by subtracting 1 from RX_NEXT.

The count value report message may include count values of all SLRBs configured for the first terminal 510 that transmits the count value report message. The SLRB ID may be used to identify to which SLRB each count value corresponds. When the first terminal 510 transmits the count value of the SLRB by using the counter check response message format, a count value of a data radio bearer (DRB) may also be transmitted. A DRB ID may be used to identify to which DRB the count value corresponds. On the other hand, only the count value that has reached a certain threshold value in operation 540 may be transmitted. According to another embodiment, in addition to the count value of each SLRB, only a most significant bit (MSB) value or a least significant bit (LSB) value of the count may be transmitted.

In operation 560, after receiving the count value report message, the base station 525 may transmit a sidelink RRC reconfiguration message to at least one of the terminals 510 and 520 that perform sidelink transmission and reception, so as to solve a problem of a high count value. At this time, the base station 525 may establish a SLRB to the terminals 510 and 520 and may allow the newly established SLRB to transmit the QoS flow having been transmitted from the SLRB having a high count value. In this case, the newly established SLRB may have the same SLRB configuration as the existing SLRB. Because the QoS flow transmitted via the existing SLRB is transmitted via the newly established SLRB, the terminal receiving data may determine that the remapping of the QoS flow has occurred. Also, the terminal may have the configuration of the SLRB corresponding thereto.

On the other hand, according to an embodiment of the present disclosure, after operation 560, the first terminal 510 may transmit, to the second terminal 520, information about all or part of the sidelink RRC reconfiguration message received from the base station 525 by using a PC5 RRC message. Also, in the sidelink RRC configuration message, the QoS flow having been transmitted may be continuously transmitted by adding a new SLRB after releasing the same SLRB. Also, in another embodiment, a security key of the SLRB may be refreshed in the sidelink RRC reconfiguration message.

In operation 570, the terminals 510 and 520 that perform sidelink transmission and reception may perform a sidelink RRC reconfiguration operation and may perform sidelink transmission and reception via the SLRB accordingly.

Figure 6:
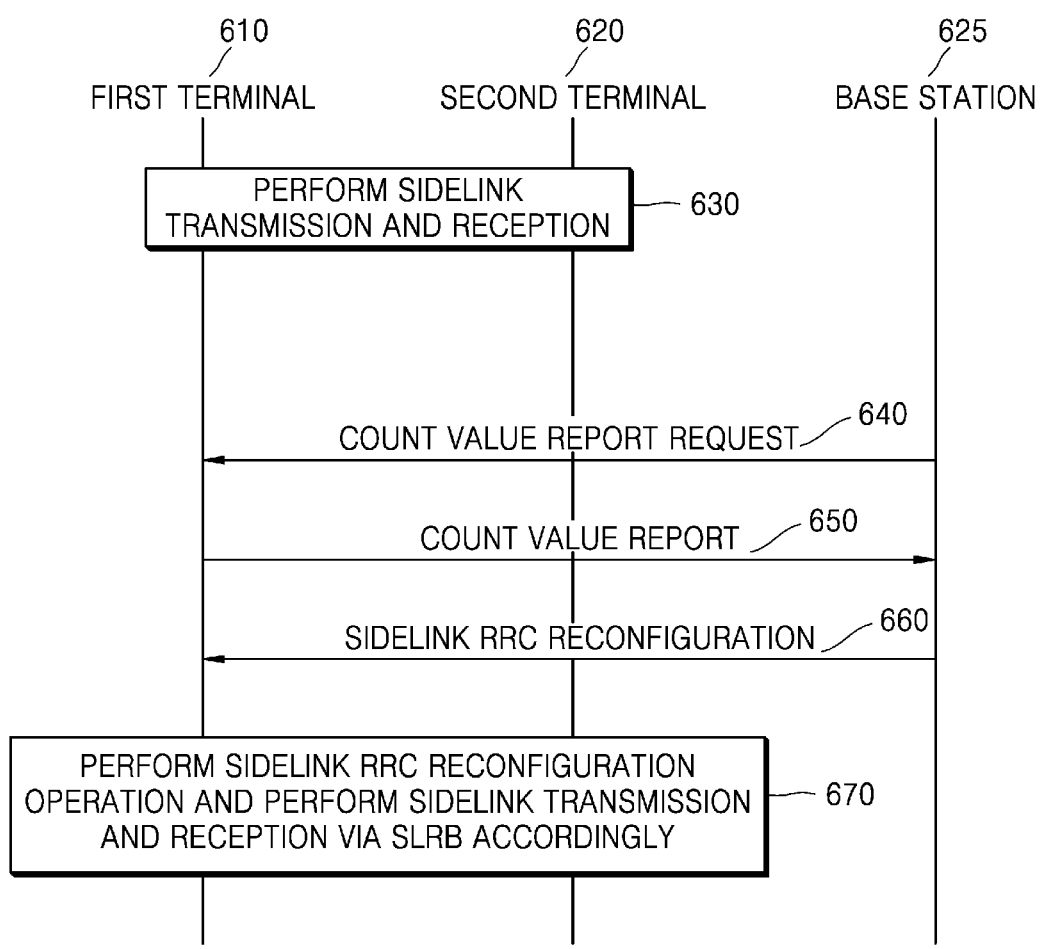
FIG. 6 is a diagram illustrating a method of reconfiguring a sidelink radio bearer, according to an embodiment of the present disclosure.

FIG. 6 is a diagram illustrating a method of reconfiguring a SLRB, according to an embodiment of the present disclosure.

In operation 630, terminals 610 and 620 may perform sidelink transmission and reception through a SLRB. The configuration of the SLRB may be performed through a setup message transmitted by a base station 625, may be performed according to setting based on a system information message of the base station 625, or may be performed by pre-configuration of the terminals 610 and 620. While transmission and reception is performed through the SLRB, when a count value assigned to each packet reaches a maximum value, the corresponding SLRB is unable to transmit new packets. To prevent this, when the count value reaches the maximum value or a value close to the maximum value, the first terminal 610 or the second terminal 620 may establish a new SLRB and move data of the existing SLRB to the new SLRB. The count value may be used when indicating a status variable value in a packet data convergence protocol (PDCP) layer, etc., or may be used when using packet encryption and decryption keys, and may include a combination of a PDCP sequence number and a hyper frame number (HFN). In the embodiment of FIG. 6, it is assumed that sidelink transmission and reception occurs between the terminals 610 and 620, but the basic configuration of the SLRB is set by the base station 625. Under such an environment, the base station 625 may identify the count value used in the sidelink to the first terminal 610 or the second terminal 620. In this case, the first terminal 610 or the second terminal 620 may need to perform an operation of transmitting the count value used in the SLRB to the base station 625.

For convenience of description, FIG. 6 illustrates that operations 640 to 660 are performed between the first terminal 610 and the base station 625, but it is apparent that operations 640 to 660 may be performed by either the first terminal 610 or the second terminal 620. That is, the first terminal 610 or the second terminal 620 is a V2X terminal and may be a transmitting terminal or a receiving terminal, respectively. Therefore, for convenience of description, the first terminal 610 will be described as performing the operation, but it is apparent that the operation may be performed by either the first terminal 610 or the second terminal 620. When sidelink transmission and reception is being performed, the base station 625 needs to identify a count value used in a certain SLRB. In operation 640, the base station 625 may transmit a count value request message to the first terminal 610. The base station 625 may transmit, to the first terminal 610, a threshold value of a count value used in a SLRB or a MSB value of the threshold value of the count value. The threshold value of the count value used in the SLRB may be a TX_NEXT value, which is a status variable value of a PDCP layer, or may be a value obtained by subtracting 1 from TX_NEXT. When the threshold value of the count value or the MSB value of the threshold value of the count value is not included in the count value request message, the first terminal 610 may use a preset value. The preset value may be a value set when the SLRB is configured, a value set by a system information block, or a value set by pre-configuration of the first terminal 610. Also, according to an embodiment, reporting of only a count value of a DRB may be requested through a count value report request message. In this case, the count value of the SLRB may not be reported. On the other hand, according to an embodiment, reporting of only the count value of the SLRB may be requested through the count value report request message. In this case, only the count value of the SLRB may be reported, and the count value of the DRB may not be reported.

In operation 650, when the first terminal 610 receives the count value report request message for the SLRB, the first terminal 610 may report the count value used in the SLRB to the base station 625 through the count value report message for the SLRB. In this manner, the base station 625 may establish a new radio bearer as necessary. The count value report message may use the form of a counter check response message, or may use a separate message. The count value report message may include a SLRB ID that indicates for which SLRB the count value is reported. Also, the count value report message may include a count value that is actually being used. According to an embodiment, in order to indicate the count value of the transmitting terminal, the count value may be TX_NEXT or a value obtained by subtracting 1 from TX_NEXT. In addition, in order to indicate the count value of the receiving terminal, the count value may be RX_NEXT or a value obtained by subtracting 1 from RX_NEXT.

The count value report message may include count values of all SLRBs configured for the first terminal 610 that transmits the count value report message. The SLRB ID may be used to identify to which SLRB each count value corresponds. When the count value of the SLRB is transmitted by using the counter check response message format, the count value of the DRB may also be transmitted. At this time, a DRB ID may be used to identify to which DRB the count value corresponds.

On the other hand, according to an embodiment, only a count value that reaches or exceeds a certain threshold value among the count values may be transmitted in operation 640. The count value of the SLRB which does not reach the count value indicated by the threshold value or the MSB of the count value received in the count value report request message may not be transmitted. Also, in operation 640, the count value of the SLRB to which the count value or the MSB of the count value is not transmitted may be transmitted. In addition, in operation 650, when the count value or the MSB of the count value is transmitted, but the corresponding SLRB is not configured, the count value may be transmitted by including the count value received in operation 640 in the count value as it is or including the received MSB value as it is and then setting the LSB value to 0. According to another embodiment, in addition to the count value of each SLRB, only a MSB value or a LSB value of the count may be transmitted.

In operation 660, after receiving the count value report message, the base station 625 may transmit a sidelink RRC reconfiguration message to at least one of the first terminal 610 or the second terminal 620 that performs sidelink transmission and reception, so as to solve a problem of a high count value. At this time, the base station 625 may establish a SLRB to the first terminal 610 or the second terminal 620 and may allow the newly established SLRB to transmit the QoS flow having been transmitted from the SLRB having a high count value. The newly established SLRB may have the same SLRB configuration as the existing SLRB. Because the QoS flow transmitted via the existing SLRB is transmitted via the newly established SLRB, the terminal receiving data may determine that the remapping of the QoS flow has occurred. In this case, the receiving terminal may have the corresponding SLRB configuration.

On the other hand, according to an embodiment, after operation 660, the first terminal 610 may transmit, to the second terminal 620, information about all or part of the sidelink RRC reconfiguration message received from the base station 625 by using a PC5 RRC message. Also, in the sidelink RRC configuration message, the QoS flow having been transmitted may be continuously transmitted by adding a new SLRB after releasing the same SLRB. According to an embodiment, a security key of the SLRB may be refreshed in the sidelink RRC reconfiguration message.

In operation 670, the terminals 610 and 620 that perform sidelink transmission and reception may perform a sidelink RRC reconfiguration operation and may perform sidelink transmission and reception via the SLRB accordingly.

Figure 7:
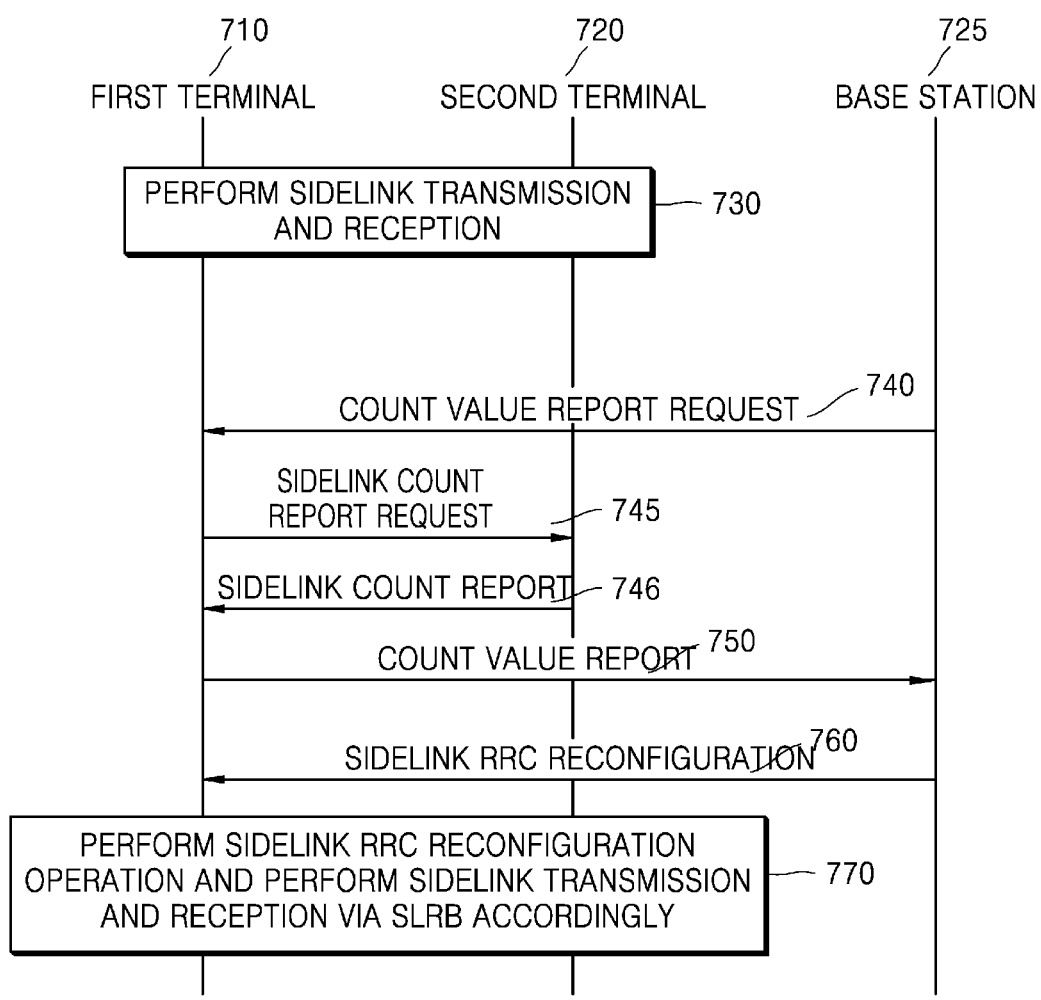
FIG. 7 is a diagram illustrating a method of reconfiguring a sidelink radio bearer, according to an embodiment of the present disclosure.

FIG. 7 is a diagram illustrating a method of reconfiguring a SLRB, according to an embodiment of the present disclosure.

In operation 730, terminals 710 and 720 may perform sidelink transmission and reception through a SLRB. The configuration of the SLRB may be performed through a setup message transmitted by a base station 725, may be performed according to setting based on a system information message of the base station 725, or may be performed by pre-configuration of the terminals 710 and 720. While transmission and reception is performed through the SLRB, when a count value assigned to each packet reaches a maximum value, the corresponding SLRB is unable to transmit new packets. To prevent this, when the count value reaches the maximum value or a value close to the maximum value, the terminals 710 and 720 may establish a new SLRB and may move data of the existing SLRB to the new SLRB. The count value may be used when indicating a status variable value in a packet data convergence protocol (PDCP) layer, etc., or may be used when using packet encryption and decryption keys, and may include a combination of a PDCP sequence number and a hyper frame number (HFN).

In the embodiment of FIG. 7, it is assumed that sidelink transmission and reception occurs between the terminals 710 and 720, but the basic configuration of the SLRB is set by the base station 725. Under such an environment, the base station 725 may identify the count value used in the sidelink to the terminals 710 and 720, and the terminals 710 and 720 may need to perform an operation of transmitting the count value used in the SLRB to the base station 725. Because sidelink transmission and reception is an operation that occurs between the two terminals 710 and 720, it is necessary to identify both the count values of the two terminals 710 and 720. The count value may be a count value of each transmitting terminal. That is, each of the terminals 710 and 720 may be a transmitting terminal.

In operation 740, when sidelink transmission and reception is being performed, the base station 725 needs to identify a count value used in a certain SLRB. To this end, the base station 725 may transmit a count value request message to the first terminal 710. For convenience of description, it has been described that the base station 725 transmits the count value request message to the first terminal 710, the base station 725 may transmit the count value request message to at least one of the first terminal 710 or the second terminal 720.

The base station 725 may transmit, to the terminals 710 and 720, a threshold value of a count value used in a SLRB or a MSB value of the threshold value of the count value. The threshold value of the count value used in the SLRB may be a TX_NEXT value, which is a status variable value of a PDCP layer, or may be a value obtained by subtracting 1 from TX_NEXT. When the threshold value of the count value or the MSB value of the threshold value of the count value is not transmitted, the terminals 710 and 720 may use a preset value. The preset value may be a value set when the SLRB is configured, a value set by a system information block, or a value set by pre-configuration of the terminals 710 and 720. In an embodiment, the count value report request message may be requested to report only the count value of the DRB. In this case, the count value of the SLRB may not be reported. In contrast, in another embodiment, the count value report request message may be requested to report only the count value of the SLRB. In this case, only the count value of the SLRB may be reported, and the count value of the DRB may not be reported.

In operation 745, when the first terminal 710 receives the count value report request message for the SLRB, the first terminal 710 may transmit, to the second terminal 720 performing sidelink transmission and reception, a sidelink count report request message for requesting information about the count value used in the SLRB. The base station 725 may transmit, to the first terminal 710, a count value used in a SLRB, a MSB value of the count value, a threshold value of the count value, or a MSB value of the threshold value of the count value. The threshold value of the count value used in the SLRB may be a TX_NEXT value, which is a status variable value of a PDCP layer, a value obtained by subtracting 1 from TX_NEXT, a RX_NEXT value, or a value obtained by subtracting 1 from RX_NEXT. The SLRB through which the first terminal 710 performs transmission may use the TX_NEXT value or the value obtained by subtracting 1 from TX_NEXT. Also, the SLRB through which the first terminal 710 performs reception may use the RX_NEXT value or the value obtained by subtracting 1 from RX_NEXT. On the other hand, according to an embodiment, the first terminal 710 may transmit, to the second terminal 720, the ID value of the SLRB requesting the report of the count value, so as to request the second terminal 720 to transmit the count value of the SLRB.

In operation 746, when the second terminal 720 receives the count value report request message for the SLRB, the second terminal 720 may report the count value used in the SLRB to the first terminal 710 through the count value report message for the SLRB. In this manner, the first terminal 710 may know the count value of the SLRB used by the second terminal 720. The count value report message may include a SLRB ID that indicates a count value of a SLRB to be reported. Also, the count value report message may include a count value that is actually being used. According to an embodiment, in order to indicate the count value of the transmitting terminal, the count value may be TX_NEXT or a value obtained by subtracting 1 from TX_NEXT. In addition, in order to indicate the count value of the receiving terminal, the count value may be RX_NEXT or a value obtained by subtracting 1 from RX_NEXT.

The count value report message may include count values of all SLRBs configured for the second terminal 720 that transmits the count value report message. The SLRB ID may be used to identify to which SLRB each count value corresponds. On the other hand, according to an embodiment, only a count value that reaches or exceeds a certain threshold value may be transmitted. The count value of the SLRB which does not reach the count value indicated by the threshold value or the MSB of the count value received in the count value report request message may not be transmitted. Also, in operation 745, the count value of the SLRB to which the count value or the MSB of the count value is not transmitted may be transmitted. In addition, in operation 745, when the count value or the MSB of the count value is transmitted, but the corresponding SLRB is not configured, the count value may be transmitted by including the count value received in operation 745 in the count value as it is or using the received MSB value as it is and then setting the LSB value to 0. However, when there is a MSB value of a count value that is different from the MSB received in operation 745, the count value of the corresponding SLRB may be reported to the first terminal 710. According to another embodiment, in addition to the count value of each SLRB, only a MSB value or a LSB value of the count may be transmitted.

In operation 750, the first terminal 710 may report, to the base station 725, all or part of information included in a sidelink count report message received from the second terminal 720. In this case, the count value of the SLRB being performed by the first terminal 710 may be reported. In this manner, the base station 725 may cause the first terminal 710 or the second terminal 720 to establish a new radio bearer as necessary. The count value report message may use a counter check response message form, or may use a separate message. The count value report message may include a SLRB ID that indicates a count value of a SLRB to be reported. Also, the count value report message may include a count value that is actually being used. According to an embodiment, in order to indicate the count value of the transmitting terminal, the count value may be TX_NEXT or a value obtained by subtracting 1 from TX_NEXT. In addition, in order to indicate the count value of the receiving terminal, the count value may be RX_NEXT or a value obtained by subtracting 1 from RX_NEXT. In addition, the count value may include the count value of the SLRB received from the second terminal 720 in operation 746.

The count value report message may include count values of all SLRBs configured for the first terminal 710 that transmits the count value report message. The SLRB ID may be used to identify to which SLRB each count value corresponds. When the count value of the SLRB is transmitted by using the counter check response message format, the count value of the DRB may also be transmitted. At this time, a DRB ID may be used to identify to which DRB the count value corresponds. On the other hand, according to an embodiment, only a count value that reaches or exceeds a certain threshold value may be transmitted. The count value of the SLRB which does not reach the count value indicated by the threshold value or the MSB of the count value received in the count value report request message may not be transmitted. The count value report message may be transmitted by including the count value of the SLRB to which the count value or the MSB of the count value is not transmitted. In addition, in operation 740, when the count value or the MSB of the count value is transmitted, but the corresponding SLRB is not configured, the count value may be transmitted by including the count value received in operation 740 in the count value report message as it is or including the received MSB value as it is and then setting the LSB value to 0. According to another embodiment, in addition to the count value of each SLRB, only a MSB value or a LSB value of the count may be transmitted.

In operation 760, after receiving the count value report message, the base station 725 may transmit a sidelink RRC reconfiguration message to at least one of the terminals that perform sidelink transmission and reception, so as to solve a problem of a high count value. At this time, the base station 725 may establish a SLRB to the terminals 710 and 720 and may allow the newly established SLRB to transmit the QoS flow having been transmitted from the SLRB having a high count value. In this case, the newly established SLRB may have the same SLRB configuration as the existing SLRB. Because the QoS flow transmitted via the existing SLRB is transmitted via the newly established SLRB, the terminal receiving data may determine that the remapping of the QoS flow has occurred. In this case, the receiving terminal may have the corresponding SLRB configuration.

On the other hand, according to an embodiment, after operation 760, the first terminal 710 may transmit, to the second terminal 720, information about all or part of the sidelink RRC reconfiguration message received from the base station 725 by using a PC5 RRC message. Also, in the sidelink RRC configuration message, the QoS flow having been transmitted may be continuously transmitted by adding a new SLRB after releasing the same SLRB. According to an embodiment, a security key of the SLRB may be refreshed in the sidelink RRC reconfiguration message.

In operation 770, the terminals 710 and 720 that perform sidelink transmission and reception may perform a sidelink RRC reconfiguration operation and may perform sidelink transmission and reception via the SLRB accordingly.

Figure 8:
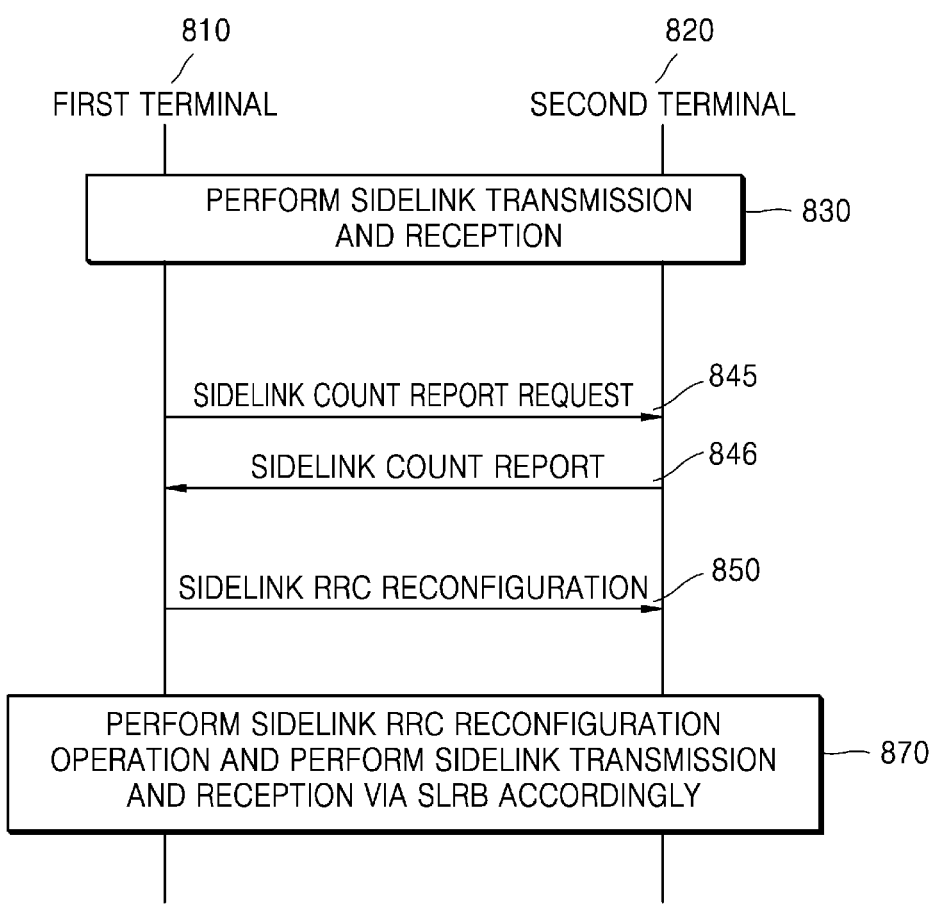
FIG. 8 is a diagram illustrating a method of reconfiguring a sidelink radio bearer, according to an embodiment of the present disclosure.

FIG. 8 is a diagram illustrating a method of reconfiguring a SLRB, according to an embodiment of the present disclosure.

In operation 830, V2X terminals 810 and 820 may perform sidelink transmission and reception through a SLRB. The configuration of the SLRB may be performed through a setup message transmitted by a base station, may be performed according to setting based on a system information message of the base station, or may be performed by pre-configuration of a terminal. While transmission and reception is performed through the SLRB, when a count value assigned to each packet reaches a maximum value, the corresponding SLRB is unable to transmit new packets. To prevent this, when the count value reaches the maximum value or a value close to the maximum value, a new SLRB is established and data of the existing SLRB may be moved to the new SLRB. The count value may be used when indicating a status variable value in a packet data convergence protocol (PDCP) layer, etc., or may be used when using packet encryption and decryption keys, and may include a combination of a PDCP sequence number and a hyper frame number (HFN). In the embodiment of FIG. 8, it is assumed that sidelink transmission and reception is configured between the terminals 810 and 820. Under such an environment, it may be necessary to identify the count value used in the sidelink between the terminals 810 and 820. In addition, it may be necessary to determine whether the count values used by the terminals 810 and 820 performing sidelink communication match each other, so as to determine whether the mismatch between the count values of the transmitting terminal and the receiving terminal occurs due to security attack or the like.

When sidelink transmission and reception is being performed, one first terminal 810 needs to identify the count value used in the sidelink radio bearer. In operation 845, the first terminal 810 may transmit, to the second terminal 820 performing sidelink transmission and reception, a sidelink count report request message for requesting information about the count value used in the SLRB. The count value used in the SLRB, a MSB value of the count value, a threshold value of the count value, or a MSB value of the threshold value of the count value may be transmitted to the second terminal 820 by being included in the count report request message. The threshold value of the count value used in the SLRB may be a TX_NEXT value, which is a status variable value of a PDCP layer, a value obtained by subtracting 1 from TX_NEXT, a RX_NEXT value, or a value obtained by subtracting 1 from RX_NEXT. The SLRB through which the first terminal 810 performs transmission may use the TX_NEXT value or the value obtained by subtracting 1 from TX_NEXT, and the SLRB through which the first terminal 810 performs reception may use the RX_NEXT value or the value obtained by subtracting 1 from RX_NEXT. Also, according to an embodiment, the second terminal 820 may be requested to transmit the count value of the SLRB by including only the SLRB ID value requesting the report of the count value in the count report request message.

When the second terminal 820 receives the count value report request message for the SLRB in operation 845, the second terminal 820 may report the count value used in the SLRB to the first terminal 810 through the count value report message for the SLRB in operation 846. In this manner, the first terminal 810 may know the count value of the SLRB used by the second terminal 820. The count value report message may include a SLRB ID that indicates a count value of a SLRB to be reported. Also, the count value report message may include a count value that is actually being used. In order to indicate the count value of the transmitting terminal, the count value may be RX_NEXT or a value obtained by subtracting 1 from RX_NEXT. In addition, in order to indicate the count value of the receiving terminal, the count value may be RX_NEXT or a value obtained by subtracting 1 from RX_NEXT.

The count value report message may include count values of all SLRBs configured for the terminal that transmits the count value report message. The SLRB ID may be used to identify to which SLRB each count value corresponds. Only a count value that reaches or exceeds a certain threshold value received in operation 845 may be transmitted. The count value of the SLRB which does not reach the count value indicated by the threshold value or the MSB of the count value received in the count value report request message may not be included. In operation 845, the count value of the SLRB to which the count value or the MSB of the count value is not transmitted may be transmitted. In addition, in operation 845, when the count value or the MSB of the count value is transmitted, but the corresponding SLRB is not configured, the count value may be transmitted by including the count value received in operation 845 in the count value as it is or using the received MSB value as it is and then setting the LSB value to 0. On the other hand, when there is a MSB value of a count value that is different from the MSB received in operation 845, the count value of the SLRB may be reported to the first terminal 810. According to another embodiment, in addition to the count value of each SLRB, only a MSB value or a LSB value of the count may be transmitted.

In operation 860, after receiving the count value report message, the first terminal 810 may transmit a sidelink RRC reconfiguration message to the second terminal 820, so as to solve a problem of a high count value. At this time, the first terminal 810 may establish a SLRB and may allow the newly established SLRB to transmit the QoS flow having been transmitted from the SLRB having a high count value. In this case, the newly established SLRB may have the same SLRB configuration as the existing SLRB. Because the QoS flow transmitted via the existing SLRB is transmitted via the newly established SLRB, the terminal receiving data may determine that the remapping of the QoS flow has occurred. Also, the receiving terminal may have the configuration of the SLRB corresponding thereto. Also, in the sidelink RRC configuration message, the QoS flow having been transmitted may be continuously transmitted by adding a new SLRB after releasing the same SLRB. Also, according to an embodiment, a security key of the SLRB may be refreshed in the sidelink RRC reconfiguration message.

In operation 870, the terminals 810 and 820 that perform sidelink transmission and reception may perform a sidelink RRC reconfiguration operation and may perform sidelink transmission and reception via the SLRB accordingly.

Figure 9:
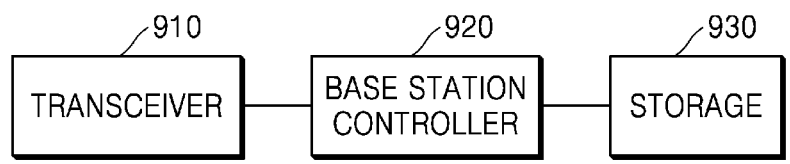
FIG. 9 is a block diagram illustrating a structure of a base station, according to an embodiment of the present disclosure.

FIG. 9 is a block diagram illustrating a structure of a base station, according to an embodiment of the present disclosure.

Referring to FIG. 9, the base station may include a transceiver 910, a controller 920, and a storage 930. In the present disclosure, the controller 920 may be defined as a circuit, an application-specific integrated circuit, or at least one processor.

The transceiver 910 may transmit and receive signals to and from other network entities. The transceiver 910 may transmit, for example, system information to a terminal, and may transmit a synchronization signal or a reference signal.

The controller 920 may control overall operations of the base station according to the embodiment proposed in the present disclosure. For example, the controller 920 may control a signal flow between blocks in order to perform the operations according to the flowcharts described above.

The storage 930 may store information transmitted and received through the transceiver 910 and/or information generated through the controller 920.

Figure 10:
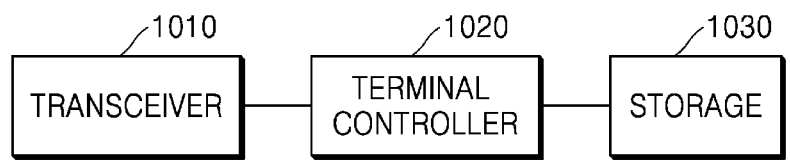
FIG. 10 is a block diagram illustrating a structure of a terminal, according to an embodiment of the present disclosure.

FIG. 10 is a block diagram illustrating a structure of a terminal, according to an embodiment of the present disclosure.

Referring to FIG. 10, the terminal may include a transceiver 1010, a controller 1020, and a storage 1030. In the present disclosure, the controller may be defined as a circuit, an application-specific integrated circuit, or at least one processor.

The transceiver 1010 may transmit and receive signals to and from other network entities. The transceiver 1010 may receive, for example, system information from a base station, and may receive a synchronization signal or a reference signal.

The controller 1020 may control overall operations of the terminal according to the embodiment proposed in the present disclosure. For example, the controller 1020 may control a signal flow between blocks in order to perform the operations according to the flowcharts described above.

The storage 1030 may store information transmitted and received through the transceiver 1010 and/or information generated through the controller 1020.

When the terminal determines that the count value of the SLRB reaches the maximum value or a value close to the maximum value, a method, performed by the terminal, of reconfigure the SLRB (that is, deleting the existing SLRB and establishing the new SLRB) has been described with reference to FIGS. 3 and 4. When the count value reaches the maximum value or the value close to the maximum value, it may be determined that there is a possibility of occurrence of PDCP count wrap around. In this case, as described above, the terminal may reconfigure the SLRB. The terminal that reconfigures the SLRB according to the procedures of FIGS. 3 to 4 may report information about the reconfigured SLRB to the base station. The terminal that reports the information to the base station may correspond to a sidelink unicast transmitting terminal or receiving terminal. The information that the terminal reports to the base station may include [Table 1] below and may be transmitted through a SidelinkUEInformation message. Upon receiving the report of the reconfiguration of the SLRB, the base station may update the reported SLRB configuration information.

TABLE 1

```
SL-TxResourceReq-r16::=SEQUENCE {
    sl-DestinationIdentity-r16    SL-DestinationIdentity-r16,
    sl-CastType-r16    ENUVERATED {broadcast, groupcast, unicast, spare1},
    sl-QoS-InfoList-r16    SEQUENCE (SIZE (1..maxNrofSL-QFIsPerDest-r16)) OF SL-QoS-Info-r16    OPTIONAL,
    sl-RadioBearerToReleaseAddList-r16    SEQUENCE (SIZE (1..maxNrofSLRB-r16)) OF SLRB-Uu-ConfigIndex-r16 OPTIONAL,
    ...
}
SL-QoS-Info-r16 ::= SEQUENCE {
    sl-QoS-FlowIdentity-r16    SL-QoS-FlowIdentity-r16, // Sidelinkflow ID corresponding to SLRB ID
    sl-QoS-Profile-r16    SL-QoS-Profile-r16    OPTIONAL
}
   SLRB-Uu-ConfigIndex-r16 ::= INTEGER (1..maxNrofSLRB-r16) // Index of SLRB ID set by base station
```

As another embodiment of the present disclosure, the terminal may perform a full configuration procedure for the SLRB so as to prevent occurrence of a PDCP count wrap around situation, such as a situation in which the count value reaches the maximum value or the value close to the maximum value.

According to an embodiment of the present disclosure, in a case where the terminal determines that PDCP count wrap around may occur when the PDCP count value of the SLRB reaches the maximum value or the value close to the maximum value, the terminal may perform a full configuration procedure for initializing the configuration of the existing SLRB. In the case of sidelink unicast, the full configuration procedure for the SLRB which is performed between the transmitting terminal and the receiving terminal is as follows. The transmitting terminal may identify the information about the SLRB, the PDCP count value of which is determined as reaching the maximum value or the value close to the maximum value, and may transmit, to the receiving terminal, an RRCReconfigurationSidelink message indicating full configuration for the radio bearer. The indication information for the radio bearer may include at least one or a combination of a DST L2 ID, a cast type, a SLRB ID, a flow ID, or a fullConfig indicator.

TABLE 2

```
RRCReconfigurationSidelink-les-r16 ::= SEQUENCE {
        slrb-ConfigToAddModList-r16    SEQUENCE (SIZE (1..maxNrofSLRB-r16)) OF SLRB-Config-r16 OPTIONAL,
        slrb-ConfigToReleaseList-r16    SEQUENCE (SIZE (1..maxNrofSLRB-r16)) OF SLRB-PC5-ConfigIndex-r16    OPTIONAL,
        sl-MeasConfig-r16    SL-MeasConfig-r16 OPTIONAL,
        sl-CSI-RS-Config-r16    SL-CSI-RS-Config-r16 OPTIONAL,
        lateNonCriticalExtension                   OCTET STRING OPTIONAL,
        nonCriticalExtension    SEQUENCE { } OPTIONAL
        }
        SLRB-Config-r16 ::= SEQUENCE {
            slrb-PC5-ConfigIndex-r16    SLRB-PC5-ConfigIndex-r16,
            sl-fullConfig-r16          ENUMERATED { true } OPTIONAL, -- Cond
FullConfig
            sl-SDAP-ConfigPC5-r16    SL-SDAP-ConfigPC5-r16 OPTIONAL, -- Need N
            sl-PDCP-ConfigPC5-r16    SL-PDCP-ConfigPC5-r16 OPTIONAL, -- Need N
            sl-RLC-ConfigPC5-r16    SL-RLC-ConfigPC5-r16           OPTIONAL, -- Need N
            sl-MAC-LogicalChannelConfigPC5-r16    SL-LogicalChannelConfigPC5-r16
OPTIONAL, -- Need N
            ...
        }
```

Upon receiving the RRCReconfigurationSidelink message, the receiving terminal may identify the radio bearer to which the full configuration is indicated. The receiving terminal may transmit an RRCReconfigurationSidelink-Complete message to the transmitting terminal as a response. After receiving the RRCReconfigurationSidelink-Complete message, the transmitting terminal may perform a full configuration procedure for the SLRB. The receiving terminal may perform a full configuration procedure for the SLRB. The full configuration procedures that are performed by the transmitting terminal and the receiving terminal are as follows.

The terminal may delete a dedicated radio configuration maintained for the SLRB. In this case, an access stratum (AS) security configuration for a DST L2 ID, a cast type, a SRC L2 ID, and a PC5-RRC corresponding to the SLRB may be maintained without being deleted. Also, the terminal may perform the operation of [Table 3] below.

TABLE 3

1> apply the default L1 parameter values as specified in corresponding physical layer specifications except for the following:
   parameters for which values are provided in SIB1;
1> apply the default MAC configuration;
1> for each sl-srb (SRB reconfiguration):
   2> apply the SRB default configuration for the corresponding SRB for PC5-RRC;
1> for each sidelink flow that is part of the current UE configuration:
   2> release the SDAP entity;
   2> release each DRB associated to the sidelink flow;
1> for each sidelink flow that is part of the current UE configuration but not added with sane sidelink flow in the slrb-ToAddModList:
   2> indicate the release of the user plane resources for the sidelink flow to
    upper layers immediately if any;

The method, performed by the base station, of reconfiguring the SLRB (that is, deleting the existing SLRB and establishing the new SLRB) based on the count value information for the SLRB reported by the terminal in order to prevent PDCP count wrap around of the SLRB has been described with reference to FIGS. 5, 6, 7, and 8. In addition, according to another embodiment for preventing PDCP count wrap around of the SLRB, the base station may indicate the terminal to perform the full configuration procedure for the SLRB reported by the terminal. A message through which the base station indicates the terminal to perform the full configuration procedure for the SLRB may include an RRCReconfiguration message or a system information message. Also, the message indicating to perform the full configuration procedure for the SLRB may include SLRB information and fullConfig indicator information as in the RRCReconfigurationSidelink message of [Table 2].

Upon receiving, from the base station, the message indicating to perform the full configuration procedure for the SLRB, the terminal may delete the maintained dedicated radio configuration. In this case, an AS security configuration for a DST L2 ID, a cast type, a SRC L2 ID, and a PC5-RRC corresponding to the SLRB may be maintained without being deleted.

Also, the terminal may perform the operation of [Table 3] below. In the case of sidelink unicast, the transmitting terminal may transmit the RRCReconfigurationSidelink message of [Table 2] to the receiving terminal in order to notify the receiving terminal of performing the full configuration procedure for the SLRB.

According to another embodiment of the present disclosure, in order to prevent PDCP count wrap around of the SLRB, the terminal may transmit, to the base station, information necessary for the base station to indicate to perform SLRB reconfiguration or full configuration may be transmitted to the base station. Specifically, the terminal may transmit, to the base station, a reconfiguration request indicator or a full configuration request indicator for the SLRB. In a case where the terminal determines that there is a possibility of occurrence of PDCP count wrap around when the terminal determines that the PDCP count value is the maximum value or reaches a value close to the maximum value, the terminal may transmit, to the base station, a reconfiguration request or a full configuration request for the SLRB. The request message that the terminal transmits to the base station may include at least one or a combination of a target DST L2 ID, a cast type, and a SLRB identifier. Thereafter, the terminal may perform an operation of reconfiguration or full configuration processing for the SLRB according to the indication of the base station.

According to various embodiments of the present disclosure, a sidelink PDCP reconfiguration procedure may be introduced as a method of preventing PDCP count wrap around from occurring.

When the transmitting terminal determines that an upper layer (e.g., RRC) indicates to perform the sidelink PDCP reconfiguration procedure, the transmitting terminal may perform the following procedure on a sidelink signaling radio bearer (SRB).

The transmitting terminal may set TX_NEXT to an initial value with respect to the sidelink SRB.

The transmitting terminal may delete all stored PDCP service data units (SDUs) and PDCP protocol data units (PDUs) with respect to the sidelink SRB.

The transmitting terminal may apply an encryption algorithm and a security key provided by the upper layer during the PDCP reconfiguration procedure. During the PDCP reconfiguration procedure, an integrity algorithm and a security key provided by the upper layer may be applied.

After performing the procedure described above, the transmitting terminal may perform a corresponding data transmission procedure on the sidelink SRB.

When the receiving terminal determines that an upper layer (e.g., RRC) indicates to perform the sidelink PDCP reconfiguration procedure, the receiving terminal may perform the following procedure on the sidelink SRB.

The receiving terminal may process a PDCP data PDU received from a lower layer. The receiving terminal may delete all stored PDCP SDUs and PDCP PDUs with respect to the SRB. When t-Reordering is running, the t-Reordering is stopped and reset. The receiving terminal may set RX_NEXT and RX_DELIV to initial values with respect to the SRB.

During the PDCP reconfiguration procedure, an encryption algorithm and a security key provided by the upper layer may be applied. During the PDCP reconfiguration procedure, an integrity algorithm and a security key provided by the upper layer may be applied.

When the transmitting terminal determines that an upper layer (e.g., RRC) indicates to perform the PDCP reconfiguration procedure, the transmitting terminal may perform the following PDCP reconfiguration procedure on a sidelink unacknowledged mode (UM) DRB.

When slrb-ContinueROHC is not configured, a robust header compression (ROHC) protocol resets the application of a previously configured ROHC protocol and performs an initialization and refresh (IR) state of a U-mode (in accordance with RFC3095 and RFC4815).

The transmitting terminal sets TX_NEXT of the corresponding DRB to an initial value.

When a PDCP SN value is set for the PDCP SDU of the corresponding DRB but the PDU is not delivered to the lower layer, the transmitting terminal does not restart discardTimer and transmits PDCP SDUs in the order from a PDCP SDU having a small count value to a PDCP SDU having a large count value before the PDCP reconfiguration.

During the PDCP reconfiguration procedure, an encryption algorithm and a security key provided by the upper layer may be applied. During the PDCP reconfiguration procedure, an integrity algorithm and a security key provided by the upper layer may be applied.

After performing the procedure described above, the transmitting terminal may perform a corresponding data transmission procedure on the sidelink UM DRB.

When the receiving terminal determines that an upper layer (e.g., RRC) indicates to perform the PDCP reconfiguration procedure, the receiving terminal may perform the following PDCP reconfiguration procedure on the sidelink UM DRB.

The receiving terminal may process a PDCP data PDU received from a lower layer. For the UM DRB, when t-Reordering is running, the t-Reordering may be stopped and reset. When header compression is applied, the receiving terminal may perform header decompression and then transmit all stored PDCP SDUs to the upper layer in the order from a PDCP SDU having a small count value to a PDCP SDU having a large count value. When slrb-ContinueROHC is not configured, the ROHC protocol may reset the application and perform the IR state of the U-mode (in accordance with RFC3095 and RFC4815). The receiving terminal may set RX_NEXT and RX_DELIV to initial values with respect to the UM DRB.

During the PDCP reconfiguration procedure, an encryption algorithm and a security key provided by the upper layer may be applied. During the PDCP reconfiguration procedure, an integrity algorithm and a security key provided by the upper layer may be applied.

When the transmitting terminal determines that an upper layer (e.g., RRC) indicates to perform the sidelink PDCP reconfiguration procedure, the transmitting terminal may perform the following procedure on a sidelink acknowledged mode (AM) DRB.

When the receiving terminal determines that an upper layer (e.g., RRC) indicates to perform the sidelink PDCP reconfiguration procedure, the receiving terminal may perform the following procedure on the sidelink AM DRB.

Figure 11:
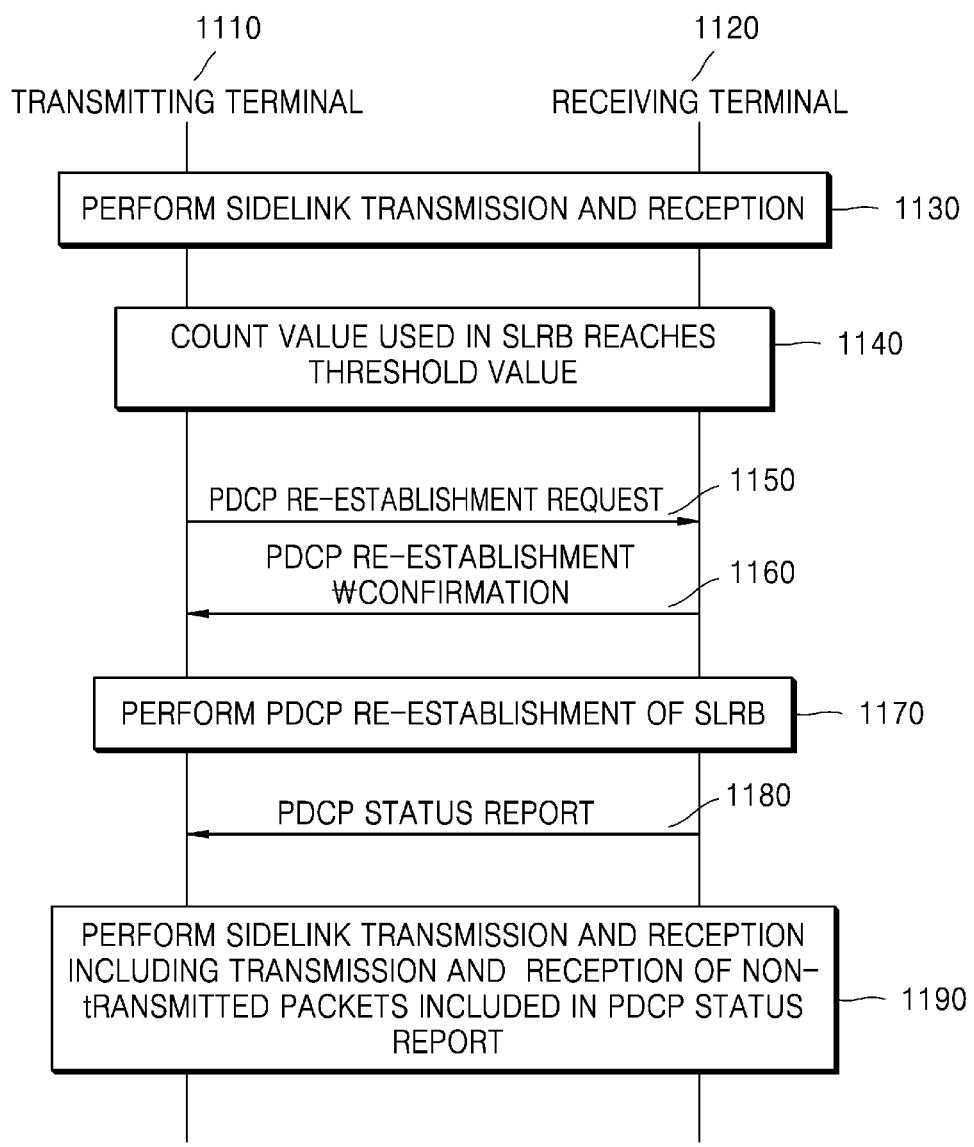
FIG. 11 is a diagram illustrating a method of reconfiguring a sidelink radio bearer, according to an embodiment of the present disclosure.

FIG. 11 is a diagram illustrating a method of reconfiguring a SLRB, according to an embodiment of the present disclosure.

In operation 1130, V2X terminals 1110 and 1120 may perform sidelink transmission and reception through a SLRB. The configuration of the SLRB may be set through a setup message transmitted by a base station, may be set by a system information message of the base station, or may be preset by a terminal. While the V2X terminals 1110 and 1120 perform transmission and reception through the SLRB, when a count value assigned to each packet reaches a maximum value, the SLRB is unable to transmit a new packet. To prevent this, when the count value reaches the maximum value or a value close to the maximum value, the V2X terminals 1110 and 1120 re-establish a SLRB and use the count value from 0, which is an initial value. The count value may be used when indicating a status variable value in a packet data convergence protocol (PDCP) layer, etc., or may be used when using packet encryption and decryption keys, and may include a combination of a PDCP sequence number and a hyper frame number (HFN). In some embodiments, the SLRB may be re-established in order to reconfigure a security key used in the SLRB. This re-establishment of the SLRB may be accompanied by a PDCP re-establishment operation. The PDCP re-establishment may include at least one of an operation of initializing a status variable value required to set a count value, an operation by which the receiving terminal transmits a PDCP status report message in order to perform retransmission, or an operation of performing retransmission.

In operation 1140, when sidelink transmission and reception is being performed, a count value used in a certain SLRB may reach or exceed a preset threshold value. The count value used in the SLRB may be a TX_NEXT value, which is a status variable value of a PDCP layer, or may be a value obtained by subtracting 1 from TX_NEXT. However, in the case of having a receiving PDCP entity, the count value may be a RX_NEXT value, a value obtained by subtracting 1 from RX_NEXT, a RX_DELIV value, or a value obtained by subtracting 1 from RX_DELIV. The threshold value may be a value set by pre-configuration, a value set by the base station through a RRC configuration message, a value transmitted by being included in a system information message, or a value preset by the terminal.

At this time, when the count value used in the SLRB reaches or exceeds a preset threshold value, the count value used in the PDCP layer of the SLRB needs to be initialized. To this end, the transmitting terminal 1110 or the receiving terminal 1120, which are performing sidelink transmission and reception, may trigger a PDCP re-establishment operation.

In operation 1150, the transmitting terminal 1110 may request the receiving terminal 1120 for the PDCP re-establishment for this purpose. In the embodiment of FIG. 11, it is assumed that the transmitting terminal triggers the PDCP re-establishment operation, but the receiving terminal may trigger PDCP re-establishment to transmit a PDCP re-establishment request message. Alternatively, PDCP re-establishment may be configured in the SLRB configuration message, and the SLRB configuration message may be transmitted.

The PDCP re-establishment operation may be accompanied by an operation of initializing a count value or an operation of maintaining a count value according to a RLC mode of a radio bearer, a setting value, and a count value currently in use, However, when the initialization of the count value is required, for example, when the count value reaches a threshold value, an operation of initializing the count value has to be performed. To this end, a PDCP re-establishment request message or a PDCP re-establishment confirmation message may include an indicator indicating whether the initialization of the count value has to be performed. When it is indicated that the initialization of the count value has to be performed, both the transmitting terminal 1110 and the receiving terminal 1120 have to perform the operation of initializing the count value when perform the PDCP re-establishment operation of the corresponding SLRB. In some embodiments, the operation of initializing the count value may be described as an operation of initializing the PDCP status variable. However, because the count value may be set by the PDCP status variable values, such as TX_NEXT and RX_NEXT, the operation of initializing the count and the operation of initializing the PDCP status variable may have the same meaning as each other.

In operation 1160, the receiving terminal 1120 that receives the PDCP re-establishment request message may transmit the PDCP re-establishment confirmation message to the transmitting terminal 1110. The PDCP re-establishment confirmation message may be a message indicating that the PDCP re-establishment request message in operation 1150 has been successfully received and the corresponding PDCP re-establishment may be performed. In some embodiments, a PDCP status report message may be transmitted by being included in the PDCP re-establishment confirmation message.

In operation 1170, the transmitting terminal 1110 and the receiving terminal 1120 may perform PDCP re-establishment for the SLRB. The PDCP re-establishment operation may include an operation of initializing a count value or an operation of initializing a status variable of a SLRB, due to a large count value reaching a threshold value. After the PDCP re-establishment is performed, encryption and decryption may be performed by using a new security key.

In operation 1180, the receiving terminal 1120 may transmit, to the transmitting terminal 1110, a PDCP status report message that transmits information about packets having been received so far and information about packets having not been received. The PDCP status report message may be transmitted by including a first missing count (FMC) value, which refers to a smallest count value having not been received in the SLRB, and a bitmap, which indicates reception (1) or non-reception (0) for a count value greater than a count value indicated by the FMC value. When the PDCP status report message is triggered, the receiving terminal 1120 may transmit set a RX_DELIV value at that time point to a FMC value and transmit the PDCP status report message to the transmitting terminal 1110. In the embodiment of FIG. 11, the PDCP status report message is transmitted after the PDCP re-establishment. However, when the initialization of the PDCP status variable has been performed in operation 1170, the PDCP status report message may have to be transmitted before the PDCP re-establishment. In some embodiments, the count value of the packet corresponding to the FMC value included in the PDCP status report message may be reset to 0, and a value obtained by subtracting the FMC value from the existing count value of the remaining packets may be applied as a new count value.

In operation 1190, the transmission and reception of the SLRB including the non-transmitted packets included in the PDCP status report message may be resumed.

Figure 12:
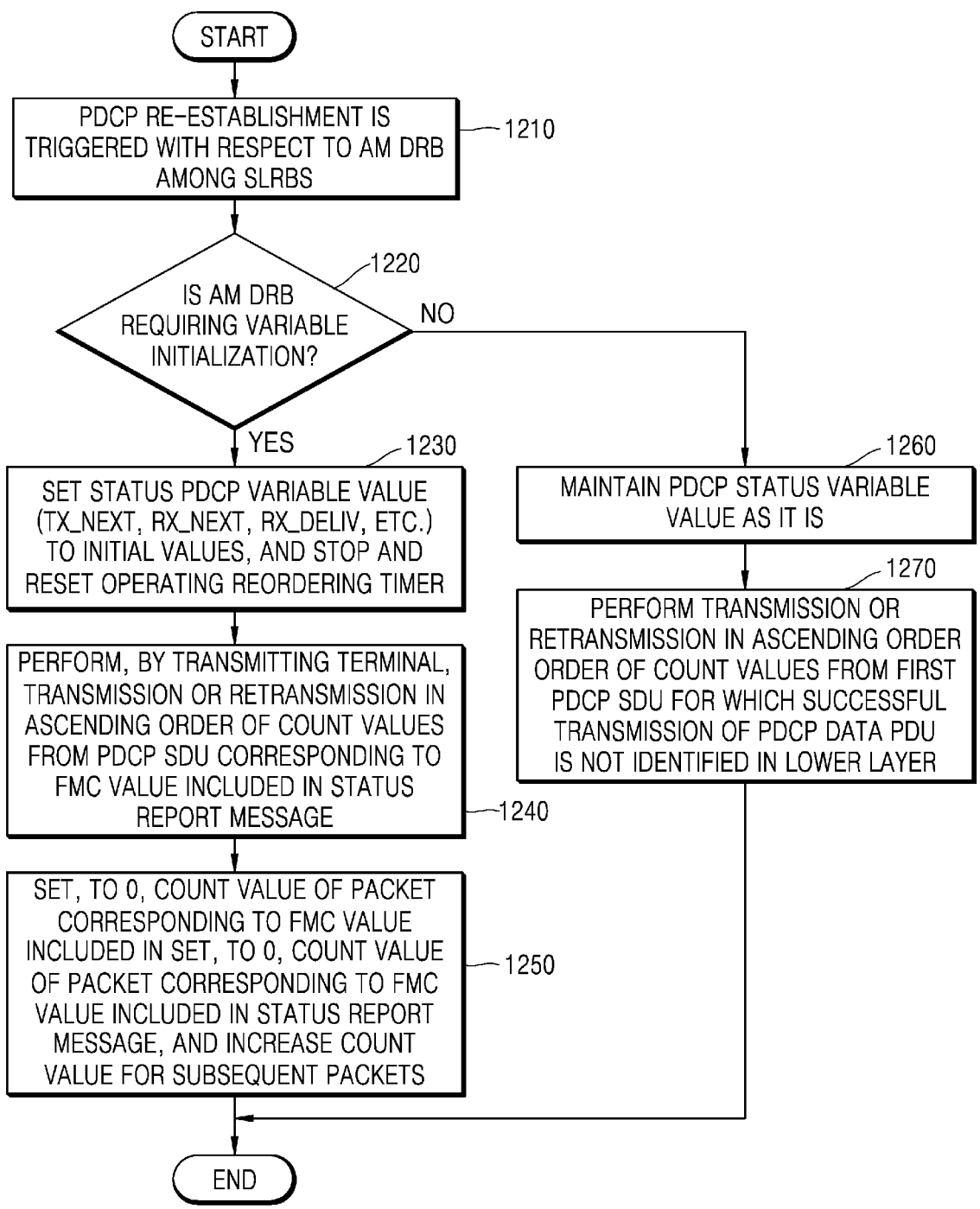
FIG. 12 is a diagram illustrating a method of reconfiguring a sidelink radio bearer, according to an embodiment of the present disclosure.

FIG. 12 is a diagram illustrating a method of reconfiguring a SLRB, according to an embodiment of the present disclosure.

In operation 1210, a V2X terminal may perform sidelink transmission and reception through a SLRB. The configuration of the SLRB may be performed through a setup message transmitted by a base station, may be performed according to setting based on a system information message of the base station, or may be performed by pre-configuration of a terminal. A situation in which PDCP re-establishment is triggered with respect to an AM DRB among SLRBs is assumed. This may mean that the PDCP re-establishment is accompanied in the re-establishment operation of the SLRB configured as the AM DRB.

In operation 1220, the V2X terminal may determine whether the SLRB is an AM DRB for which variable initialization is required. The variable initialization may be required when the PDCP count value used in the PDCP entity of the SLRB reaches or exceeds a certain threshold value. In another embodiment, the variable initialization may be required even when a security key is changed. In addition, whether to initialize the variable may be determined by a setting of a base station. However, the terminal may determine whether to initialize the variable according to other preset operations. Because both the transmitting terminal and the receiving terminal performing V2X communication need to know whether or not to initialize the variable of the PDCP layer, one terminal that performs PDCP re-establishment may indicate the corresponding operation by including an indicator notifying other terminals that PDCP variable initialization has to be performed. When the base station determines whether to initialize the variable, the base station may determine whether to perform variable initialization and notify a result of the determining to at least one of the terminals that perform V2X communication.

In operation 1230, when the SLRB is an AM DRB requiring variable initialization, the terminal may set PDCP status variable values TX_NEXT, RX_NEXT, and RX_DELIV to initial values, and may stop and reset a running reordering timer. At this time, the transmitting terminal may set a transmitting PDCP status variable TX_NEXT to an initial value, and the receiving terminal may set receiving PDCP status variables RX_NEXT and RX_DELIV to initial values.

In operation 1240, the transmitting terminal may perform transmission or retransmission in an ascending order of count values from a PDCP SDU corresponding to the FMC value included in the status report message. To this end, it is assumed that, when PDCP re-establishment is triggered, the receiving terminal transmits the PDCP status report message to the transmitting terminal. The FMC value and the bitmap, which are included in the PDCP status report, may be set to the count value allocated before the PDCP re-establishment. It may be considered that the V2X terminal performs reception from an upper layer in an ascending order of count values from the PDCP SDU corresponding to the FMC value.

In operation 1250, because it is a PDCP entity in which the variable initialization is performed, the count value used in the PDCP layer of the existing SLRB has to be initialized. However, it is necessary to retransmit non-transmitted packets included in the PDCP status report message transmitted from the receiving terminal. To this end, the count value of the packet corresponding to the FMC value included in the status report message may be set to 0, and the count value may be increased for subsequent packets. Specifically, the count value of the packet, to which the count value before the PDCP re-establishment is allocated, may be reallocated with a value obtained by subtracting the FMC value from the count value before the PDCP re-establishment. Based on this, the V2X terminal may perform a retransmission procedure after the PDCP re-establishment. A detailed procedure for reallocating the count value will be described below with reference to FIGS. 14 and 15.

In operation 1260, when it is an AM DRB that does not require variable initialization, PDCP status variable values TX_NEXT, RX_NEXT, and RX_DELIV, etc. may be maintained without change. In operation 1270, transmission or retransmission may be performed in an ascending order of counts from the first PDCP SDU for which successful transmission of the PDCP data PDU is not identified in the lower layer.

Figure 13:
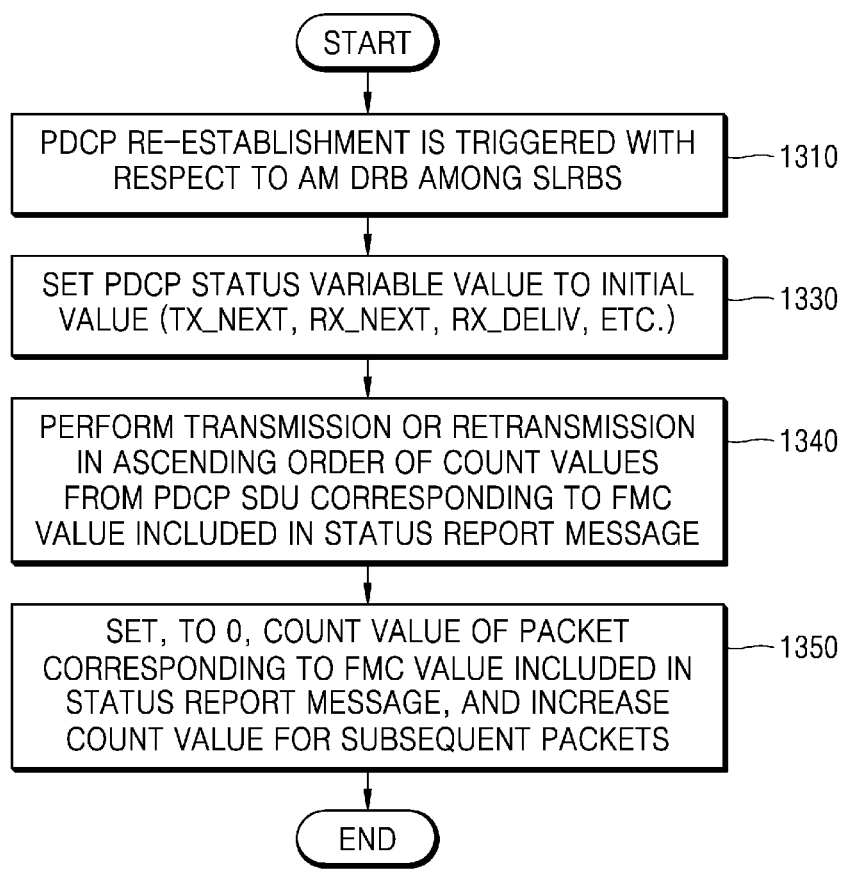
FIG. 13 is a diagram illustrating a method of reconfiguring a sidelink radio bearer, according to an embodiment of the present disclosure.

FIG. 13 is a diagram illustrating a method of reconfiguring a SLRB, according to an embodiment of the present disclosure.

In operation 1310, a V2X terminal may perform sidelink transmission and reception through a SLRB. The configuration of the SLRB may be performed through a setup message transmitted by a base station, may be performed according to setting based on a system information message of the base station, or may be performed by pre-configuration of a terminal. A situation in which PDCP re-establishment is triggered with respect to an AM DRB among SLRBs is assumed. This may mean that the PDCP re-establishment is accompanied in the re-establishment operation of the SLRB configured as the AM DRB. In the embodiment of FIG. 13, the initialization of the PDCP status variable is always performed when the PDCP is re-established for the AM DRB among the SLRBs.

In operation 1330, the terminal may set PDCP status variable values TX_NEXT, RX_NEXT, and RX_DELIV to initial values, and may stop and reset a running reordering timer. At this time, the transmitting terminal may set a transmitting PDCP status variable TX_NEXT to an initial value, and the receiving terminal may set receiving PDCP status variables RX_NEXT and RX_DELIV to initial values.

In operation 1340, the transmitting terminal may perform transmission or retransmission in an ascending order of count values from a PDCP SDU corresponding to the FMC value included in the status report message. To this end, it is assumed that, when PDCP re-establishment is triggered, the receiving terminal transmits the PDCP status report message to the transmitting terminal. The FMC value and the bitmap, which are included in the PDCP status report, may be set to the count value allocated before the PDCP re-establishment. It may be received from an upper layer from the PDCP SDU corresponding to the FMC value.

In operation 1350, because it is a PDCP entity in which the variable initialization is performed, the count value used in the PDCP layer of the existing SLRB has to be initialized. However, it is necessary to retransmit non-transmitted packets included in the PDCP status report message transmitted from the receiving terminal. To this end, the count value of the packet corresponding to the FMC value included in the status report message may be set to 0, and the count value may be increased for subsequent packets. Specifically, the count value of the packet, to which the count value before the PDCP re-establishment is allocated, may be reallocated with a value obtained by subtracting the FMC value from the count value before the PDCP re-establishment. Based on this, a retransmission procedure after the PDCP re-establishment may be performed. A detailed procedure for reallocating the count value will be described below with reference to FIGS. 14 and 15.

Figure 14:
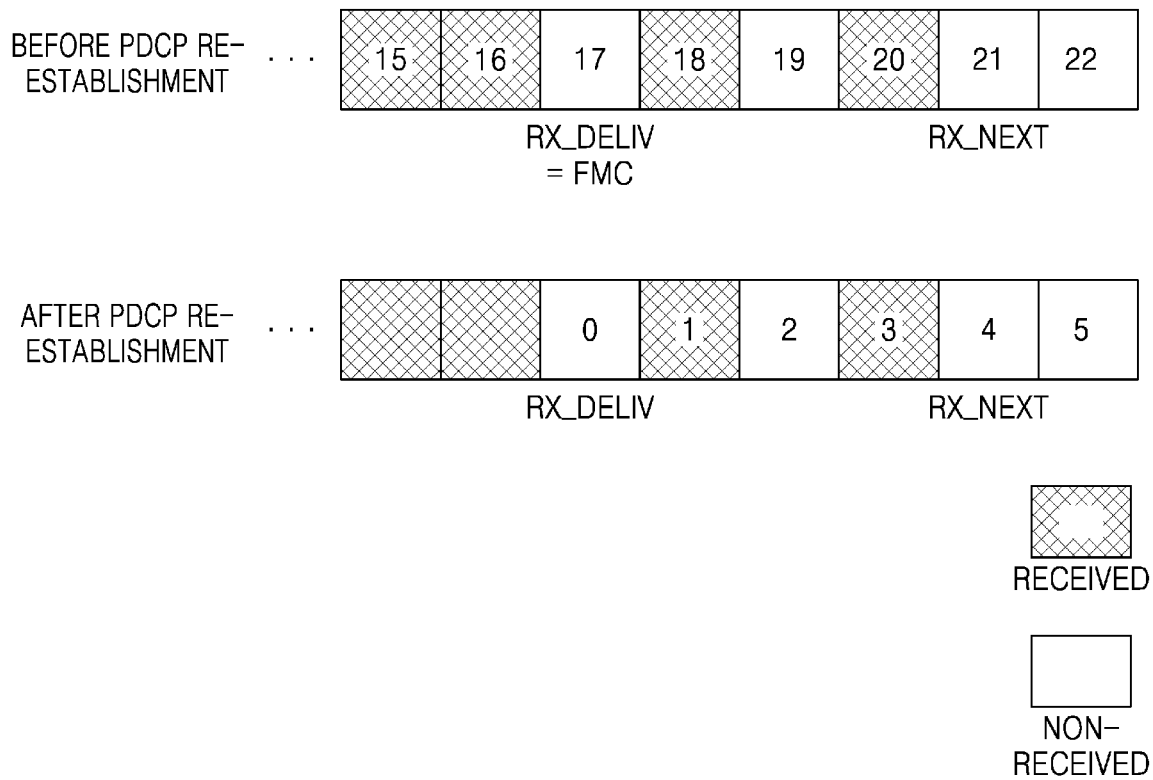
FIG. 14 illustrates a method by which a receiving PDCP entity applies packet data convergence protocol (PDCP) variable initialization, according to an embodiment of the present disclosure.

FIG. 14 illustrates a method by which a receiving PDCP entity applies PDCP variable initialization, according to an embodiment of the present disclosure.

It is assumed that the receiving PDCP entity has received PDCP PDUs (SDUs) corresponding to PDCP COUNT values . . . , 15, 16, 18, 20 before PDCP re-establishment, and a RX_DELIV value, which refers to a count value of a last packet transmitted to an upper layer at that time point, is 17. Because a PDCP PDU (SDU) having a count value of 20 is received, a RX_NEXT value means a next count value of a currently received packet having a largest count value, and thus, may have 21. When PDCP re-establishment is indicated at this time point and a PDCP status report message has to be transmitted to a PDCP entity of a transmitting terminal, a FMC value of a PDCP status report message generated at this time may be set to 17, which is a RX_DELIV value. Transmission and reception information may be indicated by a bitmap starting from 18, which is a sequence number after 17. That is, because a packet having a count value of 18 just after 17 and a packet having a count value of 20 have been successfully received, 10100000 in the bitmap may indicate successful reception of packets corresponding to a count value of 18 and a count value of 20. After the generation of the PDCP status report message, a count value of a PDCP PDU (SDU) having a count value of 17 set as FMC by a PDCP re-establishment operation is reallocated to 0. Count values may be sequentially allocated to PDCP PDUs (SDUs) having a count value greater than a count value of 17. According to an embodiment, a value obtained by subtracting a RX_DELIV value set as FMC from a count value before PDCP re-establishment may be reallocated as a new count value. The RX_NEXT value may also be reallocated as a value obtained by subtracting an existing RX_DELIV value set as FMC from an existing RX_NEXT value. In the embodiment of FIG. 14, the RX_NEXT value may be 4, which is obtained by subtracting 17, which is the existing RX_DELIV value set as the FMC value, from 21. The RX_DELIV value may also be reallocated to 0. Packets of counts 18 and 20 received previously are reallocated to counts 1 and 3, and may be considered as successful reception. In this manner, a subsequent reception operation may be continued by applying the new status variable and count value.

Figure 15:
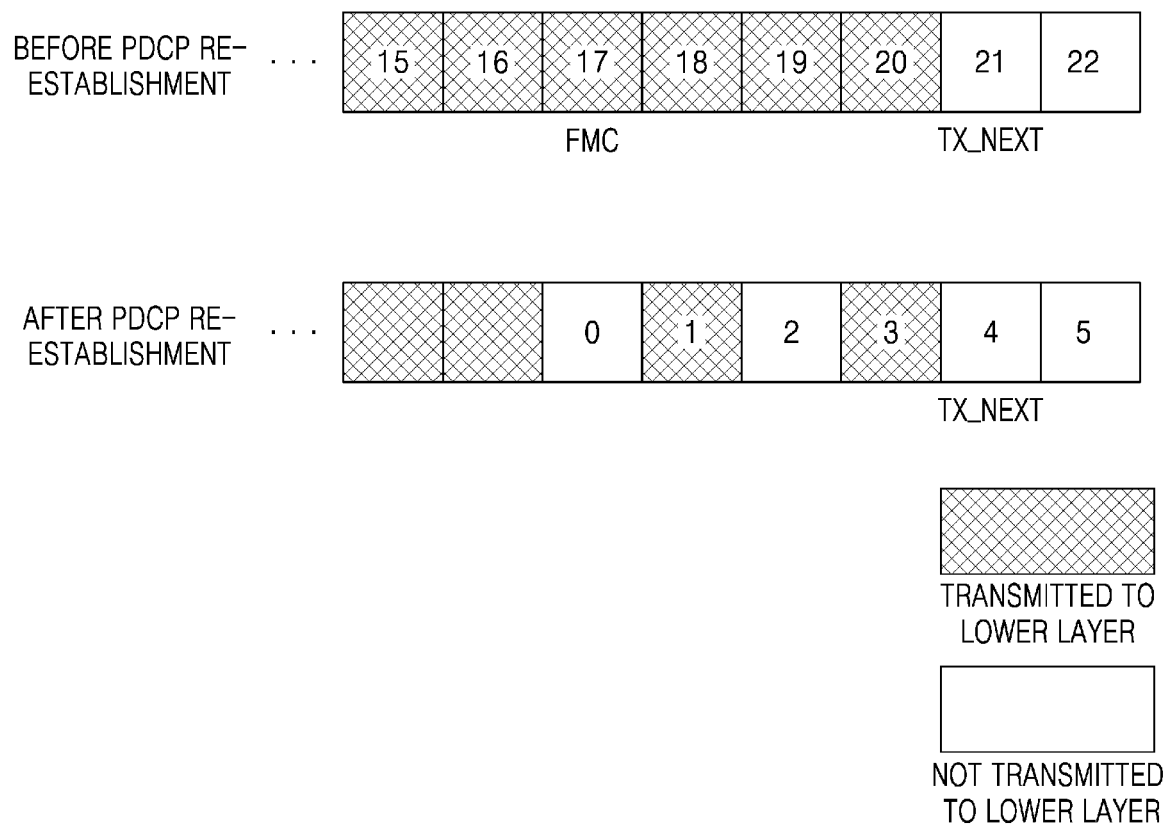
FIG. 15 illustrates a method by which a transmitting PDCP entity applies PDCP variable initialization, according to an embodiment of the present disclosure.

FIG. 15 illustrates a method by which a transmitting PDCP entity applies PDCP variable initialization, according to an embodiment of the present disclosure.

It is assumed that a transmitting PDCP entity delivers and transmits PDCP PDUs (SDUs) up to a PDCP count value of 20 to a RLC layer, which is a lower layer, before PDCP re-establishment. Therefore, it is assumed that a TX_NEXT value, which refers to a next count value of a last packet delivered to the lower layer at this time, is 20. When it is assumed that PDCP re-establishment is indicated at this time point, a PDCP status report message is delivered from a receiving terminal, FMC is 17, and a subsequent bitmap is 1010000, it may mean that the receiving PDCP entity has successfully received packets up to count 16 based on a count value before PDCP re-establishment. The bitmap may mean that packets having count values of 18 and 20 have also been successfully received. However, it may mean that packets having count values of 17 and 19 and packets having count values of 21 or more have not yet been received. That is, the V2X terminal may know from the PDCP status report message that the packets corresponding to the count values of 17 and 19 and the packets corresponding to the count values 21 or more are transmitted to the lower layer but not transmitted to the receiving terminal. After the reception of the PDCP status report message, a count value of a PDCP PDU (SDU) having a count value of 17 set as FMC by a PDCP re-establishment operation is reallocated to 0. Count values may be sequentially allocated to PDCP PDUs (SDUs) having a count value greater than a count value of 17. According to an embodiment, a value obtained by subtracting a FMC value from a count value before PDCP re-establishment may be reallocated as a new count value. The RX_NEXT value may also be reallocated as a value obtained by subtracting a FMC value from an existing TX_NEXT value. In the embodiment of FIG. 15, the TX_NEXT value may be 4, which is obtained by subtracting a FMC value of 17 from 21. Packets of counts 18 and 20 successfully transmitted are reallocated to counts 1 and 3, and the corresponding PDCP SDU (PDU) may be deleted considering successful reception by the PDCP status report message. In addition, packets of existing counts 17 and 19 (reallocated counts 0 and 2), the successful transmission of which has not been confirmed, may be retransmitted. In order to reconfigure the count value and the status variable after receiving the PDCP status report message, the transmitting PDCP entity may suspend transmission until receiving the PDCP status report message after the PDCP reconfiguration. In this manner, a subsequent transmission operation may be continued by applying the new status variable and count value.

Figure 16:
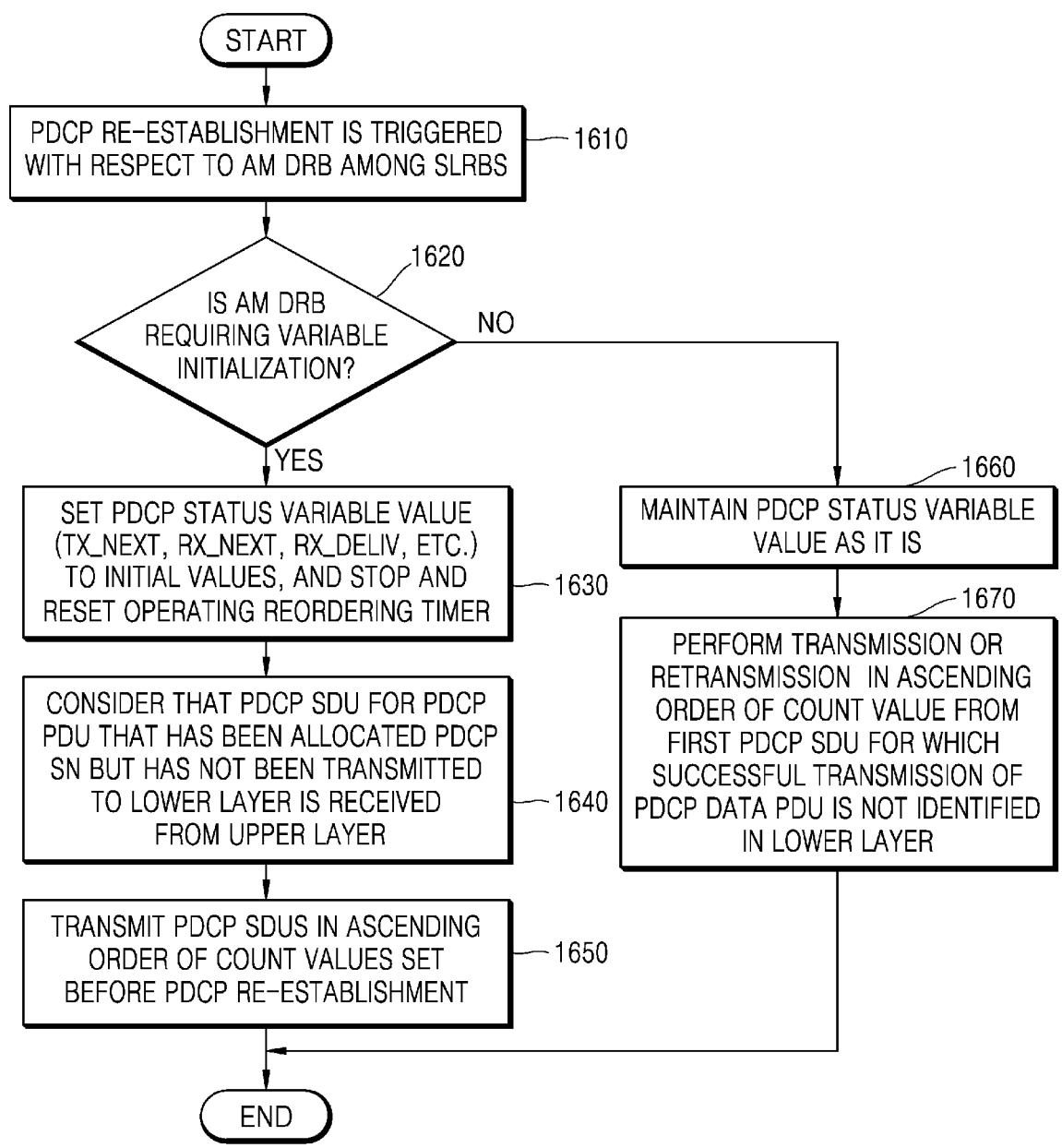
FIG. 16 is a diagram illustrating a method of reconfiguring a sidelink radio bearer, according to an embodiment of the present disclosure.

FIG. 16 is a diagram illustrating a method of reconfiguring a SLRB, according to an embodiment of the present disclosure.

In operation 1610, a V2X terminal may perform sidelink transmission and reception through a SLRB. The configuration of the SLRB may be performed through a setup message transmitted by a base station, may be performed according to setting based on a system information message of the base station, or may be performed based on pre-configuration of a terminal. A situation in which PDCP re-establishment is triggered with respect to an AM DRB among SLRBs is assumed. This may mean that the PDCP re-establishment is accompanied in the re-establishment operation of the SLRB configured as the AM DRB.

In operation 1620, the V2X terminal may determine whether the SLRB is an AM DRB for which variable initialization is required. The variable initialization may be required when the PDCP count value used in the PDCP entity of the SLRB reaches or exceeds a certain threshold value. In another embodiment, the variable initialization may be required even when a security key is changed. In addition, whether to initialize the variable may be determined by a setting of a base station. However, the terminal may determine whether to initialize the variable according to other preset operations. Because both the transmitting terminal and the receiving terminal performing V2X communication need to know whether or not to initialize the variable of the PDCP layer, one terminal that performs PDCP re-establishment may indicate the corresponding operation by including an indicator notifying other terminals that PDCP variable initialization has to be performed. When the base station determines whether to initialize the variable, the base station may determine whether to perform variable initialization and notify a result of the determining to at least one of the terminals that perform V2X communication.

In operation 1630, when the SLRB is an AM DRB requiring variable initialization, the terminal may set PDCP status variable values TX_NEXT, RX_NEXT, and RX_DELIV to initial values, and may stop and reset a running reordering timer. At this time, the transmitting terminal may set a transmitting PDCP status variable TX_NEXT to an initial value, and the receiving terminal may set receiving PDCP status variables RX_NEXT and RX_DELIV to initial values.

In operation 1640, the transmitting terminal may consider that a PDCP SDU for a PDCP PDU that has been allocated a PDCP sequence number (SN) but has not been transmitted to a lower layer is received from an upper layer. Through these operations, the transmission of the PDCP SDU that has never been transmitted to the lower layer may be performed after PDCP re-establishment. In operation 1650, PDCP SDUs may be transmitted in an ascending order of count values set before PDCP re-establishment.

In operation 1660, for an AM DRB that does not require variable initialization, PDCP status variable values TX_NEXT, RX_NEXT, and RX_DELIV, etc. may be maintained without change. In operation 1670, transmission or retransmission may be performed in an ascending order of counts from the first PDCP SDU for which successful transmission of the PDCP data PDU is not identified in the lower layer.

Hereinafter, the present disclosure relates to a method and device for configuring a buffer status report (BSR) and scheduling request (SR) of an integrated access and backhaul (IAB) node in a wireless communication system. Specifically, various embodiments of the present disclosure relate to a logical channel mapping method between a lower link and an upper link in an IAB system during an operation of a BSR in which an IAB node performs pre-emptive transmission to a parent IAB node based on a BSR received from a child IAB node (hereinafter, referred to as pre-emptive BSR), and targets an IAB network. Hereinafter, an entity referred to as an IAB node in the present disclosure may include, in addition to Rel. 16 IAB according to the 3GPP NR standard, devices (e.g., a repeater and a relay) supporting multi-hop wireless communication between a terminal (including a UE and a CPE) and a communication device (including a base station, eNB, and gNB) connected to a wired network.

Figure 17:
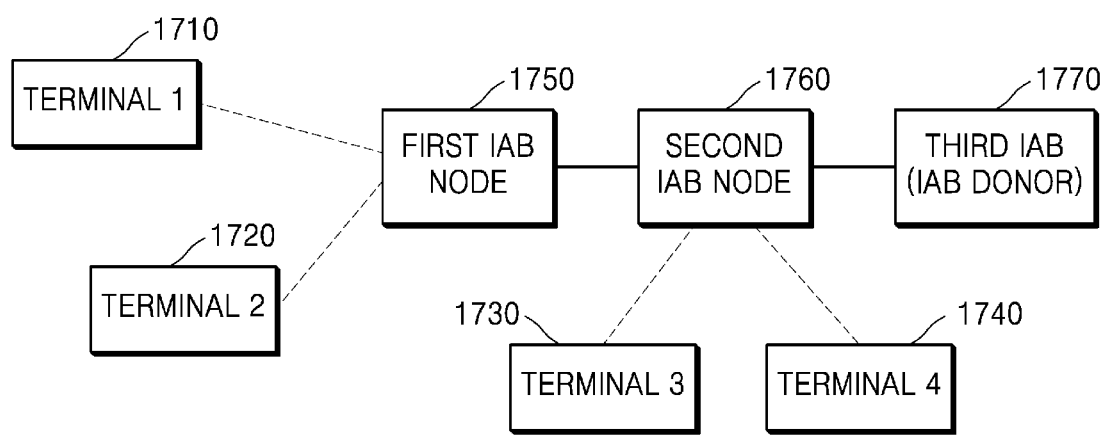
FIG. 17 illustrates a structure of an integrated access and backhaul (IAB) network.

FIG. 17 illustrates a structure of an IAB network. The IAB network has a structure in which a plurality of base station nodes are connected to terminals. Base stations of the IAB network are referred to as IAB nodes. Of these IAB nodes, an IAB node connected to a core network is referred to as an IAB donor. The IAB node is a network entity for radio access and backhaul connection and may be deployed to extend the coverage of the base station. For example, the coverage of the base station that is the IAB donor may be increased without installing a wired network.

For a connection between two IAB nodes, an IAB donor or an IAB node that is close to the IAB donor is referred to as a parent IAB node, and a node that is relatively far from the IAB donor is referred to as a child IAB node. Whether close to the IAB donor may be based on a small number of hops to the IAB donor. A link from the IAB donor to the terminal is downlink (DL), and a link from the terminal to the IAB donor is uplink (UL). Even when a signal is transmitted through the IAB node in the middle, the link of the signal may be determined through the transmission direction of the signal. That is, the link through which the IAB node transmits a signal to the terminal is DL, and the link through which the IAB node transmits a signal to the base station is UL. Also, in terms of the IAB node, the link of the signal transmitted from the IAB donor of the core network (wired network) or to the IAB donor is referred to as a parent link, and the link of the signal transmitted to another IAB node or the terminal or from another IAB node or the terminal may be referred to as a child link.

The IAB node may include a mobile termination (MT) for the parent link and a distributed unit (DU) for the child link. The base station connected to the core network (wired network) is a distributed deployment and may include a structure of a central (centralized) unit (CU) and a DU. The CU may be connected to one or more DUs to provide a radio access network. The base station may be divided into a CU (e.g., gNB-CU) and a DU (e.g., gNB-DU), which are separate entities. The DU of the IAB node may be connected to the DU of the base station or the DU of another IAB node through an F1 interface by a multi-hop scheme (or relay), and may perform communication. Also, in the IAB network, the IAB nodes may have a connection with the terminal, and the IAB node has to process data of the terminal served by the IAB node and data serviced by the child IAB node of the IAB node. The DU of the IAB node may communicate with the terminal through a Uu interface. The MT of the IAB node may be connected to a network together with another IAB node or an IAB donor through an initial access procedure like the terminal. The IAB node may access the base station through the same radio access technology as the terminal.

Referring to FIG. 17, an example in which four terminals 1710, 1720, 1730, and 1740 are connected to IAB nodes 1750, 1760, and 1770 is illustrated in the embodiment of FIG. 17. It may be assumed that terminal 1 1710 and terminal 2 1720 are connected to the first IAB node 1750, terminal 3 1730 and terminal 4 1740 are connected to the second IAB node 1760, and the terminal is not connected to the third IAB node 1770, which is an IAB donor. However, this is only an example, and the number of terminals connected to the IAB node may change. In the embodiment of FIG. 17, the first IAB node 1750 may be a child IAB node in connection with the second IAB node 1760. The second IAB node 1760 is a parent IAB node in connection with the first IAB node 1750, but may be a child IAB node in connection with the third IAB node 1770. The third IAB node may be a parent IAB node because the third IAB node is an IAB donor.

The base station as used herein may be referred to as 'access point (AP)', 'eNodeB (eNB)', 'next generation node B (gNB)', '5G node)', '5G NodeB (NB)', 'gNB', 'wireless point', 'gNB', 'wireless point', 'transmission/reception point (TRP)', CU, DU, 'digital unit (DU)', 'radio unit (RU)', or remote radio head (RRH), or may be referred to as other terms having a technical meaning equivalent thereto. Hereinafter, in the present disclosure, the base station is described as one entity, but may be implemented as distributed entities according to an embodiment. For example, the base station may be implemented by being divided into a DU and a RU. The RU may include an MMU. That is, a device that performs scheduling and a device that radiates a signal according to the scheduling may be implemented at physically distinct locations. Also, for example, the base station may be connected to one or more TRPs. The base station may transmit a downlink signal to the terminal or receive an uplink signal through one or more TRPs.

The terminal is a device that is used by a user, and performs communication with the base station (IAB donor) or the IAB node through a radio channel. In some cases, the terminal may be operated without the user's involvement. That is, the terminal is a device that performs machine type communication (MTC), and may not be carried by a user. The terminal as used herein may be referred to as 'user equipment (UE)', 'mobile station', 'subscriber station', 'customer premises equipment (CPE)', 'remote terminal', 'wireless terminal', 'electronic device', 'vehicle terminal', or 'user device', or may be referred to as other terms having a technical meaning equivalent thereto.

Figure 18:
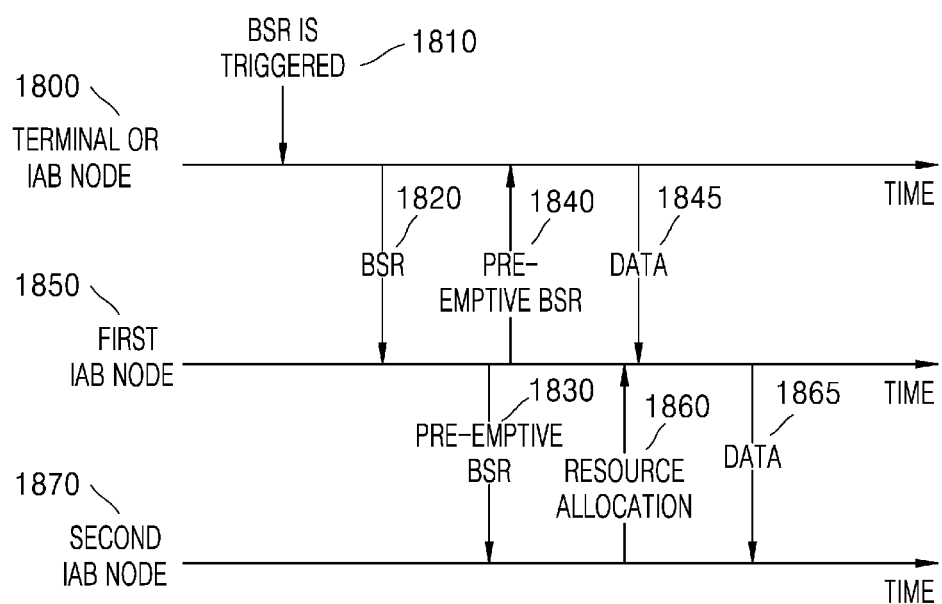
FIG. 18 illustrates an example of pre-emptive buffer status report (BSR) transmission.

FIG. 18 illustrates an example of pre-emptive BSR transmission. The pre-emptive BSR refers to a BSR for an IAB node to report a pre-emptively predicted buffer status to a parent IAB node by a BSR received from a terminal or child IAB node.

Referring to FIG. 18, a BSR transmitted from a terminal or IAB node 1800 may be triggered when data having a higher priority than data having existed in a UL buffer so far arrives, or when there is no more data in the UL buffer (1810). BSR information is used to report the buffer status of the actual terminal or IAB node 1800. After receiving the BSR, a base station or parent IAB node 1850 may allocate UL radio resources to the terminal or IAB node 1800 by taking into account the buffer state of the terminal or child IAB node (1840). The base station or parent IAB node 1850 may cause the terminal or IAB node 1800 to perform actual UL data transmission (1845). The buffer status of the first IAB node 1850, which is an IAB node, is changed only after operation 1845 in which actual data is received from the terminal or child IAB node 1800, and the first IAB node 1850 may trigger a BSR to be transmitted to a second IAB node 1870, which is a parent IAB node. Even after the first IAB node 1850 transmits the BSR to the second IAB node 1870, it may take time until resource allocation and actual data transmission. Accordingly, BSR transmission based on actual data may cause data delay in the IAB network. To prevent this, the IAB node reports a pre-emptively predicted buffer status to the parent IAB node by the BSR received from the terminal or child IAB node of the IAB node. This is referred to as pre-emptive BSR. In the embodiment of FIG. 18, after the first IAB node 1850 receives the BSR from the terminal or child IAB node 1850 (1820), the pre-emptive BSR is triggered. The first IAB node 1850 may transmit the pre-emptive BSR to the second IAB node 1870, which is the parent IAB node (1830). The second IAB node 1870 receiving the pre-emptive BSR may allocate radio resources to the first IAB node 1850, which is the child IAB node, by taking into account the predicted buffer status reported by the pre-emptive BSR of the first IAB node 1850 (1860). The second IAB node 1870 may cause the first IAB node 1850 to perform actual UL data transmission (1865). Due to this, immediately after receiving data from the terminal or IAB node (1845), the first IAB node 1850 may transmit the received data to the second IAB node (1865). This has an effect of minimizing the delay of data due to multi-hop in the IAB network.

FIG. 19 illustrates an example of a format for transmission of a pre-emptive BSR.

Referring to FIG. 19, the pre-emptive BSR refers to the buffer status predicted by the received BSR, not the buffer status of the actual IAB node. However, the format in which the pre-emptive BSR is reported may be the same as the format of the normal BSR. Instead, the BSR may include information indicating that the corresponding BSR is a pre-emptive BSR (e.g., including an indicator separately). The parent IAB node receiving the BSR may use the information to identify that the pre-emptive BSR has information different from that of the normal BSR. The pre-emptive BSR illustrated in FIG. 19 may include an LCGi field and a buffer size field. The LCGi field may mean that there is data predicted from a logical channel group (LCG) having i as a LCG identity (ID). The buffer size i field may indicate an amount of predicted data of a LCG in which the LCGi field is indicated by 1. In this case, the order of the buffer size i field may be the order of the LCG ID of the LCG with predicted data.

When the pre-emptive BSR is transmitted by padding remaining after transmitting data, the buffer status of the LCG with all predicted data may not be reported through the pre-emptive BSR. In this case, the pre-emptive BSR may not include all the buffer size i fields for the LCG with predicted data in which the LCGi field value is indicated by 1. In this case, a pre-emptive BSR including only a portion of the buffer size i field may be transmitted. Such a pre-emptive BSR may be referred to as a truncated pre-emptive BSR. The truncated pre-emptive BSR may include the buffer size i fields in descending order of the highest priorities among the priorities of logical channels belonging to LCGi among the LCGs in which the LCGi field value is indicated by 1.

Figure 20:
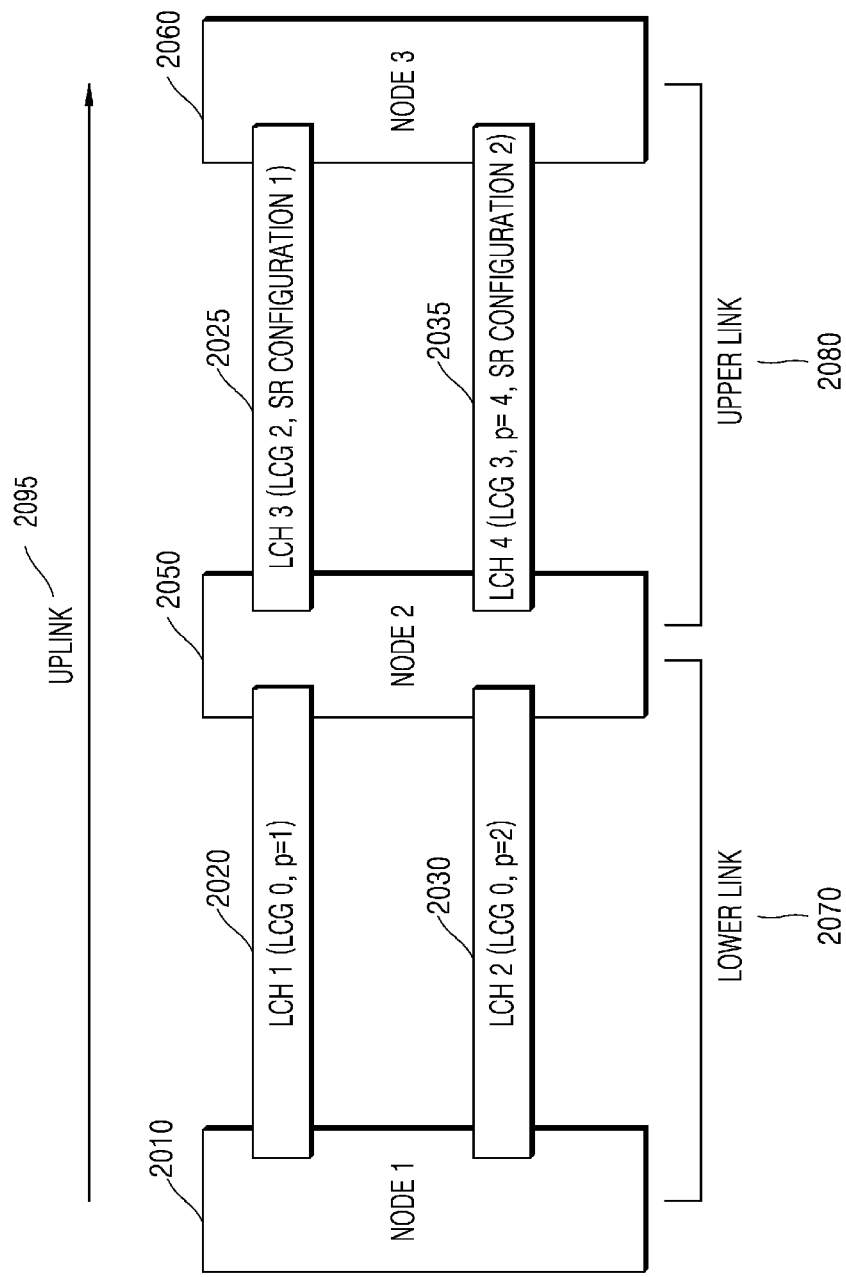
FIG. 20 illustrates an example in which a logical channel group is configured in an IAB network.

FIG. 20 illustrates an example in which a LCG is configured in an IAB network.

FIG. 20 illustrates UL communication 2095 in which node 1 2010 is connected to node 3 2060 via node 2 2050. Node 1 may be an IAB node or a terminal and is connected to node 2. Node 2 is an IAB node and is connected to node 3. It is assumed that two logical channels, that is, logical channel 1 2020 and logical channel 2 2030, are configured for connection between node 1 and node 2, and it is assumed that all the LCGs are allocated 0. It is assumed that the priority (p) value of logical channel 1 2020 is set to 1 and the priority value of logical channel 2 2030 is set to 2. A smaller priority value may correspond to a higher priority. It is assumed that two logical channels, that is, logical channel 3 2025 and logical channel 4 2035, are configured for connection between node 2 and node 3, and it is assumed that logical channel 3 has LCG 2, a priority value of 1, and a SR configuration of 1, and logical channel 4 has LCG 3, a priority value of 4, a SR configuration of 2. It is assumed that data transmitted from node 1 2010 to node 2 2050 via logical channel 1 is transmitted from node 2 2050 to node 3 2060 via logical channel 3, and data transmitted from node 1 2010 to node 2 2050 via logical channel 2 is transmitted from node 2 2050 to node 3 2060 via logical channel 4. In the embodiment of FIG. 20, because it is assumed that node 3 is a parent IAB node of node 2, and node 2 2050 is a parent IAB node of node 1 2010, a radio link between node 1 2010 and node 2 2050 may be referred to as a lower link 2070, and a radio link between node 2 2050 and node 3 2060 may be referred to as an upper link 2080. In the embodiment of FIG. 20, the logical channel of the lower link corresponds to the logical channel of the upper link in a one-to-one manner, but embodiments of the present disclosure are not limited to this situation. Multiple logical channels of the lower link may be configured in the logical channel of the upper link in a multiple-to-one manner. That is, one or more logical channels of the lower link may correspond to one logical channel of the upper link. In contrast, one logical channel of the upper link may correspond to one or more logical channels of the lower link. Various embodiments of the present disclosure may be applied when the logical channel of the upper link corresponding to the logical channel of the lower link exists.

When the BSR is transmitted from node 1 2010, data stored in the buffer of LCG 0 exists in this BSR. Due to this, when the pre-emptive BSR is triggered, node 2 2050 has to determine the buffer size field of the LCG to include the amount of predicted data in the pre-emptive BSR. In the lower link, LCG 0 has logical channel 1 and logical channel 2, but the logical channels of the upper link to which these logical channels are connected are logical channel 3 and logical channel 4. However, because logical channel 3 belongs to LCG 2 and logical channel 4 belongs to LCG 3, it is unclear which LCG has to include data amount when transmitting the pre-emptive BSR. This may prevent the parent IAB node from predicting the accurate buffer size.

In addition, when the pre-emptive BSR is triggered, but there is no radio resources to be transmitted, it may be necessary to trigger a SR. At this time, the BSR triggering the pre-emptive BSR indicates that data stored in the buffer of LCG 0 exists. Due to this, when the pre-emptive BSR is triggered, it is unclear which SR configuration is to be used. This may cause the child IAB node (e.g., node 2 2050 in FIG. 20) to transmit an SR by using an unspecified SR configuration, and scheduling inefficiency may be caused due to SR transmission that is not configured by the parent IAB node (e.g., node 3 2060 in FIG. 20). Therefore, hereinafter, the present disclosure proposes a method of solving the unclear problem of the LCG included in the pre-emptive BSR or the SR configuration triggered by the pre-emptive BSR.

Figure 21:
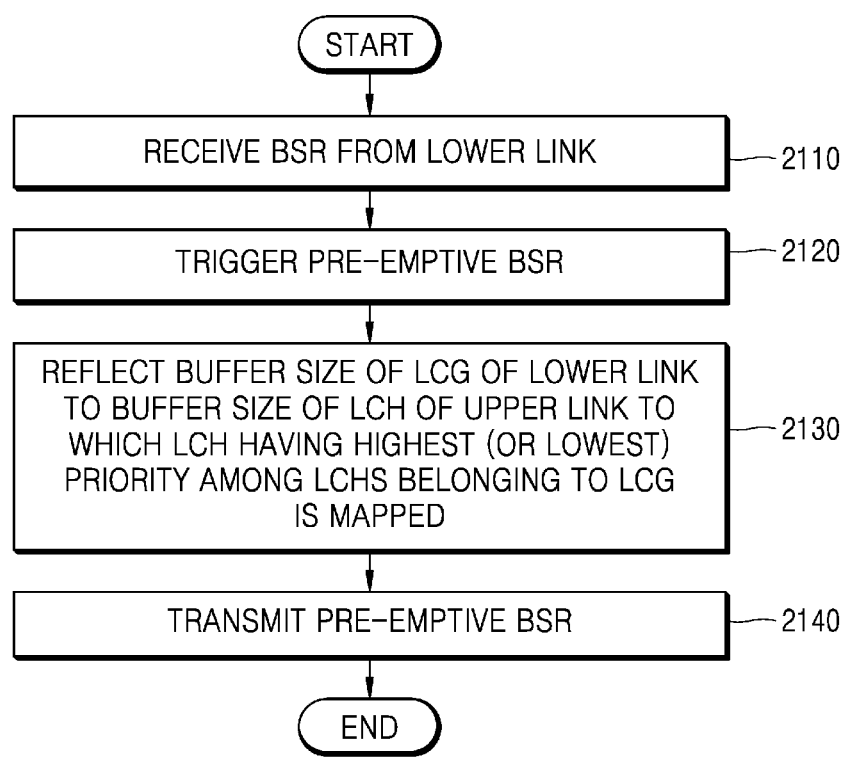
FIG. 21 illustrates an operation flow of an IAB node for a logical channel configuration method of a pre-emptive BSR, according to embodiments of the present disclosure.

FIG. 21 illustrates an operation flow of an IAB node for a logical channel configuration method of a pre-emptive BSR, according to embodiments of the present disclosure. An IAB node may be connected to a terminal or child IAB node, and may be connected to a parent IAB node (e.g., another IAB node, a base station or IAB donor, etc.).

Referring to FIG. 21, in operation 2110, the IAB node may receive a BSR from a child IAB node of the IAB node or a connected terminal. The BSR may include an amount of UL data stored in a buffer of the child IAB node of the IAB node or the connected terminal. The BSR may be received by a MAC layer (or a MAC entity).

In operation 2120, the IAB node may trigger a pre-emptive BSR. The IAB node may determine whether a condition for triggering the pre-emptive BSR is satisfied. At this time, when the condition for triggering the pre-emptive BSR is satisfied, the IAB node may trigger the pre-emptive BSR in order to attempt to transmit the pre-emptive BSR to the parent IAB node. The condition for triggering the pre-emptive BSR may be configured in various ways. For example, it may be preset that the IAB node triggers the pre-emptive BSR. Also, for example, when information included in the BSR received by the IAB node indicates that there is an expected data reception in a logical channel or LCG that has to trigger the pre-emptive BSR, the IAB node may determine to trigger the pre-emptive BSR.

In operation 2130, when the pre-emptive BSR is triggered as described above, the IAB node may reflect (or apply) the buffer size of the LCG of the lower link to the buffer size of the logical channel of the upper link to which the logical channel of the lower link having the highest (or lowest) priority among the logical channels belonging to the LCG is mapped. The IAB node may include the buffer size of the LCG of the lower link in the predicted buffer size of the pre-emptive BSR as the buffer size of the logical channel of the upper link. Hereinafter, the reflecting as the buffer size of the logical channel may mean reflecting as the buffer size of the LCG to which the corresponding logical channel belongs.

When the BSR is received, the IAB node may identify the logical channel having the highest (or lowest) priority among the LCGs of the BSR. The IAB node may identify the logical channel of the upper link mapped to the identified logical channel. When transmitting the pre-emptive BSR, the IAB node may apply the buffer size of the LCG of the BSR as the predicted buffer size of the LCG of the logical channel of the upper link. For example, assuming the logical channel configuration of FIG. 20 and assuming that the buffer size of LCG 0 is 100 bytes when node 2 2050 receives the BSR transmitted from node 1 2010, the logical channel of the lower link having the highest priority among the logical channels belonging to LCG 0 is logical channel 1, and the logical channel of the upper link to which logical channel 1 corresponds is logical channel 3. Therefore, in the pre-emptive BSR, 100 bytes may be reflected in the predicted buffer size of LCG 2 to which logical channel 3 belongs.

In operation 2140, the IAB node may transmit the pre-emptive BSR. The IAB node may generate and transmit the pre-emptive BSR when the UL radio resource is allocated. The SR is triggered when there is no resource to transmit the pre-emptive BSR. Even in this case, the IAB node may transmit the SR by using the SR configuration of the logical channel of the upper link to which the logical channel of the lower link having the highest (or lowest) priority among the logical channels belonging to the LCG indicating that there is data to be transmitted from the BSR is mapped. For example, when the logical channel configuration of FIG. 20 is assumed and node 2 2050 receives the BSR transmitted from node 1 2010, the SR is transmitted by using SR configuration 1, which is the SR configuration of logical channel 3. This SR may be considered as an SR triggered by the corresponding logical channel (i.e., logical channel 3).

Figure 22:
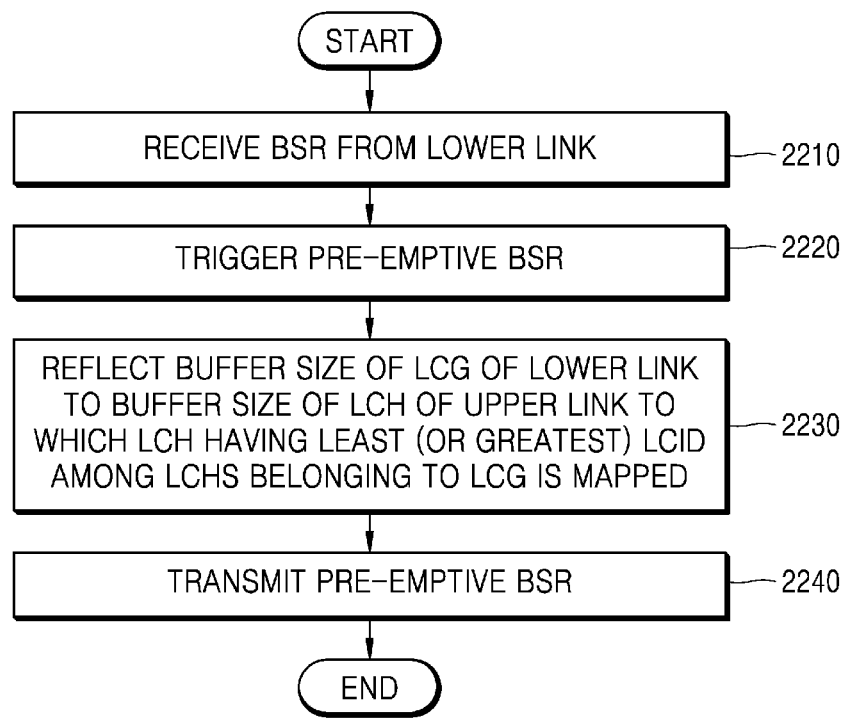
FIG. 22 illustrates an operation flow of an IAB node for a logical channel configuration method of a pre-emptive BSR, according to embodiments of the present disclosure.

FIG. 22 illustrates an operation flow of an IAB node for a logical channel configuration method of a pre-emptive BSR, according to embodiments of the present disclosure. An IAB node may be connected to a terminal or child IAB node, and may be connected to a parent IAB node (e.g., another IAB node, a base station or IAB donor, etc.).

Referring to FIG. 22, in operation 2210, the IAB node may receive a BSR from a child IAB node of the IAB node or a connected terminal. The BSR may include an amount of UL data stored in a buffer of the child IAB node of the IAB node or the connected terminal. The BSR may be received by a MAC layer (or a MAC entity).

In operation 2220, the IAB node may trigger a pre-emptive BSR. The IAB node may determine whether a condition for triggering the pre-emptive BSR is satisfied. At this time, when the condition for triggering the pre-emptive BSR is satisfied, the IAB node may trigger the pre-emptive BSR in order to attempt to transmit the pre-emptive BSR to the parent IAB node. The condition for triggering the pre-emptive BSR may be configured in various ways. For example, it can be preset that the corresponding IAB node triggers the pre-emptive BSR. Also, for example, when information included in the BSR received by the IAB node indicates that there is an expected data reception in a logical channel or LCG that has to trigger the pre-emptive BSR, the IAB node may determine to trigger the pre-emptive BSR.

In operation 2230, when the pre-emptive BSR is triggered as described above, the IAB node may reflect (or apply) the buffer size of the LCG of the lower link to the buffer size of the logical channel of the upper link to which the logical channel of the lower link having the least (or greatest) logical channel identity (LCID) among the logical channels belonging to the LCG is mapped. The IAB node may include the buffer size of the LCG of the lower link in the predicted buffer size of the pre-emptive BSR as the buffer size of the logical channel of the upper link. The reflecting as the buffer size of the logical channel may mean reflecting as the buffer size of the LCG to which the corresponding logical channel belongs.

When the BSR is received, the IAB node may identify the logical channel having the least (or greatest) LCID among the LCGs of the BSR. The IAB node may identify the logical channel of the upper link mapped to the identified logical channel. When transmitting the pre-emptive BSR, the IAB node may apply the buffer size of the LCG of the BSR as the predicted buffer size of the LCG of the logical channel of the upper link. For example, assuming the logical channel configuration of FIG. 20 and assuming that the buffer size of LCG 0 is 100 bytes when node 2 2050 receives the BSR transmitted from node 1 2010, the logical channel of the lower link having the least LCID among the logical channels belonging to LCG 0 is logical channel 1 (LCID=1), and the logical channel of the upper link to which logical channel 1 is logical channel 3. Therefore, in the pre-emptive BSR, 100 bytes may be reflected in the predicted buffer size of LCG 2 to which logical channel 3 belongs.

In operation 2240, the IAB node may transmit the pre-emptive BSR. The IAB node may generate and transmit the pre-emptive BSR when the UL radio resource is allocated. The SR is triggered when there is no resource to transmit the pre-emptive BSR. Even in this case, the IAB node may transmit the SR by using the SR configuration of the logical channel of the upper link to which the logical channel of the lower link having the least (or greatest) LCID value among the logical channels belonging to the LCG indicating that there is data to be transmitted from the BSR is mapped. For example, when the logical channel configuration of FIG. 20 is assumed and node 2 2050 receives the BSR transmitted from node 1 2010, the SR is transmitted by using SR configuration 1, which is the SR configuration of logical channel 3. This SR may be considered as an SR triggered by the corresponding logical channel (i.e., logical channel 3).

Figure 23:
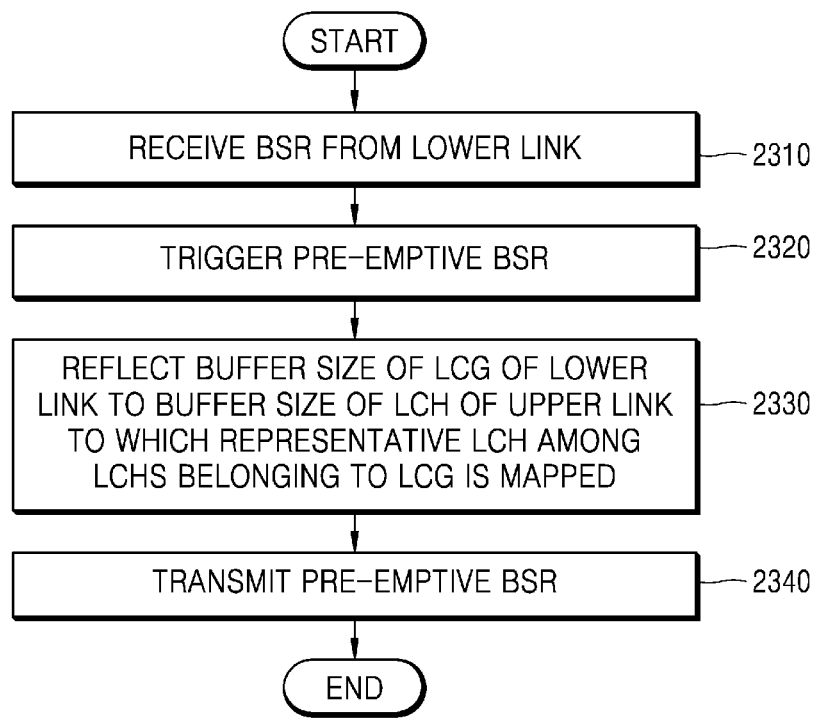
FIG. 23 illustrates an operation flow of an IAB node for a logical channel configuration method of a pre-emptive BSR, according to embodiments of the present disclosure.

FIG. 23 illustrates an operation flow of an IAB node for a logical channel configuration method of a pre-emptive BSR, according to embodiments of the present disclosure. An IAB node may be connected to a terminal or child IAB node, and may be connected to a parent IAB node (e.g., another IAB node, a base station or IAB donor, etc.).

Referring to FIG. 23, in operation 2310, the IAB node may receive a BSR from a child IAB node of the IAB node or a connected terminal. The BSR may include an amount of UL data stored in a buffer of the child IAB node of the IAB node or the connected terminal. The BSR may be received by a MAC layer (or a MAC entity).

In operation 2320, the IAB node may trigger a pre-emptive BSR. The IAB node may determine whether a condition for triggering the pre-emptive BSR is satisfied. At this time, when the condition for triggering the pre-emptive BSR is satisfied, the IAB node may trigger the pre-emptive BSR in order to attempt to transmit the pre-emptive BSR to the parent IAB node. The condition for triggering the pre-emptive BSR may be configured in various ways. For example, it may be preset that the IAB node triggers the pre-emptive BSR. Also, for example, when information included in the BSR received by the IAB node indicates that there is an expected data reception in a logical channel or LCG that has to trigger the pre-emptive BSR, the IAB node may determine to trigger the pre-emptive BSR.

In operation 2330, when the pre-emptive BSR is triggered as described above, the IAB node may reflect (or apply) the buffer size of the LCG of the lower link to the buffer size of the logical channel of the upper link to which a preset representative logical channel of the lower link among the logical channels belonging to the LCG is mapped. The IAB node may include the buffer size of the LCG of the lower link in the predicted buffer size of the pre-emptive BSR as the buffer size of the logical channel of the upper link. The representative logical channel may be preset by the upper layer to determine which logical channel is designated as the representative logical channel in the configuration of each LCG. The reflecting as the buffer size of the logical channel may mean reflecting as the buffer size of the LCG to which the corresponding logical channel belongs.

When the BSR is received, the IAB node may identify the representative logical channel among the LCGs of the BSR. The IAB node may identify the logical channel of the upper link mapped to the identified logical channel. When transmitting the pre-emptive BSR, the IAB node may apply the buffer size of the LCG of the BSR as the predicted buffer size of the LCG of the identified logical channel of the upper link. For example, assuming the logical channel configuration of FIG. 20 and assuming that the buffer size of LCG 0 is 100 bytes when node 2 2050 receives the BSR transmitted from node 1 2010 and the representative logical channel of LCG 0 is logical channel 1, the representative logical channel among the logical channels belonging to LCG 0 is logical channel 1, and the logical channel of the upper link to which logical channel 1 corresponds is logical channel 3. Therefore, in the pre-emptive BSR, 100 bytes may be reflected in the predicted buffer size of LCG 2 to which logical channel 3 belongs.

In operation 2440, the IAB node may transmit the pre-emptive BSR. The IAB node may generate and transmit the pre-emptive BSR when the UL radio resource is allocated. The SR is triggered when there is no resource to transmit the pre-emptive BSR. Even in this case, the IAB node may transmit the SR by using the SR configuration of the logical channel of the upper link to which the logical channel of the lower link set as the representative logical channel among the logical channels belonging to the LCG indicating that there is data to be transmitted from the BSR is mapped. For example, when the logical channel configuration of FIG. 20 is assumed and node 2 2050 receives the BSR transmitted from node 1 2010, the SR is transmitted by using SR configuration 1, which is the SR configuration of logical channel 3. This SR may be considered as an SR triggered by the corresponding logical channel (i.e., logical channel 3).

FIG. 23 illustrates an operation flow of an IAB node for a logical channel configuration method of a pre-emptive BSR, according to embodiments of the present disclosure. An IAB node may be connected to a terminal or child IAB node, and may be connected to a parent IAB node (e.g., another IAB node, a base station or IAB donor, etc.).

Referring to FIG. 23, in operation 2310, the IAB node may receive a BSR from a child IAB node of the IAB node or a connected terminal. The BSR may include an amount of UL data stored in a buffer of the child IAB node of the IAB node or the connected terminal. The BSR may be received by a MAC layer (or a MAC entity).

In operation 2320, the IAB node may trigger a pre-emptive BSR. The IAB node may determine whether a condition for triggering the pre-emptive BSR is satisfied. At this time, when the condition for triggering the pre-emptive BSR is satisfied, the IAB node may trigger the pre-emptive BSR in order to attempt to transmit the pre-emptive BSR to the parent IAB node. The condition for triggering the pre-emptive BSR may be configured in various ways. For example, it may be preset that the IAB node triggers the pre-emptive BSR. Also, for example, when information included in the BSR received by the IAB node indicates that there is an expected data reception in a logical channel or LCG that has to trigger the pre-emptive BSR, the IAB node may determine to trigger the pre-emptive BSR.

In operation 2330, when the pre-emptive BSR is triggered as described above, the IAB node may reflect (or apply) the buffer size of the LCG of the lower link to the buffer size of the logical channel of the upper link to which a preset representative logical channel of the lower link among the logical channels belonging to the LCG is mapped. The IAB node may include the buffer size of the LCG of the lower link in the predicted buffer size of the pre-emptive BSR as the buffer size of the logical channel of the upper link. The representative logical channel may be preset by the upper layer to determine which logical channel is designated as the representative logical channel in the configuration of each LCG. The reflecting as the buffer size of the logical channel may mean reflecting as the buffer size of the LCG to which the corresponding logical channel belongs.

When the BSR is received, the IAB node may identify the representative logical channel among the LCGs of the BSR. The IAB node may identify the logical channel of the upper link mapped to the identified logical channel. When transmitting the pre-emptive BSR, the IAB node may apply the buffer size of the LCG of the BSR as the predicted buffer size of the LCG of the identified logical channel of the upper link. For example, assuming the logical channel configuration of FIG. 20 and assuming that the buffer size of LCG 0 is 100 bytes when node 2 2050 receives the BSR transmitted from node 1 2010 and the representative logical channel of LCG 0 is logical channel 1, the representative logical channel among the logical channels belonging to LCG 0 is logical channel 1, and the logical channel of the upper link to which logical channel 1 corresponds is logical channel 3. Therefore, in the pre-emptive BSR, 100 bytes may be reflected in the predicted buffer size of LCG 2 to which logical channel 3 belongs.

In operation 2440, the LAB node may transmit the pre-emptive BSR. The IAB node may generate and transmit the pre-emptive BSR when the UL radio resource is allocated. The SR is triggered when there is no resource to transmit the pre-emptive BSR. Even in this case, the IAB node may transmit the SR by using the SR configuration of the logical channel of the upper link to which the logical channel of the lower link set as the representative logical channel among the logical channels belonging to the LCG indicating that there is data to be transmitted from the BSR is mapped. For example, when the logical channel configuration of FIG. 20 is assumed and node 2 2050 receives the BSR transmitted from node 1 2010, the SR is transmitted by using SR configuration 1, which is the SR configuration of logical channel 3. This SR may be considered as an SR triggered by the corresponding logical channel (i.e., logical channel 3).

Figure 24:
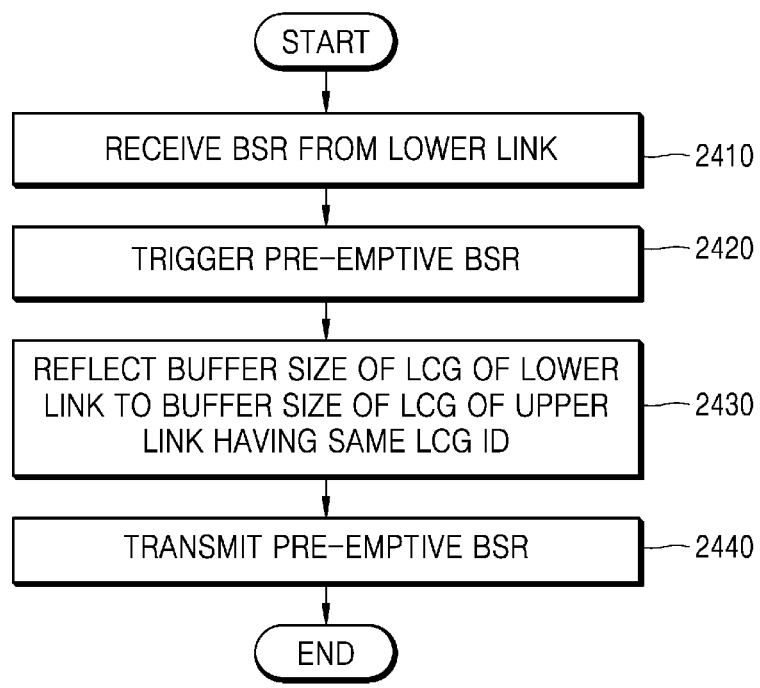
FIG. 24 illustrates an operation flow of an IAB node for a logical channel configuration method of a pre-emptive BSR, according to embodiments of the present disclosure.

FIG. 24 illustrates an operation flow of an IAB node for a logical channel configuration method of a pre-emptive BSR, according to embodiments of the present disclosure.

An IAB node may be connected to a terminal or child IAB node, and may be connected to a parent IAB node (e.g., another IAB node, a base station or IAB donor, etc.).

Referring to FIG. 24, in operation 2410, the IAB node may receive a BSR from a child IAB node of the IAB node or a connected terminal.

The BSR may include an amount of UL data stored in a buffer of the child IAB node of the IAB node or the connected terminal. The BSR may be received by a MAC layer (or a MAC entity).

In operation 2420, the IAB node may trigger a pre-emptive BSR. The IAB node may determine whether a condition for triggering the pre-emptive BSR is satisfied. At this time, when the condition for triggering the pre-emptive BSR is satisfied, the IAB node may trigger the pre-emptive BSR in order to attempt to transmit the pre-emptive BSR to the parent IAB node. The condition for triggering the pre-emptive BSR may be configured in various ways. For example, it may be preset that the IAB node triggers the pre-emptive BSR. Also, for example, when information included in the BSR received by the IAB node indicates that there is an expected data reception in a logical channel or LCG that has to trigger the pre-emptive BSR, the IAB node may determine to trigger the pre-emptive BSR.

In operation 2430, when the pre-emptive BSR is triggered as described above, the IAB node may reflect (or apply) the buffer size of the LCG of the lower link to the buffer size of the LCG of the upper link having the same LCG ID as the LCG of the lower link. The IAB node may include the buffer size of the LCG of the lower link in the predicted buffer size of the pre-emptive BSR as the buffer size of the logical channel of the upper link. To this end, in some embodiments, the parent IAB node receiving the pre-emptive BSR may need to know in advance which logical channel is mapped to the LCG of the lower link. However, in some embodiments, because the lower link and the upper link have the same LCG configuration, the parent IAB node may know for which data the BSR is transmitted in the lower link.

When the BSR is received, the IAB node may identify the LCG ID of the BSR. The IAB node may identify the LCG of the upper link having the same ID as the identified ICG ID. When transmitting the pre-emptive BSR, the IAB node may apply the buffer size of the LCG of the BSR as the predicted buffer size of the LCG of the logical channel of the upper link. For example, assuming the logical channel configuration of FIG. 20 and assuming that the buffer size of LCG 0 is 100 bytes when node 2 2050 receives the BSR transmitted from node 1 2010 and the representative logical channel of LCG 0 is logical channel 1, node 2 2050 may configure the pre-emptive BSR to transmit that the buffer size of LCG 0 is 100 bytes in the same manner as the pre-emptive BSR (not illustrated).

In operation 2440, the IAB node may transmit the pre-emptive BSR. Based on this information, the IAB node may generate and transmit the pre-emptive BSR when the UL radio resource is allocated. The SR is triggered when there is no resource to transmit the pre-emptive BSR. Even in this case, the SR may be transmitted by using the SR configuration of one logical channel (e.g., determined based on random selection, a set representative logical channel, priority, LCID size, etc.) among the logical channels belonging to the LCG indicating that there is data to be transmitted from the BSR. This SR may be considered an SR triggered by the logical channel that may use the SR configuration.

Figure 25:
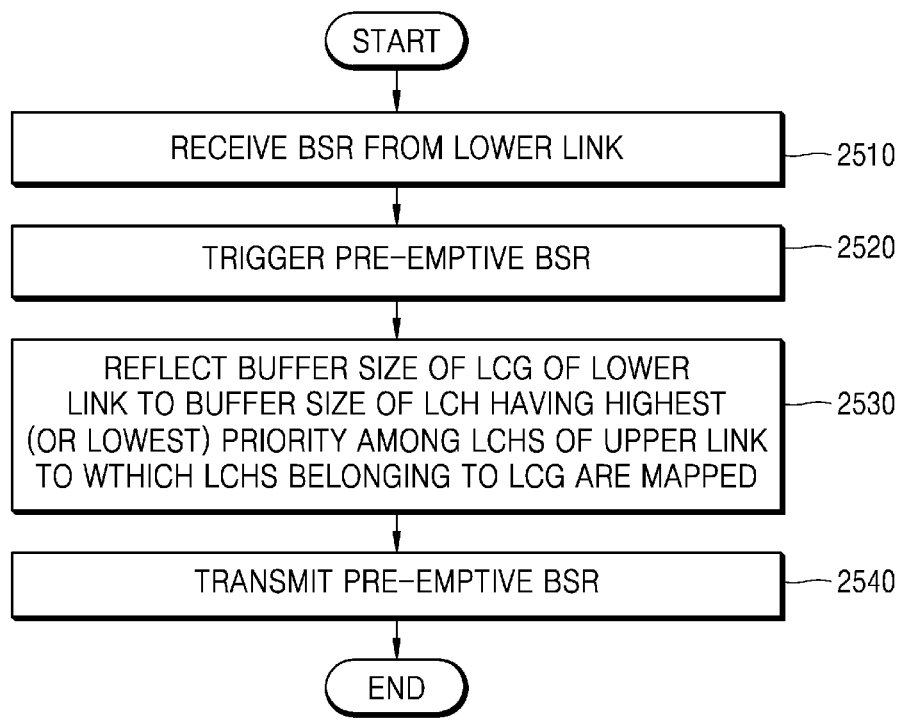
FIG. 25 illustrates an operation flow of an IAB node for a logical channel configuration method of a pre-emptive BSR, according to embodiments of the present disclosure.

FIG. 25 illustrates an operation flow of an IAB node for a logical channel configuration method of a pre-emptive BSR, according to embodiments of the present disclosure. An IAB node may be connected to a terminal or child IAB node, and may be connected to a parent IAB node (e.g., another IAB node, a base station or IAB donor, etc.).

Referring to FIG. 25, in operation 2510, the IAB node may receive a BSR from a child IAB node of the IAB node or a connected terminal. The BSR may include an amount of UL data stored in a buffer of the child IAB node of the IAB node or the connected terminal. The BSR may be received by a MAC layer (or a MAC entity).

In operation 2520, the IAB node may trigger a pre-emptive BSR. The IAB node may determine whether a condition for triggering the pre-emptive BSR is satisfied. At this time, when a condition for triggering the pre-emptive BSR is satisfied, the IAB node may trigger the pre-emptive BSR to the parent IAB node in order to attempt to transmit the pre-emptive BSR. The condition for triggering the pre-emptive BSR may be configured in various ways. For example, it may be preset that the IAB node triggers the pre-emptive BSR. Also, for example, when information included in the BSR received by the IAB node indicates that there is an expected data reception in a logical channel or LCG that has to trigger the pre-emptive BSR, the IAB node may determine to trigger the pre-emptive BSR.

In operation 2530, when the pre-emptive BSR is triggered as described above, the IAB node may reflect (or apply) the buffer size of the LCG of the lower link to the buffer size of the logical channel having the highest (or lowest) priority among the logical channels of the upper link to which the logical channels belonging to the LCG thereof are mapped. The IAB node may include the buffer size of the LCG of the lower link in the predicted buffer size of the pre-emptive BSR as the buffer size of the logical channel of the upper link. The reflecting as the buffer size of the logical channel may mean reflecting as the buffer size of the LCG to which the corresponding logical channel belongs.

When the BSR is received, the IAB node may identify one or more logical channels of the upper link corresponding to the logical channels belonging to the LCG of the BSR. The IAB node may identify the logical channel having the highest (or lowest) priority among the identified one or more logical channels. When transmitting the pre-emptive BSR, the IAB node may apply the buffer size of the LCG of the BSR as the predicted buffer size of the LCG of the identified logical channel of the upper link. For example, assuming the logical channel configuration of FIG. 20 and assuming that the buffer size of LCG 0 is 100 bytes when node 2 2050 receives the BSR transmitted from node 1 2010, the logical channel having the highest priority among logical channels 3 and 4, which are logical channels of the upper link to which logical channel 1 and logical channel 2 belonging to LCG 0 are mapped, is logical channel 3. Therefore, in the pre-emptive BSR, 100 bytes may be reflected in the predicted buffer size of LCG 2 to which logical channel 3 belongs.

In operation 2540, the IAB node may transmit the pre-emptive BSR. The IAB node may generate and transmit the pre-emptive BSR when the UL radio resource is allocated. The SR is triggered when there is no resource to transmit the pre-emptive BSR. Even in this case, the IAB node may transmit the SR by using the SR configuration of the logical channel having the highest (or lowest) priority among the logical channels of the upper link to which the logical channel belonging to the LCG indicating that there is data to be transmitted from the BSR is mapped. For example, when the logical channel configuration of FIG. 20 is assumed and node 2 2050 receives the BSR transmitted from node 1 2010, the SR is transmitted by using SR configuration 1, which is the SR configuration of logical channel 3. This SR may be considered as an SR triggered by the corresponding logical channel (i.e., logical channel 3).

Figure 26:
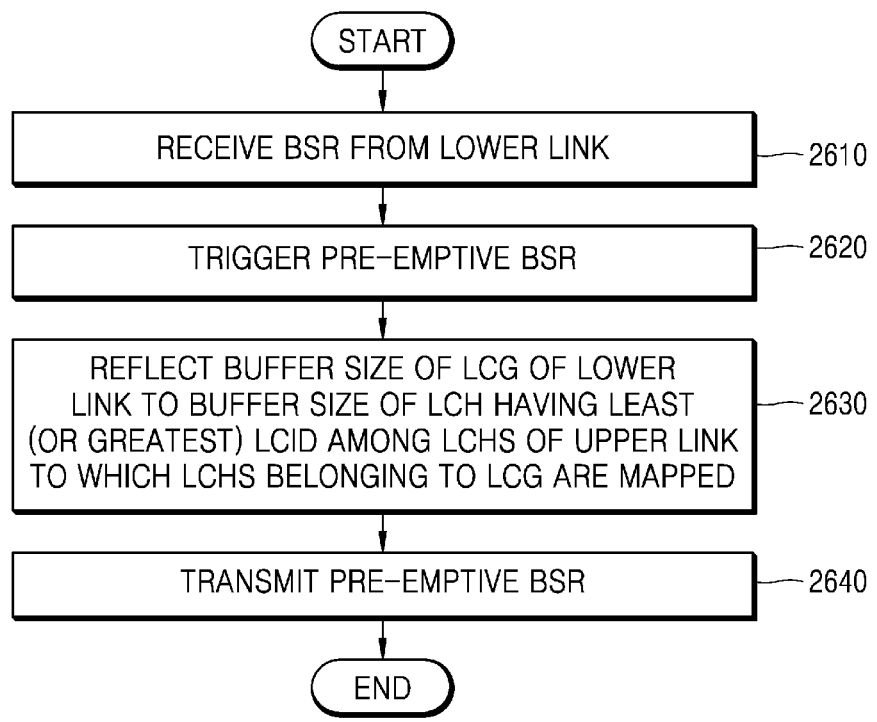
FIG. 26 illustrates an operation flow of an IAB node for a logical channel configuration method of a pre-emptive BSR, according to embodiments of the present disclosure.

FIG. 26 illustrates an operation flow of an IAB node for a logical channel configuration method of a pre-emptive BSR, according to embodiments of the present disclosure. An IAB node may be connected to a terminal or child IAB node, and may be connected to a parent IAB node (e.g., another IAB node, a base station or IAB donor, etc.).

Referring to FIG. 26, in operation 2610, the IAB node may receive a BSR from a child IAB node of the IAB node or a connected terminal. The BSR may include an amount of UL data stored in a buffer of the child IAB node of the IAB node or the connected terminal. The BSR may be received by a MAC layer (or a MAC entity).

In operation 2620, the IAB node may trigger a pre-emptive BSR. The IAB node may determine whether a condition for triggering the pre-emptive BSR is satisfied. At this time, when a condition for triggering the pre-emptive BSR is satisfied, the IAB node may trigger the pre-emptive BSR to the parent IAB node in order to attempt to transmit the pre-emptive BSR. The condition for triggering the pre-emptive BSR may be configured in various ways. For example, it may be preset that the IAB node triggers the pre-emptive BSR. Also, for example, when information included in the BSR received by the IAB node indicates that there is an expected data reception in a logical channel or LCG that has to trigger the pre-emptive BSR, the IAB node may determine to trigger the pre-emptive BSR.

In operation 2630, when the pre-emptive BSR is triggered as described above, the IAB node may reflect (or apply) the buffer size of the LCG of the lower link to the buffer size of the logical channel having the least (or greatest) LCID among the logical channels of the upper link to which the logical channels belonging to the LCG thereof are mapped. The IAB node may include the buffer size of the LCG of the lower link in the predicted buffer size of the pre-emptive BSR as the buffer size of the logical channel of the upper link. The reflecting as the buffer size of the logical channel may mean reflecting as the buffer size of the LCG to which the corresponding logical channel belongs.

When the BSR is received, the IAB node may identify one or more logical channels of the upper link corresponding to the logical channels belonging to the LCG of the BSR. The IAB node may identify the logical channel having the least (or greatest) LCID among the identified one or more logical channels. When transmitting the pre-emptive BSR, the IAB node may apply the buffer size of the LCG of the BSR as the predicted buffer size of the LCG of the identified logical channel of the upper link. For example, assuming the logical channel configuration of FIG. 20 and assuming that the buffer size of LCG 0 is 100 bytes when node 2 2050 receives the BSR transmitted from node 1 2010, the logical channel having the least LCID among logical channels 3 and 4, which are logical channels of the upper link to which logical channel 1 and logical channel 2 belonging to LCG 0 are mapped, is logical channel 3 (LCID=3). Therefore, in the pre-emptive BSR, 100 bytes may be reflected in the predicted buffer size of LCG 2 to which logical channel 3 belongs.

In operation 2640, the IAB node may transmit the pre-emptive BSR. The IAB node may generate and transmit the pre-emptive BSR when the UL radio resource is allocated. The SR is triggered when there is no resource to transmit the pre-emptive BSR. Even in this case, the SR may be transmitted by using the SR configuration of the logical channel having the least (or greatest) LCID among the logical channels of the upper link to which the logical channel belonging to the LCG indicating that there is data to be transmitted from the BSR is mapped. For example, when the logical channel configuration of FIG. 20 is assumed and node 2 2050 receives the BSR transmitted from node 1 2010, the SR is transmitted by using SR configuration 1, which is the SR configuration of logical channel 3. This SR may be considered as an SR triggered by the corresponding logical channel (i.e., logical channel 3).

Figure 27:
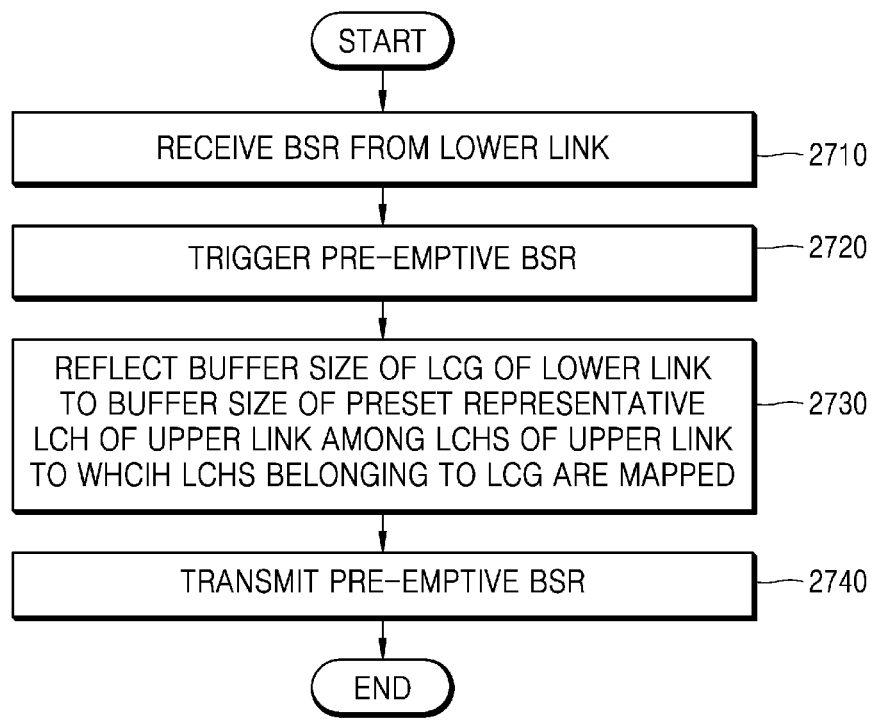
FIG. 27 illustrates an operation flow of an IAB node for a logical channel configuration method of a pre-emptive BSR, according to embodiments of the present disclosure.

FIG. 27 illustrates an operation flow of an IAB node for a logical channel configuration method of a pre-emptive BSR, according to embodiments of the present disclosure. An IAB node may be connected to a terminal or child IAB node, and may be connected to a parent IAB node (e.g., another IAB node, a base station or IAB donor, etc.).

Referring to FIG. 27, in operation 2710, the IAB node may receive a BSR from a child IAB node of the IAB node or a connected terminal. The BSR may include an amount of UL data stored in a buffer of the child IAB node of the IAB node or the connected terminal. The BSR may be received by a MAC layer (or a MAC entity).

In operation 2720, the IAB node may trigger a pre-emptive BSR. The IAB node may determine whether a condition for triggering the pre-emptive BSR is satisfied. At this time, when a condition for triggering the pre-emptive BSR is satisfied, the IAB node may trigger the pre-emptive BSR to the parent IAB node in order to attempt to transmit the pre-emptive BSR. The condition for triggering the pre-emptive BSR may be configured in various ways. For example, it may be preset that the IAB node triggers the pre-emptive BSR. Also, for example, when information included in the BSR received by the IAB node indicates that there is an expected data reception in a logical channel or LCG that has to trigger the pre-emptive BSR, the IAB node may determine to trigger the pre-emptive BSR.

In operation 2730, when the pre-emptive BSR is triggered as described above, the IAB node may reflect (or apply) the buffer size of the LCG of the lower link to the buffer size of the preset representative logical channel of the upper link among the logical channels of the upper link to which the logical channels belonging to the LCG are mapped. The IAB node may include the buffer size of the LCG of the lower link in the predicted buffer size of the pre-emptive BSR as the buffer size of the logical channel of the upper link. The representative logical channel may be preset by the upper layer to determine which logical channel is designated as the representative logical channel in the configuration of each LCG. The reflecting as the buffer size of the logical channel may mean reflecting as the buffer size of the LCG to which the corresponding logical channel belongs.

When the BSR is received, the IAB node may identify one or more logical channels of the upper link corresponding to the logical channels belonging to the LCG of the BSR. The IAB node may identify the representative logical channel among the identified one or more logical channels. When transmitting the pre-emptive BSR, the IAB node may apply the buffer size of the LCG of the BSR as the predicted buffer size of the LCG of the identified logical channel of the upper link. For example, assuming the logical channel configuration of FIG. 20 and assuming that the buffer size of LCG 0 is 100 bytes when node 2 2050 receives the BSR transmitted from node 1 2010 and the representative logical channel of LCG 0 of the lower link is logical channel 3 of the upper link, 100 bytes may be reflected in the predicted buffer size of LCG 2 to which logical channel 3 belongs in the pre-emptive BSR.

In operation 2740, the IAB node may transmit the pre-emptive BSR. Based on this information, the IAB node may generate and transmit the pre-emptive BSR when the UL radio resource is allocated. The SR is triggered when there is no resource to transmit the pre-emptive BSR. Even in this case, the SR may be transmitted by using the SR configuration of the logical channel of the upper link set as the representative logical channel among the logical channels belonging to the LCG indicating that there is data to be transmitted from the BSR. For example, when the logical channel configuration of FIG. 20 is assumed and node 2 2050 receives the BSR transmitted from node 1 2010, the SR is transmitted by using SR configuration 1, which is the SR configuration of logical channel 3. This SR may be considered as an SR triggered by the corresponding logical channel (i.e., logical channel 3).

Figure 28:
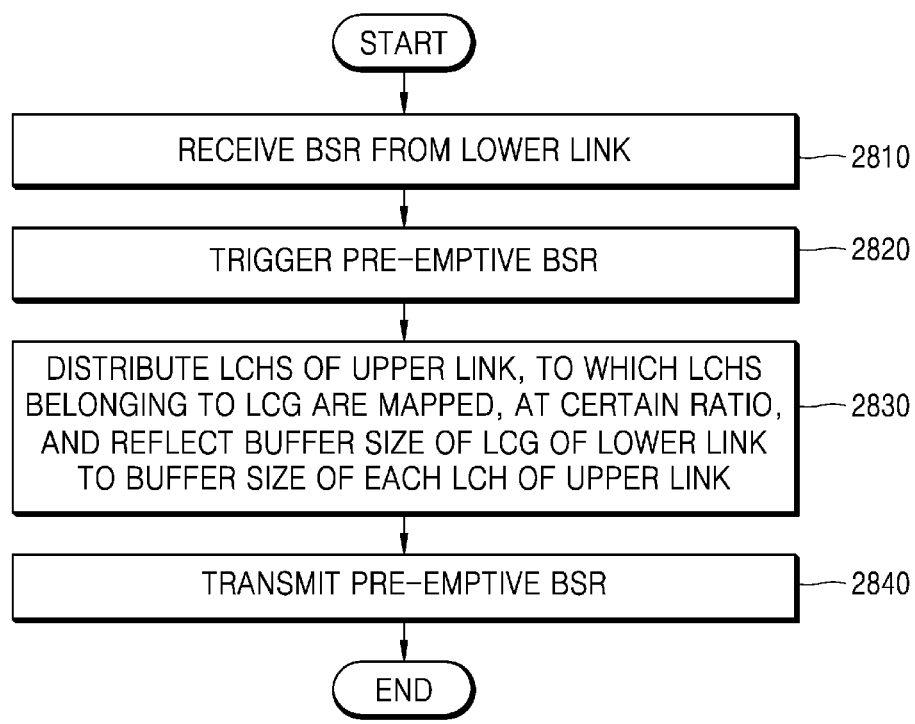
FIG. 28 illustrates an operation flow of an IAB node for a logical channel configuration method of a pre-emptive BSR, according to embodiments of the present disclosure.

FIG. 28 illustrates an operation flow of an IAB node for a logical channel configuration method of a pre-emptive BSR, according to embodiments of the present disclosure. An IAB node may be connected to a terminal or child IAB node, and may be connected to a parent IAB node (e.g., another IAB node, a base station or IAB donor, etc.).

Referring to FIG. 28, in operation 2810, the IAB node may receive a BSR from a child IAB node of the IAB node or a connected terminal. The BSR may include an amount of UL data stored in a buffer of the child IAB node of the IAB node or the connected terminal. The BSR may be received by a MAC layer (or a MAC entity).

In operation 2820, the IAB node may trigger a pre-emptive BSR. The IAB node may determine whether a condition for triggering the pre-emptive BSR is satisfied. At this time, when a condition for triggering the pre-emptive BSR is satisfied, the IAB node may trigger the pre-emptive BSR to the parent IAB node in order to attempt to transmit the pre-emptive BSR. The condition for triggering the pre-emptive BSR may be configured in various ways. For example, it may be preset that the IAB node triggers the pre-emptive BSR. Also, for example, when information included in the BSR received by the IAB node indicates that there is an expected data reception in a logical channel or LCG that has to trigger the pre-emptive BSR, the IAB node may determine to trigger the pre-emptive BSR.

In operation 2830, when the pre-emptive BSR is triggered as described above, the LAB node may distribute the logical channels of the upper link, to which the logical channels belonging to the LCG thereof are mapped, at a certain ratio, and reflect (or apply) the buffer size of the LCG of the lower link to the buffer size of each logical channel of the upper link. The reflecting as the buffer size of the logical channel may mean reflecting as the buffer size of the LCG to which the corresponding logical channel belongs. The IAB node may include the distributed buffer size in the predicted buffer size of the pre-emptive BSR as the buffer size of each logical channel of the upper link. The IAB node may determine the buffer size of each LCG as the sum of the buffer sizes of the logical channels included therein, and include the determined buffer size in the predicted buffer size of the pre-emptive BSR. For example, a certain proportion at which each logical channel is distributed may be set to 1/(number of corresponding logical channels). As another example, the distribution proportion of each logical channel may be configured individually.

When the BSR is received, the IAB node may identify one or more logical channels of the upper link corresponding to the logical channels belonging to the LCG of the BSR. The IAB node may calculate the buffer size of the logical channel of the BSR to be allocated to each of the one or more logical channels according to the distribution proportion. When transmitting the pre-emptive BSR, the IAB node may apply the calculated buffer size as the predicted buffer size of the LCG of each logical channel. For example, assuming the logical channel configuration of FIG. 20 and assuming that the buffer size of LCG 0 is 100 bytes when node 2 2050 receives the BSR transmitted from node 1 2010, logical channel 3 and logical channel 4, which are logical channels mapped to LCG 0, distribute 100 bytes by ½ each, and the IAB node may apply 50 bytes as the predicted buffer size of logical channel 3 and 50 bytes as the predicted buffer size of logical channel 4. In this case, the IAB node may transmit the pre-emptive BSR by reflecting the predicted buffer size of LCG 2 as 50 bytes and the predicted buffer size of LCG 3 as 50 bytes.

In operation 2840, the IAB node may transmit the pre-emptive BSR. The IAB node may generate and transmit the pre-emptive BSR when the UL radio resource is allocated. The SR is triggered when there is no resource to transmit the pre-emptive BSR. Even in this case, the SR may be transmitted by using the SR configuration of the logical channel belonging to the LCG indicating that there is data to be transmitted from the BSR. For example, when the logical channel configuration of FIG. 20 is assumed and node 2 450 receives the BSR transmitted from node 1 410, the SR is transmitted by using SR configuration 1, which is the SR configuration of logical channel 3, or SR configuration 2, which is the SR configuration of logical channel 4. This SR may be considered as an SR triggered by the corresponding logical channel.

Figure 29:
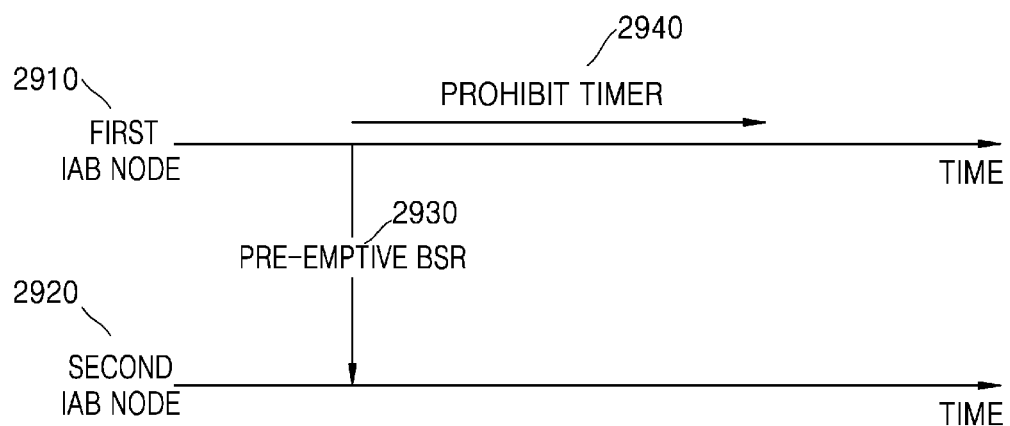
FIG. 29 illustrates an example of an operation of a prohibit timer of a pre-emptive BSR, according to embodiments of the present disclosure.

FIG. 29 illustrates an example of an operation of a prohibit timer of a pre-emptive BSR, according to embodiments of the present disclosure. The pre-emptive BSR has a forward function of transmitting the buffer size expected to be received by the IAB node to the parent IAB node so that radio resources is allocated in advance, but frequent transmission of pre-emptive BSR may waste radio resources. To prevent this, in the embodiment of FIG. 29, it is proposed to set the prohibit timer of the pre-emptive BSR. The operation of the prohibit timer may be performed in a MAC layer (or a MAC entity) of the IAB node.

Referring to FIG. 29, a first IAB node 2910 as a child IAB node may transmit a pre-emptive BSR 2930 to a second IAB node 2920 that is a parent IAB node. When the pre-emptive BSR 2930 is transmitted, the first IAB node 2910 may start a pre-emptive BSR prohibit timer 2940. In addition, the IAB node 2910 may start the pre-emptive BSR prohibit timer 2940 when the SR triggered by the pre-emptive BSR is transmitted. However, in another embodiment, the IAB node 2910 may start the pre-emptive BSR prohibit timer 2940 when the pre-emptive BSR is triggered. When the pre-emptive BSR prohibit timer 2940 is running, the pre-emptive BSR is not transmitted even when the pre-emptive BSR is triggered. In another embodiment, when the pre-emptive BSR prohibit timer 2940 is running, the pre-emptive BSR may not be triggered. In another embodiment, when the pre-emptive BSR prohibit timer 2940 is running, the triggered pre-emptive BSR may be transmitted after the pre-emptive BSR prohibit timer 2940 expires. At this time, the IAB node 2910 may identify the expiration of the prohibit timer, and thereafter, transmit the triggered pre-emptive BSR.

The length of the pre-emptive BSR prohibit timer may be used as a value preset in a RRC message. For example, the length may be configured in units of slots or sub-frames. The IAB node may receive a RRC message from a parent IAB node (e.g., a base station, an IAB donor, another IAB node) that is an upper node. The RRC message may include configuration information (e.g., an information element (IE)) for the pre-emptive BSR prohibit timer. In some embodiments, the pre-emptive BSR prohibit timer may be configured in units of LCGs. In other embodiments, the pre-emptive BSR prohibit timer may be configured in units of logical channels. In other embodiments, the pre-emptive BSR prohibit timer may be configured in units of cell groups (e.g., MAC-CellGroupConfig as MAC parameter).

Figure 30:
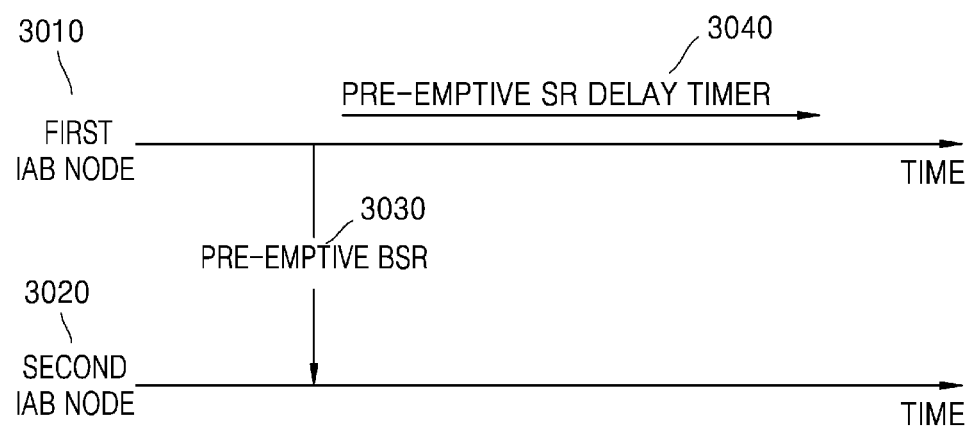
FIG. 30 illustrates an example of scheduling request (SR) transmission triggered by a pre-emptive BSR, according to embodiments of the present disclosure.

FIG. 30 illustrates an example of SR transmission triggered by a pre-emptive BSR, according to embodiments of the present disclosure. When the pre-emptive BSR is triggered but there is no UL radio resource available for new transmission, or when configured grant is set in a MAC entity and logicalChannelSR-Mask is set to false on the logical channel triggered by the pre-emptive BSR, SR may be transmitted by using the SR configuration of the logical channel that triggers the pre-emptive BSR.

Referring to FIG. 30, the SR triggered by the pre-emptive BSR may be referred to as a pre-emptive SR. An IAB node 3010 may transmit a pre-emptive BSR to an IAB node 3020. However, due to the pre-emptive BSR, when the SR is transmitted too often, it may lead to inefficiency of use of radio resources. Therefore, the IAB node may apply a timer 3040 to delay the pre-emptive SR. When the pre-emptive SR is triggered, or after actual transmission, the IAB node may start a pre-emptive SR delay timer 3040. In another embodiment, after a normal SR is triggered, or after actual transmission, the IAB node may start the pre-emptive SR delay timer 3040. When the pre-emptive SR delay timer is running, the pre-emptive SR is not transmitted even when the pre-emptive SR is triggered. In another embodiment, when the pre-emptive SR delay timer is running, the pre-emptive SR may not be triggered. In another embodiment, when the pre-emptive SR delay timer is running, the triggered pre-emptive SR may be transmitted after the pre-emptive SR delay timer expires. At this time, the IAB node 3010 may identify the expiration of the delay timer, and thereafter, transmit the triggered pre-emptive SR.

The length of the pre-emptive SR delay timer may be used as a value preset in a RRC message. For example, the length may be configured in units of slots or sub-frames. The IAB node may receive a RRC message from a parent IAB node (e.g., a base station, an IAB donor, another IAB node) that is an upper node. The RRC message may include configuration information (e.g., an IE) for the pre-emptive SR delay timer. In some embodiments, the pre-emptive SR delay timer may be configured in units of LCGs. In other embodiments, the pre-emptive SR delay timer may be configured in units of logical channels. In other embodiments, the pre-emptive SR delay timer may be configured in units of SR configurations.

Figure 31:
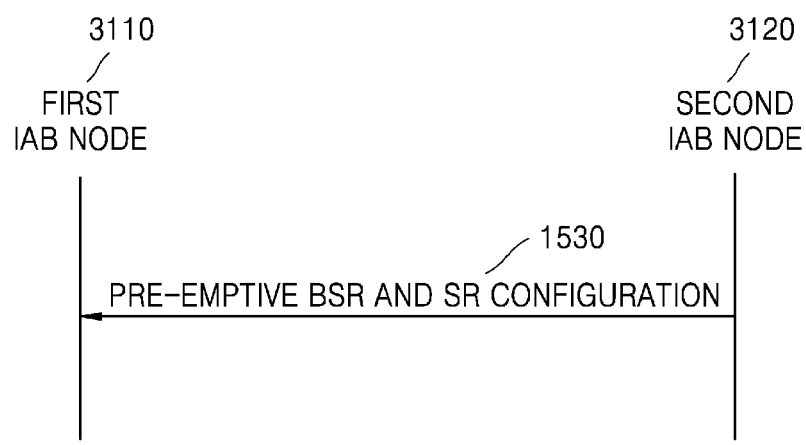
FIG. 31 illustrates a signal flow for configuring a pre-emptive BSR and a pre-emptive SR, according to embodiments of the present disclosure.

FIG. 31 illustrates a signal flow for configuring a pre-emptive BSR and a pre-emptive SR, according to embodiments of the present disclosure. The pre-emptive BSR refers to a BSR for an IAB node to report a pre-emptively predicted data amount to a parent IAB node by a BSR received from a terminal or child IAB node. The pre-emptive SR refers to an SR that requests UL resources for the pre-emptive BSR.

Referring to FIG. 31, in order to transmit the pre-emptive BSR, a first IAB node 3110, which is a child IAB node, may receive a pre-emptive BSR and SR configuration message from a second IAB node 3120, which is a parent IAB node (1530). This pre-emptive BSR and SR configuration message may be transmitted in a format including a field corresponding to a RRC message received from the parent IAB node.

When the parent IAB node wants the child IAB node to transmit the pre-emptive BSR, an indicator that allows the transmission of the pre-emptive BSR may be configured. For example, when the corresponding indicator is present, the child IAB node may identify that the transmission of the pre-emptive BSR is allowed. In contrast, when the indicator is not present, the child IAB node may identify that the transmission of the pre-emptive BSR is not allowed. At this time, the child IAB node may transmit a normal BSR (not a pre-emptive BSR) to the parent IAB node. As another example, the indicator may explicitly indicate whether the pre-emptive BSR is configured. When the indicator is not configured or is configured not to transmit the pre-emptive BSR, the first IAB node 3110, which is the child IAB node, does not transmit the pre-emptive BSR.

The parent IAB node may provide the pre-emptive BSR configuration to the child IAB node. In some embodiments, the parent IAB node may configure the pre-emptive BSR configuration in units of LCGs. In other embodiments, the parent IAB node may configure the pre-emptive BSR configuration in units of logical channels. In other embodiments, the parent IAB node may configure the pre-emptive BSR configuration in units of cell groups. In addition, as described with reference to FIG. 29, the length of the pre-emptive BSR prohibit timer may be set.

Furthermore, the parent IAB node may configure to the child IAB node whether the transmission of the SR triggered by the pre-emptive BSR, that is, the pre-emptive SR is possible. When the parent IAB node has configured the pre-emptive SR transmission of the child IAB node, the child IAB node may transmit the pre-emptive SR. However, when the parent IAB node has not allowed the pre-emptive SR transmission of the child IAB node, the child IAB node does not transmit the SR even when the pre-emptive BSR occurs but there is no UL radio resource to be transmitted, and may transmit the pre-emptive BSR when a UL radio resource is allocated in the future.

The parent IAB node may provide the pre-emptive SR configuration to the child IAB node. In some embodiments, the parent IAB node may configure the pre-emptive SR configuration in units of LCGs. In other embodiments, the parent IAB node may configure the pre-emptive SR configuration in units of logical channels. In other embodiments, the parent IAB node may configure the pre-emptive SR configuration in units of cell groups. In other embodiments, the parent IAB node may configure the pre-emptive SR configuration in units of SR configurations. In addition, as described with reference to FIG. 30, the length of the pre-emptive SR delay timer may be configured.

Although FIG. 31 illustrates that one message is transmitted, various embodiments of the present disclosure are not limited thereto. The pre-emptive BSR may be transmitted from the parent IAB node to the child IAB node through a RRC message, and the pre-emptive SR may be transmitted from the parent IAB node to the child IAB node through another RRC message.

According to various embodiments, the IAB node may receive, from the child IAB node of the lower link, a BSR including a buffer size of a first LCG of the lower link, may identify a second LCG of an upper link based on the first LCG of the lower link, and may transmit, to a parent IAB node of the upper link, a pre-emptive BSR in which the buffer size of the first LCG is applied as the buffer size of the second LCG of the upper link.

According to various embodiments, in order to identify the second LCG to which the buffer size of the first LCG is to be applied, the IAB node may identify a logical channel (hereinafter, a lower link logical channel) among one or more logical channels of the first LCG. Thereafter, the pre-emptive BSR may be transmitted through the logical channel of the upper link corresponding to the lower link logical channel. According to an embodiment, the IAB node may identify the lower link logical channel according to the high or low priority of each logical channel among the one or more logical channels of the first LCG receiving the BSR. Also, according to an embodiment, the IAB node may identify the lower link logical channel according to the small or large LCID of each logical channel among the one or more logical channels of the first LCG receiving the BSR. Also, according to an embodiment, the IAB node may identify the lower link logical channel according to the pre-configured representative logical channel among the one or more logical channels of the first LCG receiving the BSR. On the other hand, according to another embodiment, the IAB node may identify the second LCG as an LCG of an upper link having the same LCG ID as the first LCG.

According to various embodiments, in order to identify the second LCG to which the buffer size of the first LCG is to be applied, the IAB node may identify a logical channel (hereinafter, an upper link logical channel) among one or more logical channels of the upper link corresponding to the logical channel of the first LCG. Thereafter, the pre-emptive BSR may be transmitted through the identified upper link logical channel. According to an embodiment, the IAB node may identify the upper link logical channel according to the high or low priority of each logical channel among the one or more logical channels of the upper link corresponding to the logical channel of the first LCG receiving the BSR. Also, according to an embodiment, the IAB node may identify the upper link logical channel according to the small or large LCID of each logical channel among the one or more logical channels of the upper link corresponding to the logical channel of the first LCG receiving the BSR. Also, according to an embodiment, the IAB node may identify the upper link logical channel according to the pre-configured representative logical channel among the one or more logical channels of the upper link corresponding to the logical channel of the first LCG receiving the BSR. On the other hand, according to another embodiment, the IAB node may transmit the pre-emptive BSR by distributing the buffer size of the first LCG to each of the logical channels of the upper link, rather than identifying only a specific logical channel.

Through the embodiments described above, it has been proposed which LCG or which logical channel is used in the upper link in order to transmit the pre-emptive BSR. In order to transmit the pre-emptive BSR, UL resource allocation may be required. The IAB node may transmit the SR to the parent IAB node. At this time, the SR configuration may be selected in various ways. In some embodiments, the SR for resource allocation of the pre-emptive BSR transmission, that is, the pre-emptive SR may be transmitted based on the SR configuration mapped to the upper link logical channel of the pre-emptive BSR. Also, in some embodiments, the pre-emptive SR may be transmitted based on the SR configuration mapped to the upper link logical channel of the pre-emptive BSR.

Figure 32:
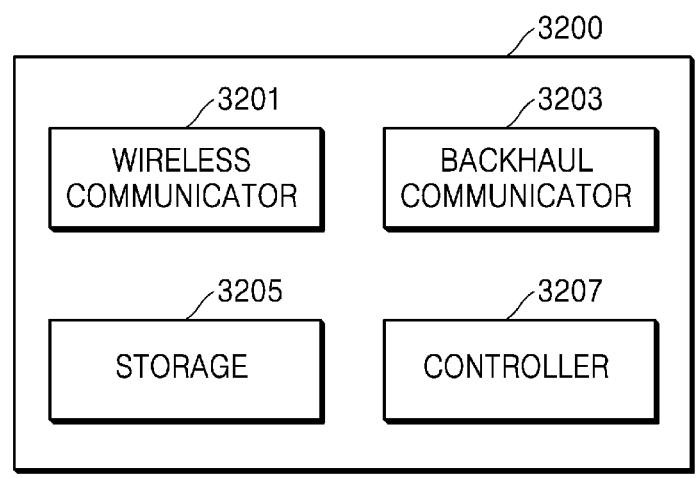
FIG. 32 illustrates a configuration of an IAB node, according to various embodiments of the present disclosure.

FIG. 32 illustrates a configuration of an IAB node 3200, according to various embodiments of the present disclosure. The configuration illustrated in FIG. 32 may be understood as the configuration of the first IAB nodes 1750, 1760, and 1770 of FIG. 17. The terms " . . . er/or" and "module" as used herein mean units that process at least one function or operation, and may be implemented as hardware, software, or a combination of hardware and software. The IAB node may include a base station as well as an IAB node located between a IAB donor and a terminal or between the IAB donor and a child IAB node.

Referring to FIG. 32, the IAB node 3200 includes a wireless communicator 3201, a backhaul communicator 3203, a storage 3205, and a controller 3207.

The wireless communicator 3201 performs functions for transmitting and receiving signals through a radio channel. For example, the wireless communicator 3201 performs a conversion function between a baseband signal and a bit string according to a physical layer standard of a system. For example, upon transmission of data, the wireless communicator 1001 encodes and modulates a transmission bit string to generate complex symbols. Also, upon reception of data, the wireless communicator 3201 demodulates and decodes a baseband signal to reconstruct a reception bit string. Also, the wireless communicator 3201 up-converts the baseband signal into a radio frequency (RF) band signal, transmits the RF band signal through an antenna, and down-converts the RF band signal received through the antenna into the baseband signal.

To this end, the wireless communicator 3201 may include a transmission filter, a reception filter, an amplifier, a mixer, an oscillator, a digital-to-analog converter (DAC), an analog-to-digital converter (ADC), and the like. Also, the wireless communicator 3201 may include a plurality of transmission/reception paths. Furthermore, the wireless communicator 3201 may include at least one antenna array including a plurality of antenna elements. In terms of hardware, the wireless communicator 3201 may include a digital unit and an analog unit. The analog unit may include a plurality of sub-units according to operating power, an operating frequency, and the like.

The wireless communicator 3201 may transmit and receive signals. To this end, the wireless communicator 3201 may include at least one transceiver. For example, the wireless communicator 3201 may transmit a synchronization signal, a reference signal, system information, a message, control information, or data. Also, the wireless communicator 3201 may perform beamforming.

The wireless communicator 3201 transmits and receives signals, as described above. Accordingly, all or part of the wireless communicator 3201 may be referred to as a 'transmitter,' a 'receiver,' or a 'transceiver.' Also, in the following description, the transmission and reception performed through the radio channel are used as the meaning including processing performed as described above by the wireless communicator 3201.

The backhaul communicator 3203 provides an interface for performing communication with other nodes in the network. That is, the backhaul communicator 3203 converts a bit string, which is transmitted from the IAB node 3200 to another node, for example, another access node, another IAB node, an upper node, a core network, etc., into a physical signal, and converts a physical signal, which is received from another node, into a bit string.

The storage 3205 stores data, such as configuration information, basic programs, and application programs for operations of the IAB node 3200. The storage 3205 may include a memory. The storage 3205 may include a volatile memory, a non-volatile memory, or a combination of a volatile memory and a non-volatile memory. The storage 3205 provides the stored data in response to the request of the controller 3207.

The controller 3207 controls overall operations of the IAB node 3200. For example, the controller 3207 transmits and receives signals through the wireless communicator 3201 or the backhaul communicator 3203. Also, the controller 3207 may record data in the storage 3205 and read data from the storage 2205. The controller 3207 may perform functions of a protocol stack required in the communication standards. To this end, the controller 3207 may include at least one processor. In some embodiments, the controller 3207 may include at least one of a pre-emptive BSR configurer and a pre-emptive SR configurer. The pre-emptive BSR configurer and the pre-emptive SR configurer may each be a storage space that stores instruction/code at least temporarily resided on the controller 3207 as an instruction set or code stored in the storage 3205 or instruction/code, or may be a portion of circuitry constituting the controller 3207. According to various embodiments, the controller 3207 may control the IAB node 3200 to perform operations (e.g., operations of FIGS. 21 to 31) according to the various embodiments described above.

The configuration of the IAB node 3200 illustrated in FIG. 32 is only an example of the IAB node, and the example of the IAB node performing various embodiments of the present disclosure from the configuration illustrated in FIG. 32 is not limited. That is, according to various embodiments, some configurations may be added, deleted, or changed. Although not illustrated in FIG. 32, the IAB node may include a DU and an MT. The DU of the IAB node may form beam coverage on the radio channel. The IAB node is divided into the MT and the DU, and the DU may provide a radio access network to a terminal or another IAB node. The MT of the IAB node may be connected to the upper node through the backhaul network.

In FIG. 32, the IAB node is described as one entity, but the present disclosure is not limited thereto. The IAB node according to various embodiments of the present disclosure may be implemented to form an integral deployment, and the IAB node (e.g., the IAB donor 1770 of FIG. 17) may be implemented as a base station to form an access network having a distributed deployment. According to an embodiment, the IAB donor may be divided into a CU and a DU. The CU may be implemented to perform an upper layer function (e.g., PDCP), and the DU may be implemented to perform a lower layer function (e.g., MAC, physical (PHY), etc.).

Figure 33:
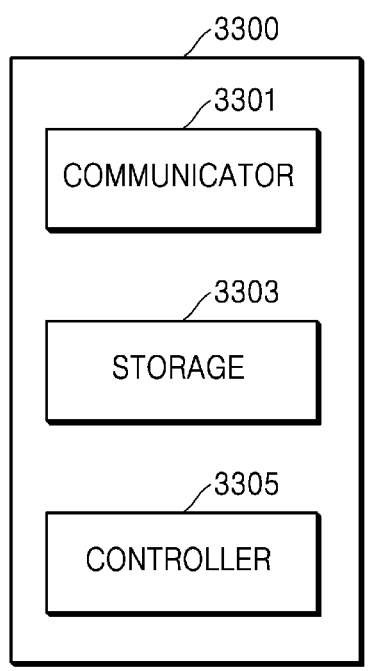
FIG. 33 illustrates a configuration of a terminal, according to various embodiments of the present disclosure.

FIG. 33 illustrates a configuration of a terminal 1300, according to various embodiments of the present disclosure. The structure illustrated in FIG. 33 may be understood as the structure of the terminal 1710, 1720, 1730, and 1740. The terms " . . . er/or" and "module" as used herein mean units that process at least one function or operation, and may be implemented as hardware, software, or a combination of hardware and software.

Referring to FIG. 33, the terminal 3300 includes a communicator 3301, a storage 3303, and a controller 3305.

The communicator 3301 performs functions for transmitting and receiving signals through to a radio channel. For example, the communicator 3301 performs a conversion function between a baseband signal and a bit string according to a physical layer standard of a system. For example, upon transmission of data, the communicator 3301 encodes and modulates a transmission bit string to generate complex symbols. Also, upon reception of data, the communicator 3301 demodulates and decodes a baseband signal to reconstruct a reception bit string. Also, the communicator 3301 up-converts the baseband signal into an RF band signal, transmits the RF band signal through an antenna, and down-converts the RF band signal received through the antenna into the baseband signal. For example, the communicator 3301 may include a transmission filter, a reception filter, an amplifier, a mixer, an oscillator, a DAC, an ADC, and the like.

Also, the communicator 3301 may include a plurality of transmission/reception paths. Furthermore, the communicator 3301 may include an antenna part. The communicator 3301 may include at least one antenna array including a plurality of antenna elements. In terms of hardware, the communicator 3301 may include a digital circuit and an analog circuit (e.g., a radio frequency integrated circuit (RFIC)). The digital circuit and the analog circuit may be implemented as a single package. Also, the communicator 3301 may include a plurality of RF chains. The communicator 3301 may perform beamforming. The communicator 3301 may apply a beamforming weight to a signal to be transmitted and received, in order to give a directionality to the signal according to the setting of the controller 3305. According to an embodiment, the communicator 3301 may include a RF block (or a RF part). The RF block may include first RF circuitry associated with the antenna and second RF circuitry associated with baseband processing. The first RF circuitry may be referred to as a RF-A (antenna). The second RF circuitry may be referred to as a RF-B (antenna).

Also, the communicator 3301 may transmit and receive signals. To this end, the communicator 3301 may include at least one transceiver. The communicator 3301 may receive a DL signal. The DL signal may include a synchronization signal (SS), a reference signal (RS) (e.g., a cell-specific reference signal (CRS)), a demodulation (DM)-RS, system information (e.g., master information block (MIB), system information block (SIB), remaining system information (RMSI), other system information (OSI), a configuration message, control information, DL data, etc. Also, the communicator 3301 may transmit and receive a UL signal. The UL signal may include a random access-related signal (e.g., a random access preamble (RAP) (or message 1 (Msg1), message 3 (Msg3), etc.), a reference signal (e.g., a sounding reference signal (SRS), DM-RS, etc.), a power headroom report (PHR), etc.

Also, the communicator 3301 may include different communication modules in order to process signals of different frequency bands from each other. Furthermore, the communicator 3301 may include a plurality of communication modules in order to support a plurality of different wireless access technologies from each other. For example, the different wireless access technologies may include Bluetooth low energy (BLE), wireless fidelity (Wi-Fi), WiFi Gigabyte (WiGig), cellular networks (e.g., LTE, new radio (NR), etc. Also, the different frequency bands may include a super high frequency (SHF) (e.g., 2.5 GHZ, 5 GHz, etc.) band and a millimeter wave (e.g., 39 GHz, 60 GHz, etc.) band. In addition, the communicator 3301 may use the same radio access technology on different frequency bands (e.g., an unlicensed band for licensed assisted access (LAA), citizens broadband radio service (CBRS) (e.g., 3.5 GHZ), etc.).

The communicator 3301 transmits and receives signals, as described above. Accordingly, all or part of the communicator 3301 may be referred to as a 'transmitter,' a 'receiver,' or a 'transceiver.' Also, in the following description, the transmission and reception performed through the radio channel are used as the meaning including processing performed as described above by the communicator 3301.

The storage 3303 may store data, such as configuration information, basic programs, and application programs for the operations of the terminal. The storage 3303 may include a volatile memory, a non-volatile memory, or a combination of a volatile memory and a non-volatile memory. The storage 3303 provides the stored data in response to the request of the controller 3305.

The controller 3305 may control overall operations of the terminal. For example, the controller 3305 transmits and receives signals through the communicator 3301. Also, the controller 3305 may record data in the storage 3303 and read data from the storage 3303. The controller 3305 may perform functions of a protocol stack required in the communication standards. To this end, the controller 3305 may include at least one processor. To this end, the controller 3305 may include at least one processor or microprocessor, or may be a portion of the processor. Also, a portion of the communicator 3301 and the controller 3305 may be referred to as a communication processor (CP). The controller 3305 may include various modules for performing communication. According to various embodiments, the controller 3305 may control the terminal 3305 to perform operations according to the embodiments described above.

The methods according to the embodiments of the disclosure, which are described in the claims or the detailed description, may be implemented as hardware, software, or a combination of hardware and software.

When implemented as software, a computer-readable storage medium storing one or more programs (software modules) may be provided. One or more programs stored in the computer-readable storage medium are configured to be executable by one or more processors in an electronic device. One or more programs include instructions that cause the electronic device to execute the methods according to the embodiments of the disclosure, which are described in the claims or the specification of the disclosure.

One or more programs (software modules, software, etc.) may be stored in random access memory (RAM), non-volatile memory including flash memory, read-only memory (ROM), electrically erasable programmable read-only memory (EEPROM), magnetic disc storage devices, compact disc-ROM (CD-ROM), digital versatile discs (DVDs), other types of optical storage devices, or magnetic cassettes. Alternatively, one or more programs may be stored in a memory provided by a combination of all or part of these devices. In addition, each memory may include a plurality of configured memories.

Furthermore, the programs may be stored in an attachable storage device that is accessible through a communication network, such as Internet, Intranet, local area network (LAN), wide area network (WAN), or storage area network (SAN), or a communication network provided by a combination thereof. These storage devices may be connected through an external port to a device that performs the embodiments of the disclosure. Moreover, a separate storage device on the communication network may access the device that performs the embodiment of the disclosure.

In specific embodiments of the disclosure, the elements included in the disclosure have been expressed in the singular or plural form according to the suggested specific embodiments of the disclosure. However, the expression in the singular or plural form is appropriately selected according to the suggested situations for convenience of explanation and is not intended to limit the disclosure to the single or plural elements. Even when a certain element is expressed in the plural form, it may be provided with a single element, and even when a certain element is expressed in the singular form, it may be provided with a plurality of elements.

On the other hand, although specific embodiments have been described in the detailed description of the disclosure, various modifications may be made thereto without departing from the scope of the disclosure. Therefore, the scope of the disclosure should not be limited to the described embodiments and should be defined by the following claims and the equivalents thereto.

The invention claimed is:

1. An operating method of a first terminal in a wireless communication system, the operating method comprising:
   transmitting sidelink data to a second terminal through a first radio bearer;
   reporting a count value to a base station when a certain condition is satisfied;
   receiving, from the base station, a sidelink radio resource control (RRC) reconfiguration message, based on the count value;
   generating a second radio bearer based on the RRC reconfiguration message; and
   transmitting the sidelink data to the second terminal through the second radio bearer,
   wherein the certain condition is that a count value (TX_NEXT) reaches a threshold value, and
   wherein the count value is a status variable value of a Packet Data Convergence Protocol (PDCP) layer.

2. The operating method of claim 1, wherein the second radio bearer uses a same sidelink radio bearer (SLRB) configuration, radio link control (RLC) parameter, medium access control (MAC) parameter, and timer configuration as the first radio bearer.

3. The operating method of claim 1, wherein the second radio bearer uses an identifier and security key that are different from an identifier and security key of the first radio bearer.

4. The operating method of claim 1, wherein a quality of service (QoS) flow of the sidelink data is remapped to the second radio bearer.

5. The operating method of claim 1, wherein the threshold value is a value set by the base station, a value received by being included in a system information message, or a value preset by the terminal.

6. The operating method of claim 1, further comprising receiving, from the base station, a report request for the count value,
   wherein the reporting of the count value comprises reporting the count value to the base station, based on the report request.

7. The operating method of claim 1, further comprising transmitting at least a portion of the RRC reconfiguration message to the second terminal.

8. A first terminal in a wireless communication system, the first terminal comprising:
   a transceiver; and
   at least one processor connected to the transceiver and configured to:
      the at least one processor is further configured to:
      transmit sidelink data to a second terminal through a first radio bearer;
      report a count value to a base station when a certain condition is satisfied;
      receive, from the base station, a sidelink radio resource control (RRC) reconfiguration message, based on the count value;
      generate a second radio bearer based on the RRC reconfiguration message; and
      transmit the sidelink data to the second terminal through the second radio bearer,
   wherein the certain condition is that a count value (TX_NEXT) reaches a threshold value, and
   wherein the count value is a status variable value of a Packet Data Convergence Protocol (PDCP) layer.

9. The first terminal of claim 8, wherein the second radio bearer uses a same sidelink radio bearer (SLRB) configuration, radio link control (RLC) parameter, medium access control (MAC) parameter, and timer configuration as the first radio bearer.

10. The first terminal of claim 8, wherein the second radio bearer uses an identifier and security key that are different from an identifier and security key of the first radio bearer.

11. The first terminal of claim 8, wherein a quality of service (QoS) flow of the sidelink data is remapped to the second radio bearer.

12. The first terminal of claim 8, wherein the threshold value is a value set by the base station, a value received by being included in a system information message, or a value preset by the terminal.

13. The first terminal of claim 8, wherein the at least one processor is further configured to:
- receive, from the base station, a report request for the count value; and
- report the count value to the base station, based on the report request.

* * * * *